(12) United States Patent
Park et al.

(10) Patent No.: US 12,088,448 B2
(45) Date of Patent: Sep. 10, 2024

(54) METHOD AND APPARATUS FOR APPLYING OPTIMIZED PHASE ROTATION BY CONSIDERING PREAMBLE PUNCTURING IN 802.11AX AND VARIOUS RF CAPABILITIES

(71) Applicant: LG ELECTRONICS INC., Seoul (KR)

(72) Inventors: Eunsung Park, Seoul (KR); Dongguk Lim, Seoul (KR); Jinsoo Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/480,352

(22) Filed: Oct. 3, 2023

(65) Prior Publication Data
US 2024/0048423 A1    Feb. 8, 2024

Related U.S. Application Data

(63) Continuation of application No. 17/269,948, filed as application No. PCT/KR2019/010630 on Aug. 21, 2019, now Pat. No. 11,870,630.

(30) Foreign Application Priority Data

Sep. 7, 2018   (KR) .......................... 10-2018-0107418

(51) Int. Cl.
*H04L 27/26*   (2006.01)
*H04L 1/00*    (2006.01)
(Continued)

(52) U.S. Cl.
CPC ........ *H04L 27/2621* (2013.01); *H04L 1/0013* (2013.01); *H04W 72/0453* (2013.01); *H04W 84/12* (2013.01)

(58) Field of Classification Search
CPC ............... H04L 27/2621; H04L 1/0013; H04L 5/0005; H04L 5/0044; H04L 1/0003;
(Continued)

(56) References Cited

U.S. PATENT DOCUMENTS

2019/0199491 A1*   6/2019   Verma .................... H04W 74/08
2019/0289612 A1*   9/2019   Chen .................... H04L 27/2613
(Continued)

*Primary Examiner* — Abdullahi Ahmed
(74) *Attorney, Agent, or Firm* — LEE, HONG, DEGERMAN, KANG & WAIMEY

(57) ABSTRACT

A method and an apparatus for transmitting an EHT PPDU to a wireless LAN system are presented. Particularly, a transmission device generates an EHT PPDU, and transmits the EHT PPDU to a reception device through a 320 MHz band of which a partial band is punctured on the basis of an RF. A legacy preamble includes an L-STF and an L-LTF. The legacy preamble is generated by applying a first phase rotation value. The first phase rotation value is determined on the basis of a first method and a second method. The first method is for acquiring an optimum PAPR in the L-LTF. The second method is for acquiring an optimum PAPR on the basis of a maximum transmission bandwidth supported by the RF. The first phase rotation value is acquired on the basis of a second phase rotation value and a third rotation value. The second phase rotation value is a phase rotation value which repeats a phase rotation value that is defined with respect to an 80 MHz band in an 802.11ax system. The third phase rotation value is a phase rotation value that is defined by 80 MHz band units in the 320 MHz band.

12 Claims, 23 Drawing Sheets

(51) Int. Cl.
*H04W 72/0453* (2023.01)
*H04W 84/12* (2009.01)

(58) Field of Classification Search
CPC ............. H04L 1/0009; H04L 27/2603; H04W 72/0453; H04W 84/12
See application file for complete search history.

(56) References Cited

U.S. PATENT DOCUMENTS

| | | | |
|---|---|---|---|
| 2021/0250125 A1* | 8/2021 | Park | H04L 27/2603 |
| 2021/0320830 A1* | 10/2021 | Park | H04L 27/2621 |
| 2021/0320831 A1* | 10/2021 | Park | H04L 27/2621 |
| 2021/0336827 A1* | 10/2021 | Park | H04L 1/0069 |
| 2021/0344540 A1* | 11/2021 | Park | H04L 27/2603 |
| 2021/0385115 A1* | 12/2021 | Cao | H04L 69/22 |

* cited by examiner

METHOD AND APPARATUS FOR APPLYING OPTIMIZED PHASE ROTATION BY CONSIDERING PREAMBLE PUNCTURING IN 802.11AX AND VARIOUS RF CAPABILITIES

CROSS-REFERENCE TO RELATED APPLICATIONS

This application is a continuation of U.S. patent application Ser. No. 17/269,948, filed on Feb. 19, 2021, which is the National Stage filing under 35 U.S.C. 371 of International Application No. PCT/KR2019/010630, filed on Aug. 21, 2019, which claims the benefit of earlier filing date and right of priority to KR Application No. 10-2018-0107418, filed on Sep. 7, 2018, the contents of which is hereby incorporated by reference herein in its entirety.

BACKGROUND OF THE DISCLOSURE

Field of the Disclosure

The present disclosure relates to a method of transmitting a PPDU in a WLAN system, and more specifically, to a method and device for applying optimized phase rotation in a WLAN environment in consideration of preamble puncturing and various RF capabilities of 802.11ax.

Related Art 5G service that has been commercialized from 2019 ensures an era of natural interaction with large-capacity content such as 4K/8K high-definition video and augmented reality (AR)/virtual reality (VR). Realization of the vision of the 5G service that is 20 times faster than 4G requires an upgrade of WLAN (Wi-Fi) environments, and thus new technology of next-generation WLANs aiming at faster, safe and convenience networks such as Wi-Fi6, WPA3, and mesh network is being presented on the occasion of 5G commercialization.

Improvement of throughput (effective speed per user) that can be conveniently used by a large scale of people and support of a large number of terminals assumed to be used in the Internet of Things (IoT) as well as improvement of a maximum transmission speed are expected from the next-generation WLANs.

For the purpose of achieving safe networks, "WPA3" has appeared in June 2018. This is the latest version of the security standard established by Wi-Fi Alliance, which is the newly presented standard after 14 years from the appearance of WPA2 that is the previous version in 2004. The WPA3 standard promotes improvement of user convenience suitable for current environments such as initial setting with a smartphone and a QR code in addition to security enhancement.

For the purpose of achieving convenience networks, the mesh network has appeared. According to the mesh network, links in the form of a mesh are automatically extended between access points (APs) of WLANs and data is transmitted/received through optimal routes. The mesh network attracts attention as a technology capable of easily extending the communication coverage of a WLAN without distributing cables when a power supply is present.

SUMMARY

The present disclosure provides a method and device for transmitting a PPDU through a broad band in a WLAN system in consideration of preamble puncturing and various RF capabilities of 802.11ax.

An example of the present disclosure proposes a method for transmitting a PPDU through a broad band in a WLAN system in consideration of preamble puncturing of 802.11ax and various RF capabilities.

The present embodiment may be performed in network environments in which a next-generation WLAN system is supported. The next-generation WLAN system is a WLAN system evolving from the 802.11ax system and may satisfy backward compatibility with the 802.11ax system. The next-generation WLAN system may correspond to an EHT (Extreme High Throughput) WLAN system or the 802.11be WLAN system.

The present embodiment may be performed in a transmitting device, and the transmitting device may correspond to an AP. A receiving device may correspond to an STA (non-AP STA).

The present embodiment proposes a method and device for setting phase rotation values by which an optimized PAPR can be obtained in consideration of both a case in which preamble puncturing introduced in 802.11ax is performed on 80 MHz, 160 MHz, 240 MHz, and 320 MHz bands and a case in which there are wireless devices having different maximum transmission bandwidths supported by RF (Radio Frequency). That is, preamble puncturing proposed in 802.11ax is extended and applied to 240 MHz/320 MHz bands, and phase rotation values for minimizing a maximum PAPR in consideration of RF capabilities of wireless devices having different maximum transmission bandwidths of RF in a BSS are proposed. An EHT PPDU proposed in the present embodiment may be transmitted and received in 80/160/240/320 MHz bands. However, description will be limited to the 320 MHz band.

A transmitting device generates the aforementioned EHT PPDU (Physical Protocol Data Unit). The EHT PPDU includes a legacy preamble and an EHT field.

The transmitting device transmits the PPDU to a receiving device through a 320 MHz band in which a part of the band has been punctured.

The legacy preamble includes an L-STF (Legacy-Short Training Field) and an L-LTF (Legacy-Long Training Field). In addition, the legacy preamble may further include an L-SIG (Legacy-Signal). The EHT field may include an EHT-SIG, an EHT-STF, an EHT-LTF, and a data field. The legacy field is a field supported by WLAN systems before 802.11be and the EHT field may be a field supported by the 802.11be WLAN system.

The EHT PPDU is transmitted based on RF (Radio Frequency). Specifically, the transmitting device may transmit the EHT PPDU in the 320 MHz band through a transmission-available bandwidth supported by RF (RF capacity).

The legacy preamble is generated by applying first phase rotation values. That is, the first phase rotation values may be commonly applied to all fields included in the legacy preamble.

The first phase rotation values are determined based on a first method and a second method.

The first method is a method of acquiring an optimum PAPR in the L-LTF. The second method is a method of acquiring an optimum PAPR based on a maximum transmission bandwidth supported by RF.

That is, the first phase rotation values are phase rotation values defined for an optimum PAPR of the L-STF and the L-LTF. When the PAPR of the L-STF and the L-LTF is large, the first phase rotation values may be applied to the legacy preamble in order to minimize the PAPR. Further, the first phase rotation values are also phase rotation values defined to minimize a maximum PAPR acquired in consideration of a maximum transmission bandwidth supported by RF. That is, the first phase rotation values may be phase rotation values defined to acquire an optimum PAPR in the L-STF and the L-LTF in a situation in which various RF capabilities are considered.

The first phase rotation values are acquired based on second phase rotation values and third phase rotation values.

The second phase rotation values are obtained by repeating phase rotation values defined for an 80 MHz band in the 802.11ax system. Since the EHT PPDU is transmitted through the 320 MHz band, the second phase rotation values may be obtained by repeating phase rotation values of the 80 MHz band, which optimizes a PAPR in the L-STF and the L-LTF and is applied in units of 20 MHz, four times. If the PPDU is transmitted through a 160 MHz band, the second phase rotation values may be obtained by repeating the phase rotation values of the 80 MHz band (which optimizes a PAPR in the L-STF and the L-LTF and is applied in units of 20 MHz) twice. If the EHT PPDU is transmitted through a 240 MHz band, the second phase rotation values may be obtained by repeating the phase rotation values of the MHz band (which optimizes a PAPR in the L-STF and the L-LTF and is applied in units of MHz) three times.

The third phase rotation values are phase rotation values defined in units of 80 MHz in the 320 MHz band. Since the 320 MHz band can be divided into four 80 MHz bands, the third phase rotation values can be defined for each of the four 80 MHz bands. If the EHT PPDU is transmitted through the 160 MHz band, the third phase rotation values may be defined for each of two 80 MHz bands based on an optimum PAPR of the L-STF and the L-LTF. If the EHT PPDU is transmitted through the 240 MHz band, the third phase rotation values may be defined for each of three 80 MHz bands based on the optimum PAPR of the L-STF and the L-LTF.

That is, the present embodiment proposes a method of additionally performing phase rotation (third phase rotation values) in units of 80 MHz in the whole band while applying phase rotation values (second phase rotation values) defined in the 80 MHz band.

Hereinafter, a subcarrier range to which phase rotation values are applied will be described.

The aforementioned 320 MHz band may be composed of subcarriers having subcarrier indexes of −512 to 511.

The second phase rotation values may be [1 −1 −1 −1 1 −1 −1 −1 1 −1 −1 −1 1 −1 −1 −1] because it is obtained by repeating the phase rotation values [1 −1 −1 −1] of the 80 MHz band, defined above, four times.

The first value "1" in the second phase rotation values may be applied to subcarriers having subcarrier indexes of −512 to −449, the second value "−1" in the second phase rotation value may be applied to subcarriers having subcarrier indexes of −448 to −385, the third value "−1" in the second phase rotation value may be applied to subcarriers having subcarrier indexes of −384 to −321, and the fourth value "−1" in the second phase rotation value may be applied to subcarriers having subcarrier indexes of −320 to −257. That is, the first to fourth values [1 −1 −1 −1] in the second phase rotation values may be applied to the first 80 MHz band in the 320 MHz band.

The fifth value "1" in the second phase rotation values may be applied to subcarriers having subcarrier indexes of −256 to −193, the sixth value "−1" in the second phase rotation value may be applied to subcarriers having subcarrier indexes of −192 to −129, the seventh value "−1" in the second phase rotation value may be applied to subcarriers having subcarrier indexes of −128 to −65, and the eighth value "−1" in the second phase rotation value may be applied to subcarriers having subcarrier indexes of −64 to −1. That is, the fifth to eighth values [1 −1 −1 −1] in the second phase rotation values may be applied to the second 80 MHz band in the 320 MHz band.

The ninth value "1" in the second phase rotation values may be applied to subcarriers having subcarrier indexes of 0 to 63, the tenth value "−1" in the second phase rotation value may be applied to subcarriers having subcarrier indexes of 64 to 127, the eleventh value "−1" in the second phase rotation value may be applied to subcarriers having subcarrier indexes of 128 to 191, and the twelfth value "−1" in the second phase rotation value may be applied to subcarriers having subcarrier indexes of 192 to 255. That is, the ninth to twelfth values [1 −1 −1 −1] in the second phase rotation values may be applied to the third 80 MHz band in the 320 MHz band.

The thirteenth value "1" in the second phase rotation values may be applied to subcarriers having subcarrier indexes of 256 to 319, the fourteenth value "−1" in the second phase rotation value may be applied to subcarriers having subcarrier indexes of 320 to 383, the fifteenth value "−1" in the second phase rotation value may be applied to subcarriers having subcarrier indexes of 384 to 447, and the sixteenth value "−1" in the second phase rotation value may be applied to subcarriers having subcarrier indexes of 448 to 511. That is, the thirteenth to sixteenth values [1 −1 −1 −1] in the second phase rotation values may be applied to the fourth 80 MHz band in the 320 MHz band.

For example, the third phase rotation values may be [1 j 1 j]. Since the 320 MHz band has four 80 MHz bands, the third phase rotation values may be defined for each of the four 80 MHz bands.

The first value "1" in the third phase rotation values may be applied to the first 80 MHz band in the 320 MHz band, the second value "j" in the third phase rotation values may be applied to the second 80 MHz band in the 320 MHz band, the third value "1" in the third phase rotation values may be applied to the third 80 MHz band in the 320 MHz band, and the fourth value "j" in the third phase rotation values may be applied to the fourth 80 MHz band in the 320 MHz band.

The first phase rotation values may be obtained based on products of the second phase rotation values and the third phase rotation values. That is, the first phase rotation values can be obtained by multiplying the second phase rotation values by the third phase rotation values in accordance with frequency bands (or subcarrier indexes). Here, the first phase rotation values are [1 −1 −1 −1 j −j −j −j 1 −1 −1 −1 j −j −j]. By applying the first phase rotation values to the legacy preamble, an optimum PAPR with respect to the L-STF and the L-LTF can be ensured for transmission through the 320 MHz band on which preamble puncturing proposed in 802.11ax is performed in consideration of various RF capabilities.

Some of the aforementioned bands may include all 20 MHz bands except a primary 20 MHz band. That is, the primary 20 MHz band can be used for PPDU transmission all the time, but the remaining 20 MHz bands other than the primary 20 MHz band may not be used for PPDU transmission.

The first phase rotation values may be obtained based on a preamble puncturing pattern. The preamble puncturing pattern may be a band pattern obtained by puncturing at least one of all 20 MHz bands except the primary 20 MHz band. That is, the preamble puncturing pattern may correspond to a pattern in any case in which at least one 20 MHz band in the 320 MHz band is punctured. However, the first phase rotation values have a unified form instead of a form having different values depending on the preamble puncturing pattern.

In addition, the maximum transmission bandwidth supported by RF may be 80 MHz, 160 MHz, 240 MHz, or 320 MHz. When the maximum transmission bandwidth supported by RF is 80 MHz, the transmitting device may transmit the PPDU using one RF having 80 MHz capacity. When the maximum transmission bandwidth supported by RF is 160 MHz, the transmitting device may transmit the PPDU using two RFs each having 80 MHz capacity. When the maximum transmission bandwidth supported by RF is 240 MHz, the transmitting device may transmit the PPDU using three RFs each having 80 MHz capacity. When the maximum transmission bandwidth supported by RF is 320 MHz, the transmitting device may transmit the PPDU using four RFs each having 80 MHz capacity.

An optimum PAPR obtained based on the maximum transmission bandwidth supported by RF may be selected by comparing first to fourth PAPRs. That is, the transmitting device may extract maximum PAPR values by calculating PAPRs for RFs having various capacities and compare the extracted PAPR values to determine optimized phase rotation values. Here, the first phase rotation values have a unified form instead of a form having different values depending on the RFs having various capacities.

The first PAPR may be an optimum PAPR obtained when the maximum transmission bandwidth supported by RF is 80 MHz. The second PAPR may be an optimum PAPR obtained when the maximum transmission bandwidth supported by RF is 160 MHz. The third PAPR may be an optimum PAPR obtained when the maximum transmission bandwidth supported by RF is 240 MHz. The fourth PAPR may be an optimum PAPR obtained when the maximum transmission bandwidth supported by RF is 320 MHz.

The L-STF may be generated by applying the first phase rotation values to an L-STF sequence. Further, the L-LTF may be generated by applying the first phase rotation values to an L-LTF sequence.

The L-STF sequence may be a sequence obtained by repeating an L-STF sequence defined for a 20 MHz band. Since the L-STF is transmitted through the 320 MHz band, the L-STF sequence may be obtained by repeating the L-STF sequence of the 20 MHz band defined in legacy 802.11ax. Similarly, if L-STF is transmitted through the 160 MHz band, the L-STF sequence of the 20 MHz band defined in legacy 802.11ax may be repeated twice. If the L-STF is transmitted through the 240 MHz band, the L-STF sequence of the 20 MHz band defined in legacy 802.11ax may be repeated three times.

The L-STF sequence defined for the 20 MHz band is sqrt(½)*[0 0 0 0 0 0 0 0 1+j 0 0 0 −1−j 0 0 0 1+j 0 0 0 −1−j 0 0 0 −1−j 0 0 0 1+j 0 0 0 0 0 0 0 −1−j 0 0 0 −1−j 0 0 0 1+j 0 0 0 1+j 0 1+j 0 0 0 1+j 0 0 0 0 0 0 0].

The L-LTF sequence may be a sequence obtained by repeating an L-LTF sequence defined for the 20 MHz band. Since the L-LTF is transmitted through the 320 MHz band, the L-LTF sequence may be obtained by repeating the L-LTF sequence of the 20 MHz band defined in legacy 802.11ax. Similarly, if the L-LTF is transmitted through the 160 MHz band, the L-LTF sequence of the 20 MHz band defined in legacy 802.11ax may be repeated twice. If the L-LTF is transmitted through the 240 MHz band, the L-LTF sequence of the 20 MHz band defined in legacy 802.11ax may be repeated three times.

The L-LTF sequence defined for the 20 MHz band is [0 0 0 0 0 1 1 −1 −1 1 1 −1 1 −1 1 1 1 1 1 1 −1 −1 1 1 −1 1 −1 1 1 1 1 0 1 −1 −1 1 1 −1 1 −1 1 −1 1 1 1 1 1 1 1 1 −1 −1 1 1 −1 1 −1 1 −1 −1 −1 −1 −1 1 1 −1 −1 1 −1 1 −1 1 1 1 1 0 0 0 0 0].

In the above-described embodiment, even when the PPDU is transmitted through MHz bands, phase rotation values may be defined and applied to the legacy preamble in the same manner.

The EHT-SIG may include EHT-SIG-A and EHT-SIG-B. The EHT-SIG-B may include the RU information. That is, the AP can signal the information about the tone plan in the 80/160/240/320 MHz through the EHT-SIG-B in the PPDU. Further, the EHT-STF, EHT-LTF, and data field included in the EHT field may be transmitted/received in a band (RU) according to the tone plan in 80/160/240/320 MHz.

In addition, the EHT-SIG may be generated by applying the first phase rotation values or the second phase rotation values. If the EHT PPDU has the same preamble structure as that of 11ax, the same phase rotation values may be applied up to the EHT-SIG-B to generate the field.

Advantageous Effects

According to embodiments proposed in the specification, it is possible to obtain a PAPR optimized for an L-STF and an L-LTF by defining phase rotation values applied to the legacy preamble when a PPDU is transmitted through 80/160/240/320 MHz bands in consideration of preamble puncturing of 802.11ax and a situation in which there are wireless devices having different maximum transmission bandwidths supported by radio frequency (RF). Accordingly, subcarrier efficiency and high throughput can be obtained.

DESCRIPTION OF EXEMPLARY EMBODIMENTS

As used herein, a slash (/) or comma may indicate "and/or". For example, "A/B" may indicate "A and/or B," and therefore may mean "only A", "only B", or "A and B". Technical features that are separately described in one drawing may be implemented separately or may be implemented simultaneously.

As used herein, parentheses may indicate "for example". Specifically, "control information (EHT-Signal)" may mean that "Signal" is proposed as an example of "control information". Further, "control information (i.e., EHT-signal)" may also mean that "signal" is proposed as an example of "control information".

The following examples of the present disclosure may be applied to various wireless communication systems. For example, the following examples of the present disclosure may be applied to a wireless local area network (WLAN) system. For example, the present disclosure may be applied to IEEE 802.11a/g/n/ac or IEEE 802.11ax. The present disclosure may also be applied to a newly proposed EHT standard or a new WLAN stand which has enhanced IEEE 802.11be.

Hereinafter, technical features of the WLAN system to which the present disclosure may be applied will be described to describe the technical features of the present disclosure.

In the specification, a band or a frequency band may mean a frequency domain in which multiple channels are used/supported/defined. For example, a frequency band may include 2.4 GHz, 5 GHz, 6 GHz, and 60 GHz bands. Multiple channels such as 20 MHz, 40 MHz, 80 MHz, and 160 MHz may be used/supported/defined in a frequency band. Channel numbers may be assigned to the aforementioned multiple channels. In the specification, channel properties (e.g., a center frequency and/or a bandwidth) according to a channel number may be preset.

Figure 1:
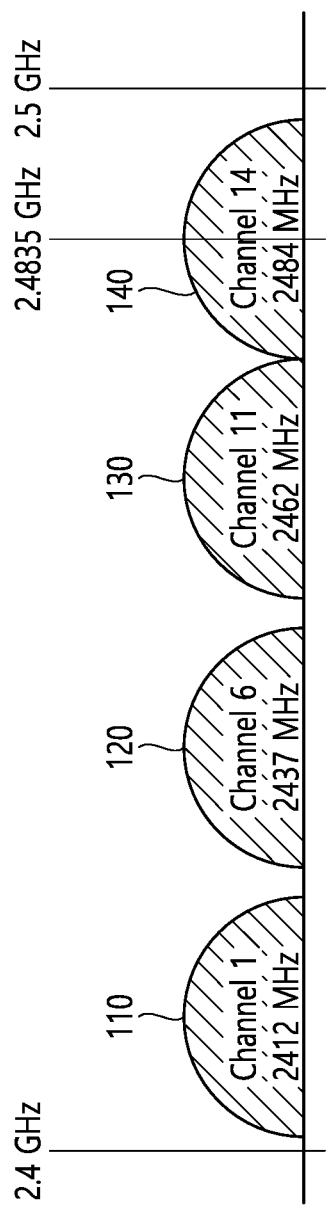
FIG. 1 illustrates an example of channels used/supported/defined in a 2.4 GHz band.

FIG. 1 illustrates an example of channels used/supported/defined in a 2.4 GHz band.

The 2.4 GHz band may be called other names such as a first band. Further, the 2.4 GHz band may mean a frequency domain in which channels having center frequencies close to 2.4 GHz (e.g., channels having center frequencies within 2.4 to 2.5 GHz) are used/supported/defined.

A wireless device may transmit and receive a signal (e.g., a PPDU) through at least one channel in the 2.4 GHz band. Channels in the 2.4 GHz band and permission of channels per country are shown in the following Table 1.

TABLE 1

| Channel | $F_0$ (MHz) | North America | Japan | Most countries |
|---|---|---|---|---|
| 1 | 2412 | Yes | Yes | Yes |
| 2 | 2417 | Yes | Yes | Yes |
| 3 | 2422 | Yes | Yes | Yes |
| 4 | 2427 | Yes | Yes | Yes |
| 5 | 2432 | Yes | Yes | Yes |
| 6 | 2437 | Yes | Yes | Yes |
| 7 | 2442 | Yes | Yes | Yes |
| 8 | 2447 | Yes | Yes | Yes |
| 9 | 2452 | Yes | Yes | Yes |
| 10 | 2457 | Yes | Yes | Yes |
| 11 | 2462 | Yes | Yes | Yes |
| 12 | 2467 | No except CAN | Yes | Yes |
| 13 | 2472 | No | Yes | Yes |
| 14 | 2484 | No | 11b Only | No |

As shown in Table 1, 14 channels can be configured in the 2.4 GHz band. Each channel can be configured as a 20 MHz frequency domain (or bandwidth). $F_0$ indicates a center frequency. The channels in the 2.4 GHz band have center frequencies at intervals of 5 MHz except channel #14. Neighboring channels among the 14 channels may overlap. Allowed frequency channels or maximum power levels in allowed frequency channels may be set differently for countries. For example, channel #13 may be allowed in most countries although it is not allowed in North America.

FIG. 1 illustrates four channels in the 2.4 GHz band. Each of the illustrated first to fourth frequency domains 110 to 140 may include a single channel. For example, the first frequency domain 110 may include channel #1 of Table 1. Here, the center frequency of channel #1 may be set to 2412 MHz. The second frequency domain 120 may include channel #6 of Table 1. Here, the center frequency of channel #6 may be set to 2437 MHz. The third frequency domain 130 may include channel #11 of Table 1. Here, the center frequency of channel #11 may be set to 2462 MHz. The fourth frequency domain 140 may include channel #14 of Table 1. Here, the center frequency of channel #14 may be set to 2484 MHz.

Table 1 and FIG. 1 illustrate a channel configuration in the 2.4 GHz band and specific values may be changed. For example, although Table 1 and FIG. 1 illustrates a method of configuring 14 channels in a band of 2.4 GHz to 2.5 GHz, 14 channels may be configured in a band of 2.35 GHz to 2.45 GHz. In addition, the channel configuration in Table 1 and FIG. 1 may not be used in some countries and different channel configurations may be set for countries.

Figure 2:
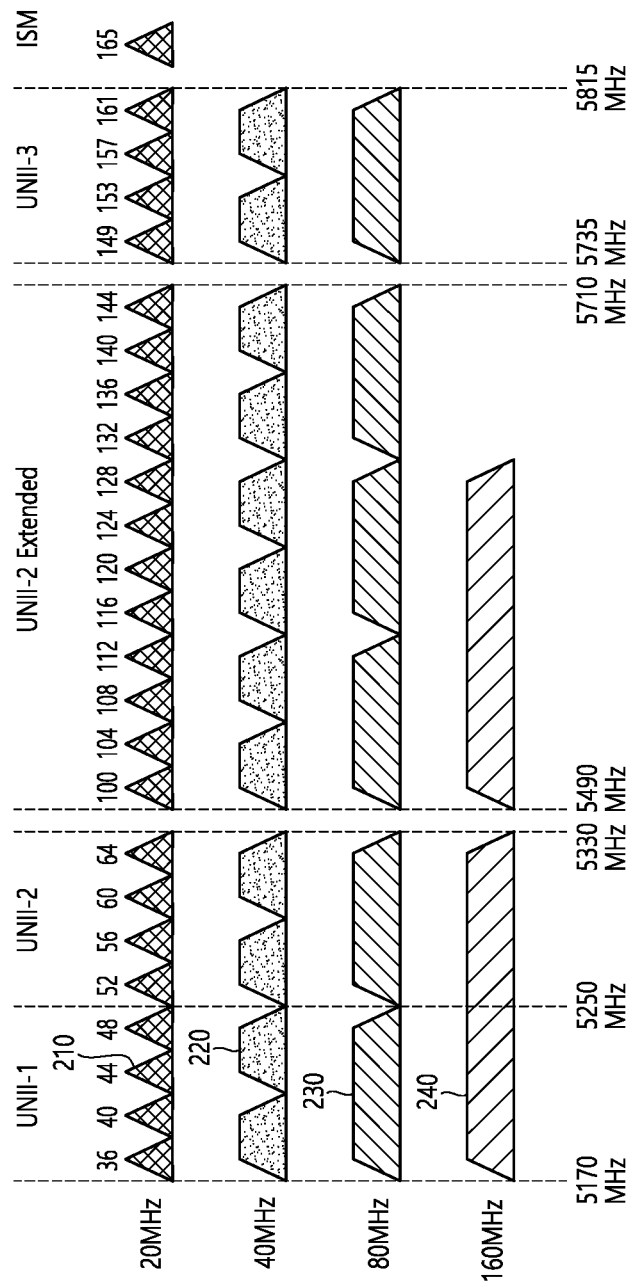
FIG. 2 illustrates an example of channels used/supported/defined in a 5 GHz band.

FIG. 2 illustrates an example of channels used/supported/defined in a 5 GHz band.

Multiple channels in the 5 GHz band include UNII (Unlicensed National Information Infrastructure)-1, UNII-2, UNII-3, and ISM. UNII-1 may also be called UNII Low. UNII-2 may include frequency domains called UNII Mid and UNII-2 Extended. UNII-3 may be called UNII-Upper.

Multiple channels may be configured in the 5 GHz band, and a bandwidth of each channel may be set to 20 MHz, 40 MHz, 80 MHz, or 160 MHz in various manners. For example, a frequency domain/range of 5170 MHz to 5330 MHz in UNII-1 and UNII-2 may be divided into eight 20 MHz channels. The frequency domain/range of 5170 MHz to 5330 MHz may be divided into four channels through a 40 MHz frequency domain. The frequency domain/range of 5170 MHz to 5330 MHz may be divided into two channels through an 80 MHz frequency domain. Alternatively, the frequency domain/range of 5170 MHz to 5330 MHz may be defined as a single channel through a 160 MHz frequency domain.

Distinguished channel numbers may be assigned to multiple channels. For example, channel #44 may include a first frequency domain 210 of 20 MHz. As another example, channel #46 may include a second frequency domain 220 of 40 MHz. As another example, channel #42 may include a third frequency domain 230 of 80 MHz. As another example, channel #50 may include a fourth frequency domain 220 of 160 MHz.

FIG. 2 illustrates a channel configuration in the 5 GHz band, and specific values may be changed. The 5 GHz band may be called other names such as a second band. The 5 GHz band may mean a frequency domain in which channels having center frequencies of 5 GHz or higher and less than 6 GHz are used/supported/defined. Otherwise, the 5 GHz band may include multiple channels in a band of 4.5 GHz to 5.5 GHz. In addition, the channel configuration illustrated in FIG. 2 may not be used in some countries and different channel configurations may be set for countries. That is, different frequency domains or bandwidths depending on channel numbers may be set for respective countries.

Multiple channels in a 6 GHz band may be configured similarly to the channel configurations illustrated in FIG. 1 and FIG. 2. For example, the multiple channels in the 6 GHz may be distinguished through bandwidths of 20 MHz, 40 MHz, 80 MHz, 160 MHz, 240 MHz, and 320 MHz.

Figure 3:
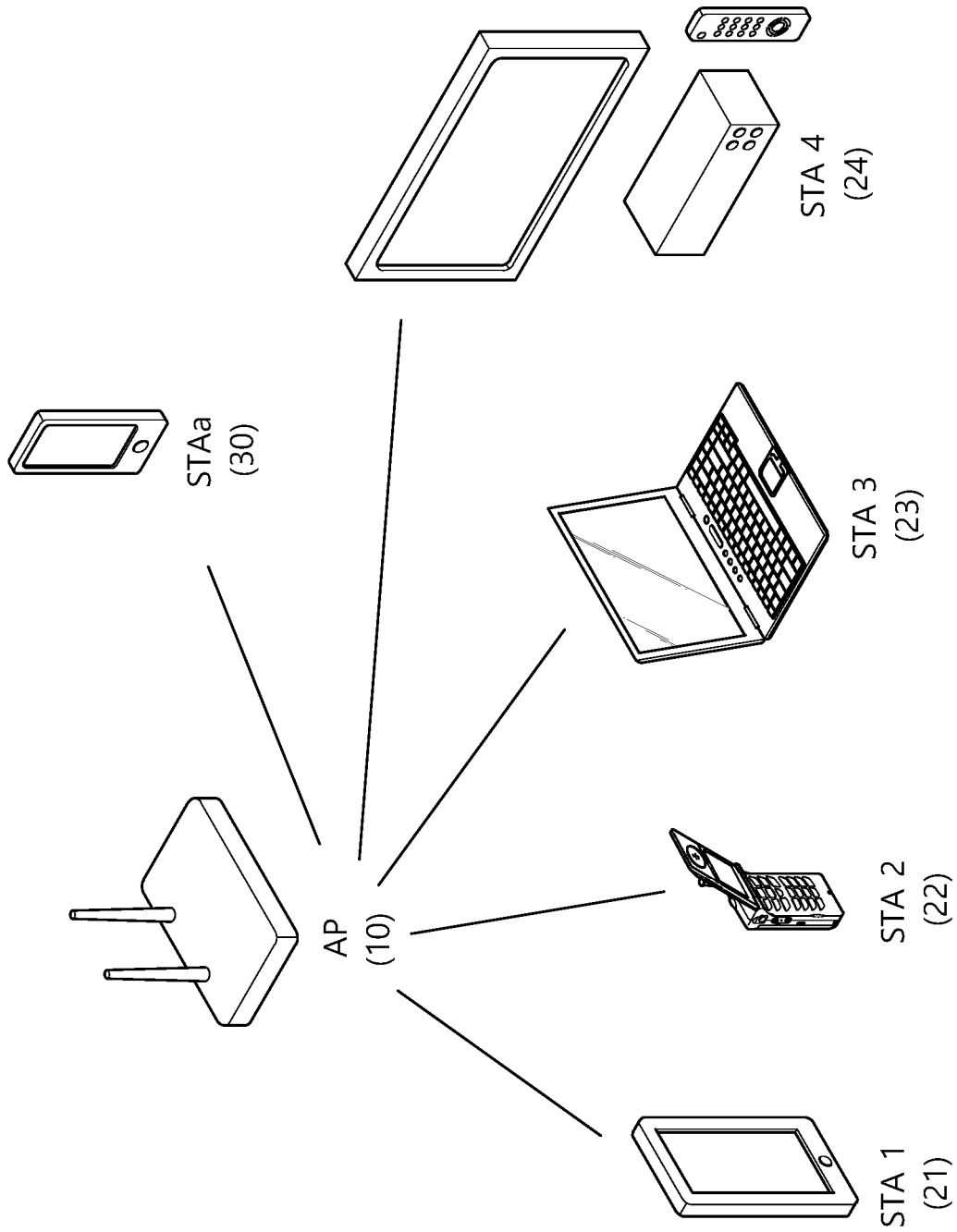
FIG. 3 is a diagram illustrating a configuration of a general wireless local area network (WLAN) to which embodiments of the present disclosure are applicable.

FIG. 3 is a diagram illustrating a configuration of a general wireless local area network (WLAN) system to which embodiments of the present disclosure are applicable.

Referring to FIG. 3, the WLAN system includes one or more basic service sets (BSSs). A BSS is a set of stations (STAs) that can communicate with each other in successful synchronization and does not represent a specific area.

An infrastructure BSS includes one or more non-AP stations non-AP STA1 21, non-AP STA2 22, non-AP STA3 23, non-AP STA4 24, and non-AP STAa 30, an access point (AP) that provides a distribution service, and a distribution system (DS) that connects a plurality of APs. In the infrastructure BSS, the AP manages non-AP STAs.

On the other hand, an independent BSS (IBSS) is a BSS operating in an Ad-Hoc mode. The IBSS does not have a centralized management entity because it does not include an AP. That is, in the IBSS, non-AP STAs are managed in a distributed manner. In the IBSS, all STAs may be mobile STAs and they are not allowed to access a DS and thus constitute a self-contained network.

An STA is an arbitrary functional medium including a physical layer interface for medium access control (MAC) and radio media conforming to IEEE (Institute of Electrical and Electronics Engineers) 802.11 standard and includes both an AP and a Non-AP station in a broad sense.

A non-AP STA is an STA that is not an AP and may be called other names such as a mobile terminal, a wireless device, a wireless transmit/receive unit (WTRU), user equipment (UE), a mobile station (MS), a mobile subscriber unit, and simply, a user. For convenience of description, the non-AP STA will be referred to as an STA in the following.

An AP is a functional entity that provides access to a DS for an STA associated therewith via a radio medium. In an infrastructure including the AP, communication between STAs is performed via the AP in principle but direct communication between STAs may be performed when a direct link is established. The AP may also be called a central controller, a base station (BS), a node-B, a BTS (Base Transceiver System), a site controller, or a management STA.

A plurality of infrastructure BSSs including the BSS illustrated in FIG. 3 may be connected to each other through a distribution system (DS). The plurality of BSSs connected through the DS is referred to as an extended service set (ESS). An AP and/or STAs included in an ESS can communicate with each other, and an STA can hand over from a BSS to another BSS while performing ceaseless communication in the same ESS.

In a WLAN system according to IEEE 802.11, a basic access mechanism of MAC (Medium Access Control) is a CSMA/CA (Carrier Sense Multiple Access with Collision Avoidance) mechanism. The CSMA/CA mechanism is also called a distributed coordination function (DCF) of IEEE 802.11 MAC and basically employs a "listen before talk" access mechanism. According to this type of access mechanism, an AP and/or an STA sense a radio channel or medium before starting transmission. When a medium is determined to be an idle status as a sensing result, the AP and/or the STA start frame transmission through the medium. On the other hand, when the medium is determined to be an occupied status, the AP and/or the STA set a delay period for medium access and wait instead of starting transmission.

The CSMA/CA mechanism also includes virtual carrier sensing in addition to physical carrier sensing through which an AP and/or an STA directly sense a medium. Virtual carrier sensing is for solving problems that may be generated in medium access, such as a hidden node problem. For virtual carrier sensing, MAC of a WLAN system uses a network allocation vector (NAV). The NAV is a value by which an AP and/or an STA that is currently using or authorized to use a medium indicates a time remaining until the medium becomes an available state to another AP and/or STA. Accordingly, a value set to the NAV corresponds to a period in which use of a medium is scheduled by an AP and/or an STA that transmit a corresponding frame.

Along with the DCF, the IEEE 802.11 MAC protocol provides a hybrid coordination function (HCF) based on a point coordination function which performs periodic polling such that all receiving APs and/or STAs can receive data packets according to the DCF and a polling based synchronous access scheme. The HCF has EDCA (Enhanced Distributed Channel Access) using a contention-based access scheme through which a provider provides data packets to a plurality of users and HCCA (HCF Controlled Channel Access) using a contention-free-based channel access scheme employing a polling mechanism. HCF includes a medium access mechanism for improving a quality of service (QoS) of a WLAN and can transmit QoS data in both a contention period (CP) and a contention-free period (CFP).

In a wireless communication system, an STA cannot immediately recognize the presence of a network when it is powered on and starts to operate due to properties of radio media. Accordingly, any type of STA needs to perform a network discovery procedure in order to access a network. Upon discovery of networks through the network discovery procedure, an STA selects a network to which the STA will subscribe through a network selection procedure. Then, the STA subscribes to the selected network and performs a data exchange operation performed in a transmitter/receiver.

In a WLAN system, the network discovery procedure is implemented as a scanning procedure. The scanning procedure is divided into passive scanning and active scanning. Passive scanning is based on a beacon frame periodically broadcast by an AP. In general, an AP of a WLAN broadcasts the beacon frame at specific intervals (e.g., 100 msec). The beacon frame includes information about a BSS managed thereby. The STA passively waits to receive the beacon frame in a specific channel. Upon acquisition of information about a network through reception of the beacon frame, the STA ends the scanning procedure in the specific channel. Passive scanning is performed simply by an STA receiving the beacon frame without transmitting an addition frame so that it has the advantage of small overhead. However, passive scanning has the disadvantage that a scanning time increases in proportion to a beacon frame transmission period.

Active scanning is a procedure through which an STA actively broadcasts a probe request frame in a specific channel to request network information from all AP that have received the probe request frame. An AP that has received the probe request frame waits for a random time in order to prevent frame collision and then transmits a probe response frame including network information to the STA. The STA receives the probe response frame, acquires the network information, and ends the scanning procedure. Active scanning has the advantage of a relatively short scanning time. On the other hand, active scanning requires a frame sequence according to request-response, and thus network overhead increases.

Upon completion of the scanning procedure, the STA performs an authentication procedure with respect to the AP after selection of a network according to a specific standard therefor. The authentication procedure is composed of 2-way handshaking. Upon completion of the authentication procedure, the STA performs association with the AP.

The association procedure is composed of 2-way handshaking. First, the STA transmits an association request frame to the AP. The association request frame includes information on capabilities of the STA. The AP determines whether to allow association for the STA based on the capabilities of the STA. Upon determination of whether to allow association, the AP transmits an association response frame to the STA. The association response frame includes information indicating whether association is allowed and information representing the reason for association allowance/failure. The association response frame further includes information about capabilities that can be supported by the AP. When association is successfully completed, normal frame exchange between the AP and the STA is performed. When association fails, the association procedure may be re-attempted based on the information about the reason for association failure included in the association response frame or the STA may request association with another AP.

To overcome a limit on a communication speed which has been pointed out as vulnerability in WLANs, IEEE 802.11n has been recently established. IEEE 802.11n aims at improvement of the speed and reliability of networks and extension of operation distances of wireless networks. More specifically, IEEE 802.11n supports high throughput (HT) of a data processing speed of 540 Mbps or higher and is based on MIMO (Multiple Inputs and Multiple Outputs) in which both a transmitter and a receiver use multiple antennas to minimize transmission error and optimize a data rate.

With the activation of propagation of WLANs and diversification of applications using WLANs, there is need for a new WLAN system for supporting higher throughput than the data processing speed supported by IEEE 802.11n. A WLAN system supporting very high throughput (VHT) is the next version of the IEEE 802.11n WLAN system, which is one of IEEE 802.11 WLAN systems recently newly proposed to support data processing speeds of 1 Gbps or higher for multiple users and throughput of 500 Mbps or higher for a single user in a MAC service access point (SAP).

The VHT WLAN system beyond the legacy WLAN systems supporting 20 MHz and 40 MHz supports transmission through 80 MHz, contiguous 160 MHz and non-contiguous 160 MHz bandwidths and/or transmission through bandwidths higher than these bandwidths. In addition, the VHT WLAN system supports 256QAM (Quadrature Amplitude Modulation) over the legacy WLAN systems supporting 64QAM.

Since the VHT WLAN system supports the MU-MIMO (Multi User-Multiple Input Multiple Output) transmission method for higher throughput, an AP can simultaneously transmit data frames to one or more MIMO-paired STAs. A maximum number of paired STAs may be 4, and a maximum of 4 spatial streams may be allocated to each STA when a maximum number of spatial streams is 8.

Referring back to FIG. 3, in the WLAN system illustrated in the figure, the AP 10 can simultaneously transmit data to an STA group including at least one of a plurality of STAs 21, 22, 23, 24 and 30 associated with the AP 10. Although FIG. 1 illustrates an example in which the AP performs MU-MIMO transmission to STAs, an STA that intends to transmit data can transmit a PPDU to a plurality of STAs using the MU-MIMO transmission method in a WLAN system supporting TDLS (Tunneled Direct Link Setup), DLS (Direct Link Setup), or the mesh network. Hereinafter, an example in which an AP transmits a PPDU to a plurality of STAs using the MU-MIMO transmission method will be described.

Data can be transmitted to STAs through different spatial streams. A data packet transmitted by the AP 10 is a PPDU generated in a physical layer of a WLAN system and transmitted or a data field included in the PPDU and may be referred to as a frame. That is, a PPDU or a data field included in the PPDU for SU (single user)-MIMO and/or MU-MIMO may be referred to as a MIMO packet. A PPDU for MU may be referred to as an MU packet. In an example of the present disclosure, it is assumed that a group of transmission target STAs that are MU-MIMO paired with the AP 10 includes STA1 21, STA2 22, STA3 23, and STA4 24. Here, a spatial stream may not be allocated to a specific STA of the transmission target STA group and thus data is not transmitted thereto. Meanwhile, it is assumed that STAa 30 is not included in the transmission target STA group although it is associated with the AP.

An Identifier may be allocated to the transmission target STA group to support MU-MIMO transmission in the WLAN system and this is referred to as a group ID. The AP transmits a group ID management frame including group definition information to STAs supporting MU-MIMO transmission for group ID allocation, and a group ID is allocated to the STAs through the group ID management frame prior to PPDU transmission. A plurality of group IDs may be allocated to one STA.

Figure 4:
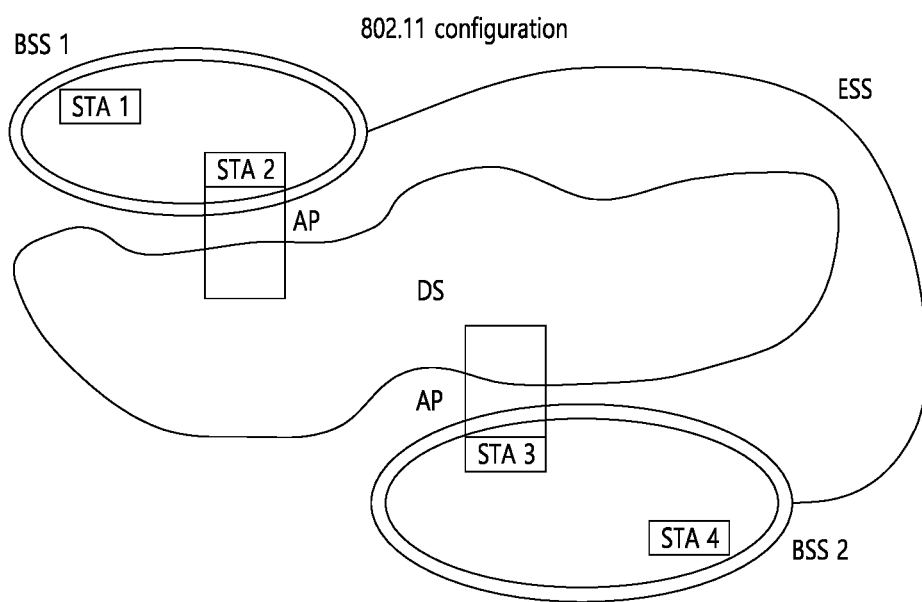
FIG. 4 is a diagram illustrating an example of a configuration of a WLAN system.

FIG. 4 is a diagram illustrating an example of a configuration of a WLAN system.

As illustrated in FIG. 4, the WLAN system includes one or more basic service sets (BSSs). A BSS is a set of stations (STAs) that can communicate with each other in successful synchronization.

An STA is a logical entity including a physical layer interface for medium access control (MAC) and radio media and includes an access point (AP) and a non-AP station (non-AP STA). Among STAs, a mobile terminal operated by a user is a non-AP STA, and an STA may refer to a non-AP STA. The non-AP STA may be called other names such as a terminal, a wireless transmit/receive unit (WTRU), user equipment (UE), a mobile station (MS), a mobile terminal, and a mobile subscriber unit.

In addition, the AP is an entity that provides access to a distribution system (DA) to an associated STA through radio media. The AP may also be called a centralized controller, a base station (BS), a node-B, a BTS (Base Transceiver System), a PCP/AP (personal basic service set central point/access point), or a site controller.

The BSS may be divided into an infrastructure BSS and an independent BSS (IBSS).

A BSS illustrated in FIG. 4 is an IBSS. The IBSS refers to a BSS including no AP and constitutes a self-contained network because it does not include an AP and thus is not allowed to access a DS.

Further, a BSS illustrated in FIG. 4 is an infrastructure BSS. The infrastructure BSS includes one or more STAs and APs. Although communication between non-AP STAs is performed through an AP in the infrastructure BSS in principle, direct communication between non-AP STAs may be performed when a direct link is established between the non-AP STAs.

As illustrated in FIG. 4, a plurality of infrastructure BSSs may be connected to each other through a DS. A plurality of infrastructure BSSs connected through a DS is referred to as an extended service set (ESS). STAs included in an ESS can communicate with each other and a non-AP STA can handover from one BSS to another BSS while performing ceaseless communication in the same ESS.

A DS is a mechanism for connecting a plurality of APs and need not necessarily be a network, and the form thereof is not limited if it can provide a predetermined distribution service. For example, the DS may be a wireless network such as the mesh network or a physical structure for connecting APs.

Figure 5:
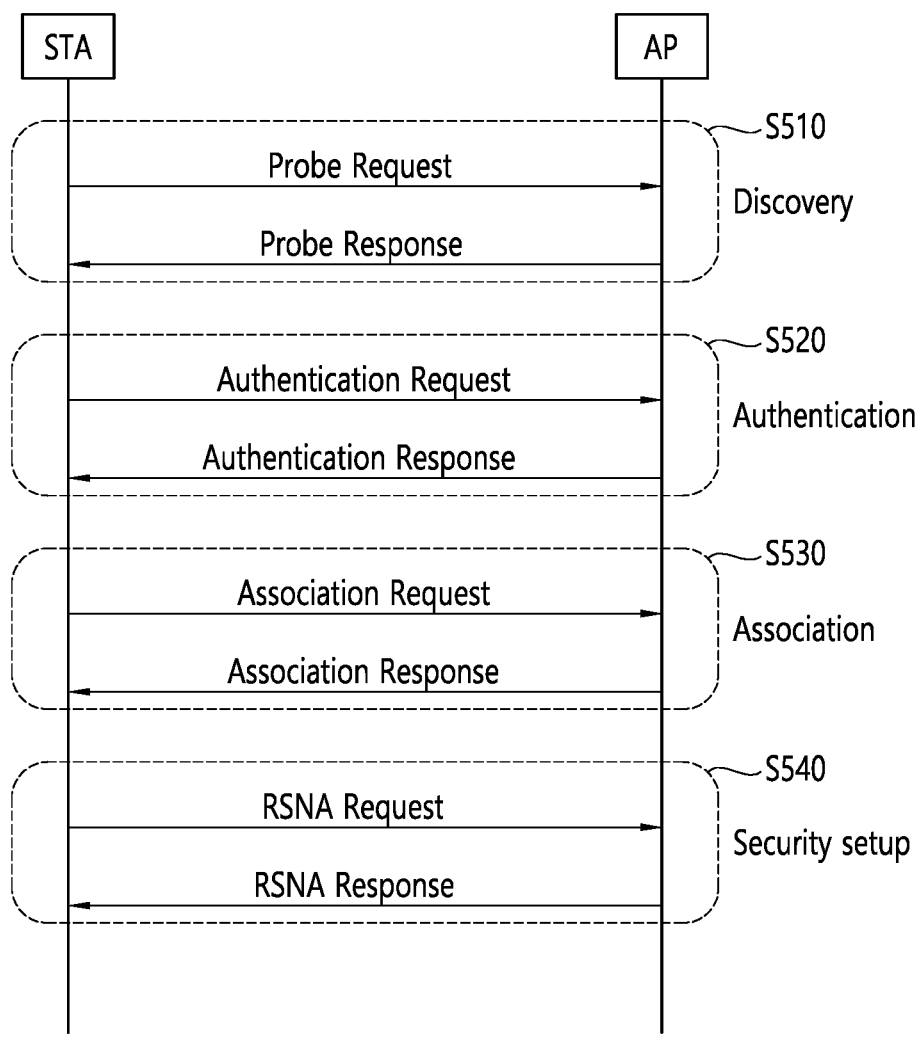
FIG. 5 is a diagram illustrating a general link setup procedure.

FIG. 5 is a diagram for describing a general link setup procedure.

In illustrated step S510, an STA may perform a network discovery operation. The network discovery operation may include a scanning operation of the STA. That is, the STA needs to discover networks in which the STA can join to access a network. The STA needs to identify a compatible network before joining a wireless network. A process of identifying a network present in a specific area is referred to as scanning. Scanning includes active scanning and passive scanning.

FIG. 5 illustrates a network discovery operation including an active scanning process. In active scanning, the STA that performs scanning transmits a probe request frame to search neighboring APs while moving to channels and waits for a response thereto. A responder transmits a probe response frame in response to the probe request frame to the STA that has transmitted the probe request frame. Here, the responder may be an STA that has finally transmitted a beacon frame in a BSS of a channel that is being scanned. An AP is the responder because the AP transmits the beacon frame in a BSS, and the responder is not fixed in an IBSS because STAs in the IBSS transmit the beacon frame by turns. For example, an STA that has transmitted the probe request frame in channel #1 and received the probe response frame in channel #1 may store BSS related information included in the received probe response frame, move to the next channel (e.g., channel #2) and perform scanning (i.e., probe request/response transmission/reception on channel #2) through the same method.

Although not illustrated in the example of FIG. 5, the scanning operation may be performed in a passive scanning manner. An STA that performs scanning based on passive scanning can wait for a beacon frame while moving to channels. The beacon frame is one of management frames in IEEE 802.11, which signals the presence of a wireless network and is periodically transmitted such that the STA that performs scanning can discover a wireless network and join in the wireless network. An AP periodically transmits the beacon frame in a BSS and STAs transmit the beacon frame by turns in an IBSS. The STA that performs scanning stores information about the BSS included in the beacon frame upon reception of the beacon frame, and records beacon frame information in each channel while moving to other channels. Upon reception of the beacon frame, the STA may store BSS related information included in the beacon frame, and move to the next channel and perform scanning in the next channel through the same method.

Upon discovery of a network, the STA may perform an authentication procedure in step S520. This authentication procedure may be referred to as a first authentication procedure to be clearly distinguished from a security setup operation of step S540 which will be described later. The authentication procedure of step S520 may include a procedure through which the STA transmits an authentication request frame to the AP and the AP transmits an authentication response frame to the STA in response to the authentication request frame. An authentication frame used for request/response corresponds to a management frame.

The authentication frame may include information about an authentication algorithm number, an authentication transaction sequence number, status code, challenge text, an RSN (Robust Security Network), and a finite cyclic group.

The STA can transmit the authentication request frame to the AP. The AP can determine whether to allow authentication of the STA based on the received authentication request frame. The AP can provide an authentication processing result to the STA through the authentication response frame.

The successfully authenticated STA may perform an association procedure based on step S530. The association procedure includes a procedure through which the STA transmits an association request frame to the AP and the AP transmits an association response frame to the STA in response to the association request frame. For example, the association request frame may include information about various capabilities, a beacon listen interval, an SSID (service set identifier), supported rates, supported channels, an RSN, a mobile domain, supported operating classes, a traffic indication map broadcast request, and interworking service capability. For example, the association response frame may include information about various capabilities, status code, an AID (Association ID), supported rates, an EDCA (Enhanced Distributed Channel Access) parameter set, an RCPI (Received Channel Power Indicator), an RSNI (Received Signal to Noise Indicator), a mobile domain, a timeout interval (association comeback time), an overlapping BSS scan parameter, a TIM broadcast response, and a QoS map.

Thereafter, the STA may perform the security setup process in step S540. The security setup process of step S540 may include a private key setup process through 4-way handshaking using an EAPOL (Extensible Authentication Protocol over LAN) frame, for example.

As described above, an STA needs to perform channel sensing prior to transmission and reception in WLAN systems. Channel sensing all the time causes continuous power consumption of the STA. Power consumption in a reception state is not considerably different from power consumption in a transmission state, and maintaining a reception state lays a burden on the STA having limited power (i.e., operating by a battery). Accordingly, if the STA maintains a reception standby state in order to continuously sense channels, the STA inefficiently consumes power without having special advantages in terms of WLAN throughput. To solve this problem, WLAN systems support a power management (PM) mode of the STA.

The power management mode of the STA is divided into an active mode and a power save (PS) mode. The STA operates in the active mode by default. The STA operating in the active mode remains in an awake state. The awake state is a state in which a normal operation such as frame transmission/reception or channel scanning is possible. In the PS mode, the STA operates while switching between a sleep state (or a doze state) and the awake state. In the sleep state, the STA operates with minimum power and does not perform channel scanning as well as frame transmission/reception.

When the STA operates in the sleep state as long as possible, power consumption decreases and thus the operation period of the STA increases. However, the STA cannot unconditionally operate for a long time because frame transmission/reception is impossible in the sleep state. When there is a frame to be transmitted by the STA operating in the sleep state to the AP, the STA can switch to the awake state and transmit the frame. On the other hand, when the AP has a frame to be transmitted to the STA, the STA in the sleep state cannot receive this frame and cannot ascertain the presence of the frame to be received. Accordingly, the STA may need to switch to the awake state at specific intervals in order to ascertain the presence or absence of a frame to be transmitted thereto (in order to receive the frame if it is present).

Figure 6:
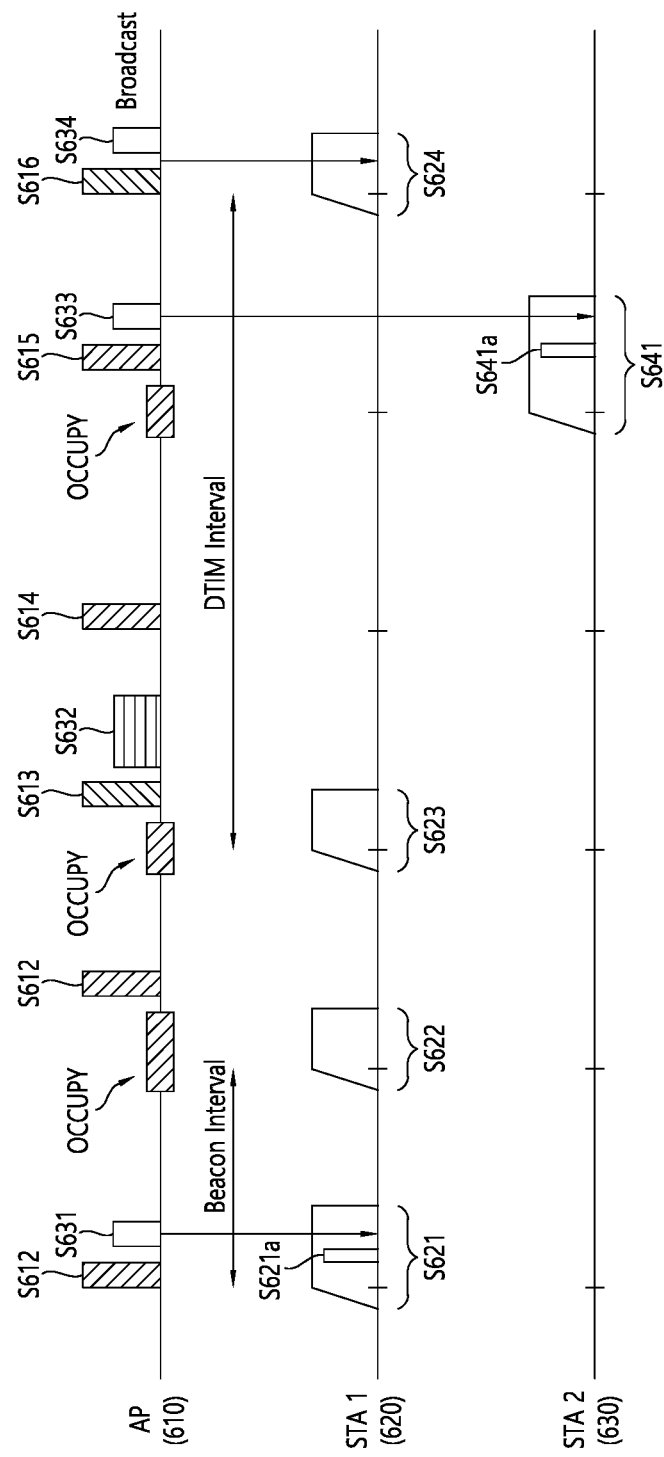
FIG. 6 is a diagram for describing a power management operation.

FIG. 6 is a diagram for describing the power management operation.

Referring to FIG. 6, an AP 610 transmits a beacon frame to STAs in a BSS at specific intervals (S611, S612, S613, S614, S615, S616). The beacon frame includes a TIM (Traffic Indication Map) information element. The TIM information element includes information representing that the AP 610 has buffered traffic for STAs associated therewith and will transmit frames. TIM elements include a TIM used to indicate a unicast frame and a DTIM (delivery traffic indication map) used to indicate a multicast or broadcast frame.

The AP 610 can transmit the DTIM once whenever it transmits three beacon frames. STA1 620 and STA2 622 are STAs operating in the PS modes. STA1 620 and STA2 622 may be configured to switch from the sleep state to the awake state at a predetermined wakeup interval to receive a TIM element transmitted from the AP 610. Each STA can calculate a time at which it switches to the awake state based on a local clock thereof, and it is assumed that the clock of the STA is consistent with the clock of the AP in the example of FIG. 6.

For example, the predetermined wakeup interval may be set such that STA1 620 can switch to the awake state every beacon interval to receive the TIM element. Accordingly, STA1 620 can switch to the awake state (S621) when the AP 610 transmits the first beacon frame (S611). STA1 620 may receive the beacon frame and acquire the TIM element. When the acquired TIM element indicates that there is a frame to be transmitted to STA1 620, STA1 620 can transmit, to the AP 610, a PS-Poll (Power Save-Poll) frame for requesting frame transmission from the AP 610 (S621a). The AP 610 can transmit the frame to STA1 620 in response to the PS-Poll frame (S631). Upon completion of frame reception, STA1 620 switches to the sleep state and operates.

When the AP 610 transmits the second beacon frame, the AP 610 cannot transmit the beacon frame at the correct beacon interval and may transmit the beacon frame at a delayed time due to a busy medium state in which another device is accessing a medium (S612). In this case, STA1 620 switches the operation mode to the awake state at the beacon interval but cannot receive the delayed beacon frame and thus switches to the sleep state (S622).

When the AP 610 transmits the third beacon frame, the beacon frame may include a TIM element set to a DTIM. However, the AP 610 delays the beacon frame and transmits the delayed beacon frame because of a busy medium state (S613).

STA1 620 may switch to the awake state at the beacon interval and acquire the DTIM through the beacon frame transmitted from the AP 610. It is assumed that the DTIM acquired by STA1 620 indicates that a frame to be transmitted to STA1 620 is not present and frames for other STAs are present. In this case, STA1 620 can check absence of a frame to be received thereby and switch to the sleep state. The AP 610 transmits frames to corresponding STAs after beacon frame transmission (S632).

The AP 610 transmits the fourth beacon frame (S614). Since STA1 620 cannot acquire information representing the presence of buffered traffic therefor through previous two-time TIM element receptions, STA1 620 can adjust the wakeup interval for TIM element reception. Alternatively, when the beacon frame transmitted by the AP 610 includes signaling information for adjusting a wakeup interval value of STA1 620, the wakeup interval value of STA1 620 can be adjusted. In this example, STA1 620 may be configured to switch an operating state to receive a TIM element every three beacon intervals instead of switching the operating state to receive a TIM element every beacon interval. Accordingly, STA1 620 remains in the sleep state at a time (S615) at which the AP 610 transmits the fifth beacon frame after transmitting the fourth beacon frame (S614) and thus cannot acquire the TIM element.

When the AP 610 transmits the sixth beacon frame (S616), STA1 620 can switch to the awake state to operate and acquire the TIM element included in the beacon frame (S624). Since the TIM element is the DTIM indicating the presence of a broadcast frame, STA1 620 can receive the broadcast frame transmitted from the AP 610 without transmitting a PS-Poll frame to the AP 610 (S634). Meanwhile, a wakeup interval set for STA2 630 may be longer than that for STA1 620. Accordingly, STA2 630 can switch to the awake state and receive the TIM element at the time (S615) at which the AP 610 transmits the fifth beacon frame (S641). STA2 630 can ascertain the presence of a frame to be transmitted thereto through the TIM element and transmit a PS-Poll frame to the AP 610 to request frame transmission (S641a). The AP 610 can transmit the frame to STA2 630 in response to the PS-Poll frame (S633).

To operate the power save mode as illustrated in FIG. 6, the TIM element includes a TIM indicating the presence of a frame to be transmitted to an STA or a DTIM indicating the presence of a broadcast/multicast frame. The DTIM may be implemented through a field configuration of the TIM element.

As briefly described with reference to FIG. 5, an STA may transmit the association request frame to an AP and the AP may transmit the association response frame to the STA in response thereto. Both the association request frame and the association response frame correspond to management frames. The association request frame may include information such as capability of the STA and SSID. The association response frame may include information such as capability of the AP and, particularly, include an association ID (AID) allocated to an STA that request association.

A method for maintaining association proposed in the specification includes not only a method for preventing association between an STA and an AP from being destroyed but also a method for reducing a time taken for an association process when an STA reassociates with an AP in a case where the STA fails to associate with the AP. Here, situations in which the STA fails to associate with the AP may include a case in which power supply to the STA is instantaneously stopped, a case in which the STA exits the service coverage of the associated AP due to handover of the STA, and the like, for example.

The STA recovered from such failure performs the scanning process again and transmits the association request frame to an AP selected through scanning. Here, if the AP selected through scanning is an AP already associated with the STA, the AP needs to check whether the STA is a correctly authenticated user. Accordingly, if the STA that has transmitted the association request frame to the AP maintains a security association (SA) state with respect to the AP, the AP performs an SA query procedure prior to response representing that the association request is successful to the newly received association request frame.

The SA query procedure may be regarded as a procedure for checking that an STA is in an SA state with respect to an AP when the association request frame is received from the STA in the SA state with respect to the AP.

Specifically, the AP transmits the association response frame to the STA in response to the association request frame upon reception of the association request frame from the STA. Here, a status code field value of the association response frame may be set to 30. The status code field value 30 means that "Association request rejected temporarily; try again later". In addition, an association comeback time is designated for the STA through a timeout interval field of the association response frame. The STA for which an association comeback time value has been designated can retransmit the association request frame to the AP after the elapse of the association comeback time. The association comeback time may be set to 1 second as a default value.

After the AP rejects the association request frame of the STA, the AP can exchange SA query request/response frames with the STA with which the AP maintains the SA state for the association comeback time. Exchange of the SA query request/response frames may be performed to determine whether the SA state stored in the AP is normal or invalid.

The AP may transmit the SA query request frame to the STA. Upon reception of the SA query request frame, the STA may transmit the SA query response frame to the AP in order to notify the AP that the SA state is normal. Both the SA query request frame and the SA query response frame correspond to protected management frames.

Figure 7:
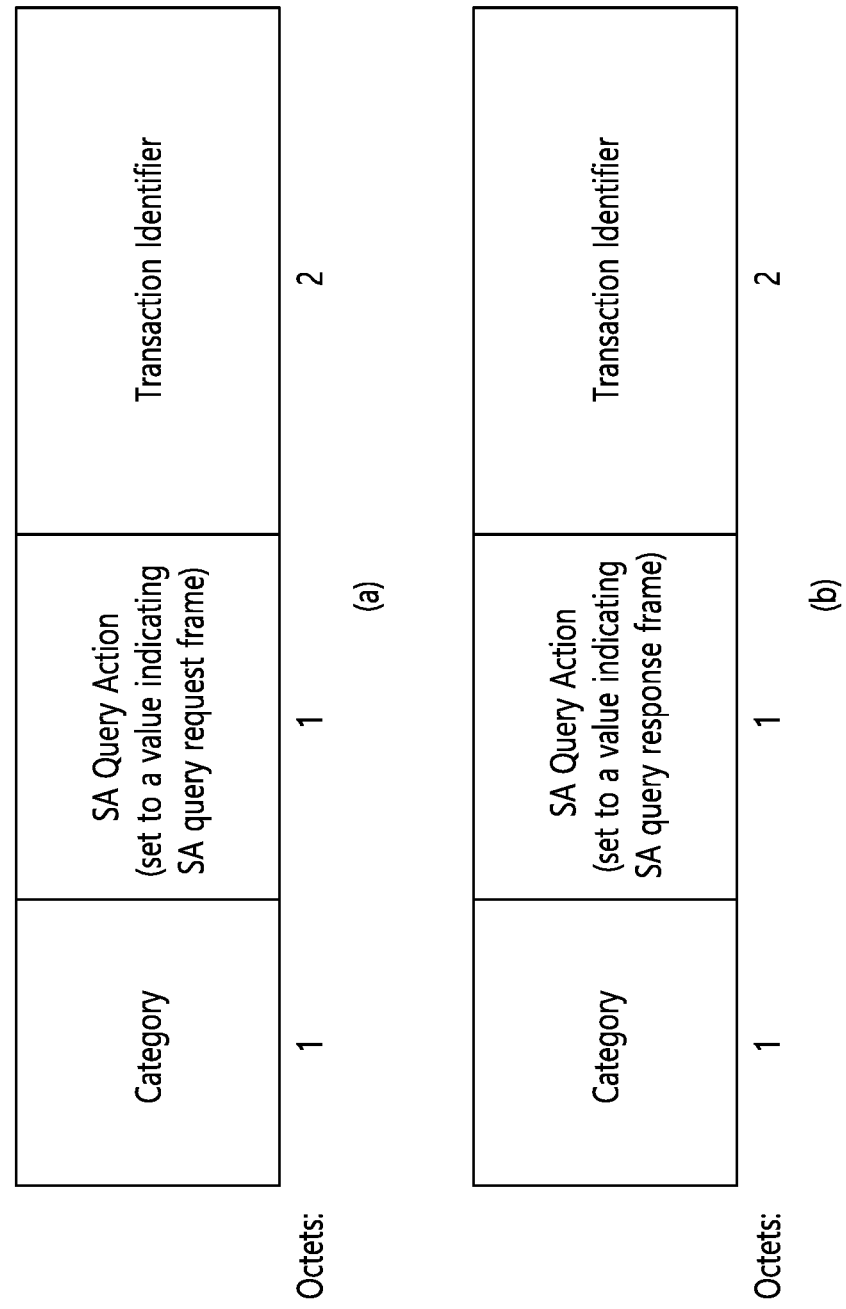
FIG. 7 is a diagram illustrating exemplary formats of a security association (SA) query request frame and a security association (SA) query response frame.

FIG. 7 is a diagram illustrating exemplary formats of the SA query request frame and the SA query response frame.

FIG. 7(a) illustrates an exemplary format of the SA query request frame.

A category field may be set to a value (e.g., 8) indicating an SA query category. An SA query action field may be set to a value (e.g., 0) indicating the SA query request frame. A transaction identifier field is used to identify an SA query request/response transaction. A transaction identifier value may be set by a side (e.g., an AP) that transmits the SA query request frame and may be set to a 16-bit non-negative counter value.

FIG. 7(b) illustrates an exemplary format of the SA query response frame.

A category field may be set to a value (e.g., 8) indicating an SA query category. An SA query action field may be set to a value (e.g., 1) indicating the SA query response frame. A transaction identifier field is set to the same value as the transaction identifier field value included in the corresponding SA query request frame.

If an AP does not receive a valid SA query response from an STA for a predetermined time (e.g., a time period set by a value of dot11 AssociationSAQueryMaximumTimeout parameter) after transmission of the SA query request frame, the AP does not perform the SA query procedure on association request frames received thereafter.

Figure 8:
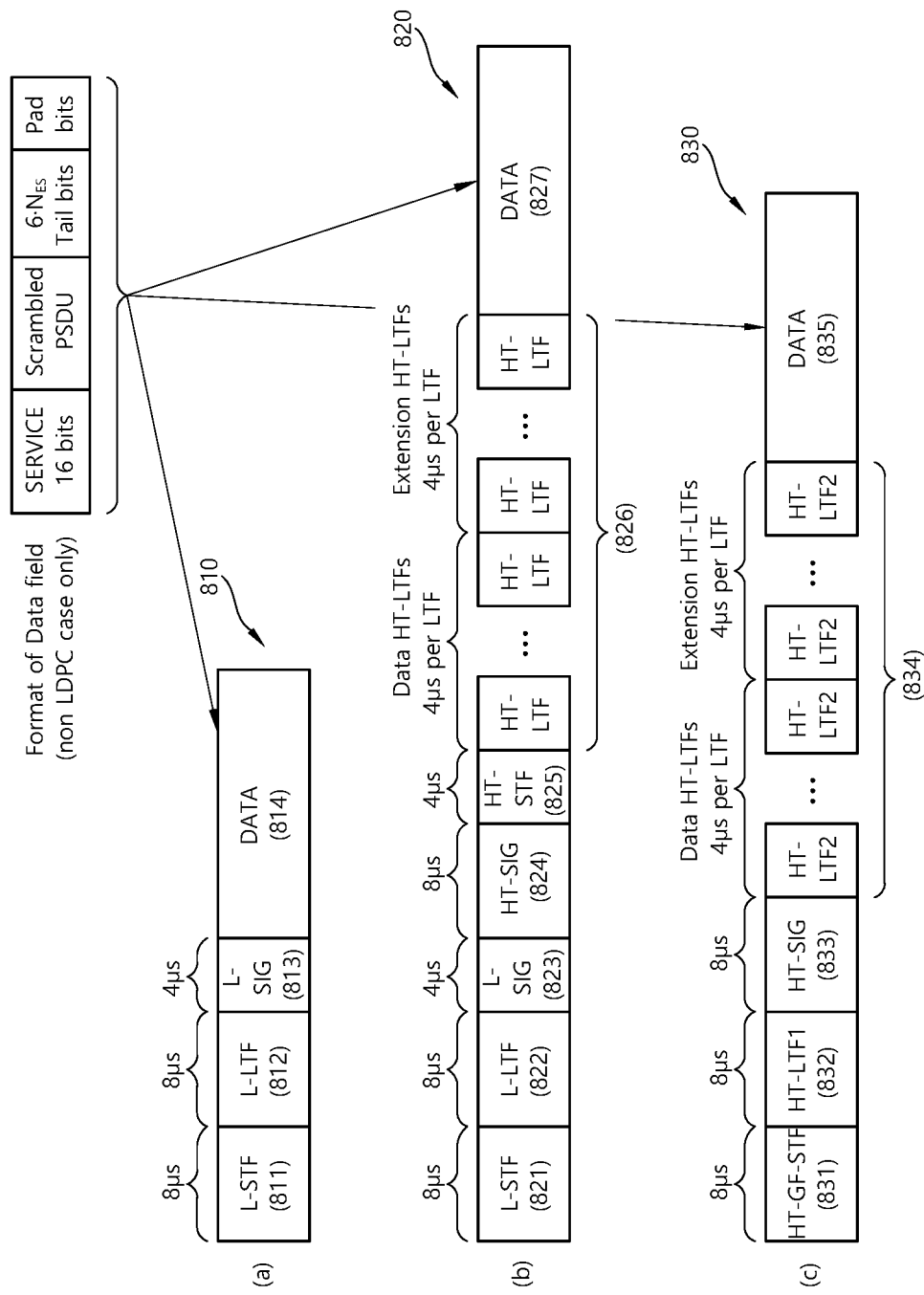
FIGS. 8 and 9 are block diagrams illustrating a PPDU format used in a WLAN system to which embodiments of the present disclosure are applicable.
Figure 9:
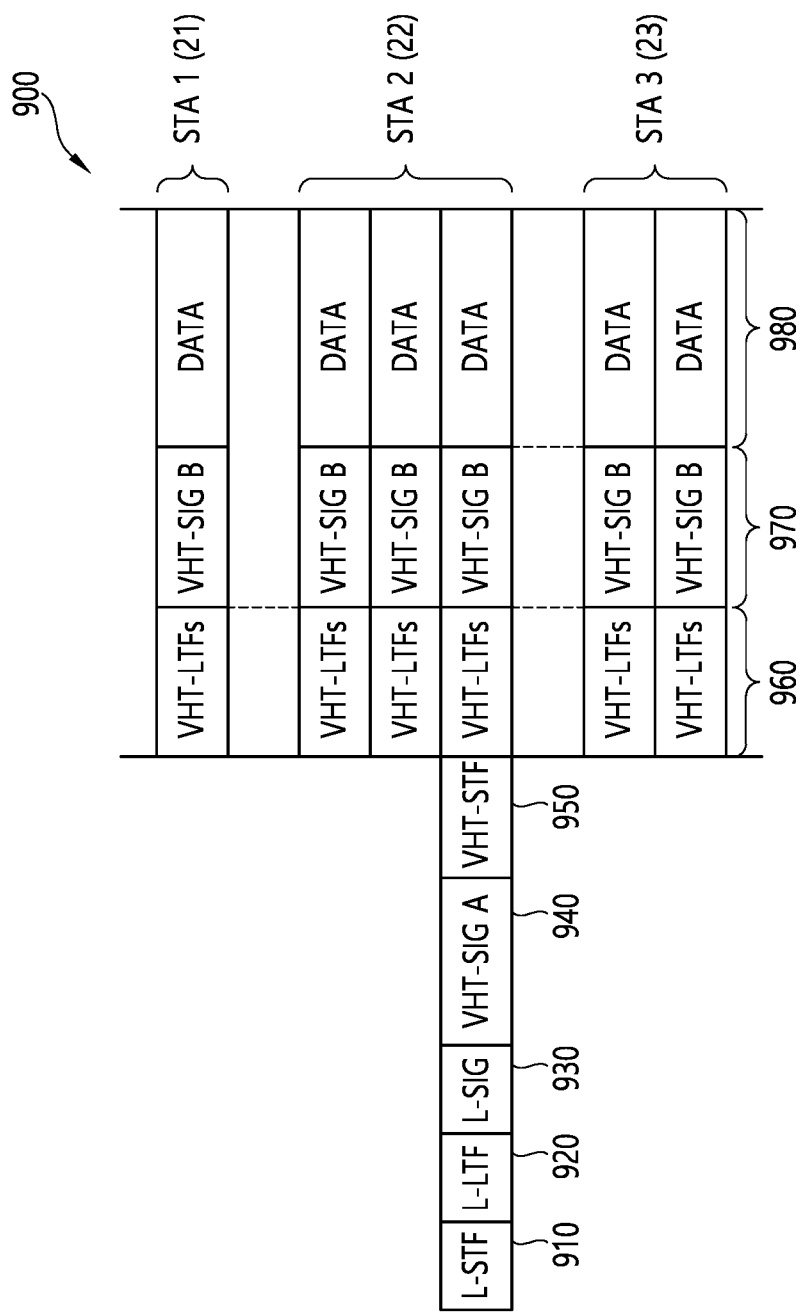

FIG. 8 and FIG. 9 are block diagrams illustrating PPDU formats used in WLAN systems to which embodiments of the present disclosure are applicable.

Hereinafter, an STA operating in legacy WLAN systems based on IEEE 802.11a/b/g that is the legacy WLAN standard before IEEE 802.11n will be referred to as a legacy STA (L-STA). In addition, an STA capable of supporting HT in an HT WLAN system based on IEEE 802.11n will be referred to as an HT-STA.

The subfigure (a) of FIG. 8 illustrates a format of a legacy PPDU (L-PPDU) that is a PPDU used in IEEE 802.11a/b/g that is the legacy WLAN system standard before IEEE 802.11n. Accordingly, a legacy STA (L-STA) can transmit/receive an L-PPDU having such a format in an HT WLAN system to which the IEEE 802.11n standard is applied. Referring to the subfigure (a), an L-PPDU 810 includes an L-STF 811, an L-LTF 812, an L-SIG field 813, and a data field 814.

The L-STF 811 is used for frame timing acquisition, AGC (Automatic Gain Control) convergence, and coarse frequency acquisition.

The L-LTF 812 is used for frequency offset and channel estimation.

The L-SIG field 813 includes information for demodulating and decoding the data field 814.

The L-PPDU may be transmitted in the order of the L-STF 811, the L-LTF 812, the L-SIG field 813, and the data field 814.

The subfigure (b) is a block diagram of an HT-mixed PPDU format that allows coexistence of an L-STA and an HT-STA. Referring to the subfigure (b), an HT-mixed PPDU 820 includes an L-STF 821, an L-LTF 822, an L-SIG field 823, an HT-SIG field 824, an HT-STF 825, and a plurality of HT-LTFs 826, and a data field 827.

The L-STF 821, the L-LTF 822, and the L-SIG field 823 are the same as those denoted by reference numerals 811, 812, and 813 of the subfigure (a). Accordingly, an L-STA can decode the data field through the L-LTF 822, the L-LTF 822, and the L-SIG 823 even when the L-STA receives the HT-mixed PPDU 820. However, the L-LTF field 823 may further include information for channel estimation to be performed by an HT-STA to receive the HT-mixed PPDU 820 and decode the L-SIG field 823, the HT-SIG 824, and the HT-STF 825.

The HT-STA can ascertain that the HT-mixed PPDU 820 is a PPDU for the HT-STA through the HT-SIG 824 following the L-SIG 823 and demodulate and decode the data field 827 based on the HT-mixed PPDU 820.

The HT-STF 825 can be used for frame timing synchronization and AGC convergence for the HT-STA.

The HT-LTF 826 can be used for channel estimation for demodulation of the data field 827. Since IEEE 802.11n supports SU-MIMO, a plurality of HT-LTFs 826 for channel estimation may be configured for respective data fields transmitted through a plurality of spatial streams.

The HT-LTF 826 may be composed of data HT-LTF used for channel estimation with respect to spatial streams, and extension HT-LTF additionally used for full channel sounding. Accordingly, the number of the plurality of HT-LTFs 826 may be equal to or greater than the number of transmitted spatial streams.

The L-STF 821, the L-LTF 822, and the L-SIG field 823 in the HT-mixed PPDU 820 are transmitted first such that an L-STA can also receive the HT-mixed PPDU 820 to acquire data. Thereafter, the HT-SIG field 824 for demodulation and decoding of data transmitted for the HT-STA is transmitted.

The L-STF 821, the L-LTF 822, the L-SIG field 823, and the HT-SIG field 824 are transmitted without being subjected to beamforming such that the L-STA and the HT-STA can receive the corresponding PPDU to acquire data. For the subsequently transmitted HT-STF 825, HT-LTF 826 and data field 827, RF signal transmission through precoding is performed. Here, the HT-STF 825 is transmitted such that a receiving STA considers power variation due to precoding, and then the plurality of HT-LTFs 826 and the data field 827 are transmitted.

Even though an HT-STA that uses 20 MHz in an HT WLAN system uses 52 data subcarriers per OFDM symbol, an L-STA using the same 20 MHz still uses 48 data subcarriers per OFDM symbol. Since the HT-SIG field 824 is decoded using the L-LTF 822 in the format of the HT-mixed PPDU 820 in order to support backward compatibility, the HT-SIG field 824 is composed of 48×2 data subcarriers. The HT-STF 825 and the HT-LTF 826 are composed of 52 data subcarriers per OFDM symbol. Consequently, the HT-SIG field 824 is supported by ½, BPSK Binary Phase Shift Keying, and thus each HT-SIG field 824 is 24 bits so that the HT-SIG field 824 is transmitted using a total of 48 bits. That is, channel estimation for the L-SIG field 823 and the HT-SIG field 824 uses the L-LTF 822 and a bit string constituting the L-LTF 822 will be described later. The L-LTF 822 is composed of 48 data subcarriers except a DC subcarrier per symbol.

The subfigure (c) is a block diagram illustrating a format of an HT-Greenfield PPDU 830 that can be used only by HT-STAs. Referring to the subfigure (c), the HT-GF PPDU 830 includes an HT-GF-STF 831, HT-LTF1 832, an HT-SIG field 833, a plurality of HT-LTF2 834, and a data field 835.

The HT-GF-STF 831 is used for frame timing acquisition and AGC.

The HT-LTF1 832 is used for channel estimation.

HT-SIG 833 is used for demodulation and decoding of the data field 835.

The HT-LTF2 834 is used for channel estimation for demodulation of the data field 835. Since HT-STAs use SU-MIMO and thus require channel estimation for respective data fields transmitted through a plurality of spatial streams, a plurality of HT-LTFs 826 may be configured.

The plurality of HT-LTF2 834 may include a plurality of data HT-LTFs and a plurality of extension HT-LTFs like the HT-LTF 826 of the HT-mixed PPDU 820.

Each of the data fields 814, 827, and 835 illustrated in the subfigures (a), (b), and (c) may include a service field, a scrambled PSDU, tail bits, and padding bits. The service field can be used to initialize a scrambler. The service field can be set to 16 bits. In this case, bits for scrambler initialization may be 7 bits. A tail field may be configured as a bit sequence necessary to return a convolution encoder to a zero state. A bit size in proportion to the number of binary convolutional code (BCC) encoders used to encode data to be transmitted can be allocated to the tail field. More specifically, the tail field may be implemented such that it has 6 bits per BCC.

FIG. 9 is a diagram illustrating an example of a PPDU format used in WLAN systems supporting VHT.

Referring to FIG. 9, a PPDU 900 may include an L-STF 910, an L-LTF 920, an L-SIG field 930, a VHT-SIGA field 940, a VHT-STF 950, a VHT-LTF 960, a VHT-SIGB field 970, and a data field 980.

A PLCP sublayer constituting PHY adds necessary information to a PSDU received from the MAC layer to convert the PSDU into the data field 980, adds the L-STF 910, the L-LTF 920, the L-SIG field 930, the VHT-SIGA field 940, the VHT-STF 950, the VHT-LTF 960, and the VHT-SIGB 970 thereto to generate the PPDU 900, and transmits the PPDU to one or more STAs through a PMD sublayer constituting PHY. Control information necessary for the PLCP sublayer to generate the PPDU and control information included in the PPDU, transmitted and used for a receiving STA to analyze the PPDU are provided from TXVECTOR parameter transmitted from the MAC layer.

The L-STF 910 is used for frame timing acquisition, AGC (Automatic Gain Control) convergence, and coarse frequency acquisition.

The L-LTF 920 is used for channel estimation for demodulation of the L-SIG field 930 and the VHT-SIGA field 940.

The L-SIG field 930 is used for an L-STA to receive the PPDU 900 and analyze the PPDU 900 to acquire date. The L-SIG field 930 includes a rate subfield, a length subfield, a parity bit, and a tail field. The rate subfield is set to a value indicating a bit rate for data to be currently transmitted.

The length subfield is set to a value indicating an octet length of a PSDU requested by the MAC layer to be transmitted from the PHY layer. Here, L_LENGTH parameter that is a parameter with respect to information on the octet length of the PSDU is determined based on TXTIME parameter that is a parameter with respect to a transmission time. TXTIME represents a transmission time determined by the PHY layer for transmission of a PPDU including PSDU (physical service data unit) in response to a transmission time requested by the MAC layer for transmission of the PSDU. Accordingly, the L_LENGTH parameter is a parameter related to time, and thus the length subfield included in the L-SIG field 930 includes information related to a transmission time.

The VHT-SIGA field 940 includes control information (or signal information) necessary for STAs that receive the PPDU to analyze the PPDU 900. The VHT-SIGA field 940 is transmitted through two OFDM symbols. Accordingly, the VHT-SIGA field 940 can be divided into a VHT-SIGA1 field and a VHT-SIGA2 field. The VHT-SIGA1 field includes information on a channel bandwidth used for PPDU transmission, identification information about whether STBC (Space Time Block Coding) is used, information indicating SU-MIMO or MU-MIMO used for PPDU transmission, information indicating a transmission target STA group including a plurality of STAs that is MU-MIMO-paired with an AP if the transmission method is MU-MIMO, and information about spatial streams allocated to the respective STAs included in the transmission target STA group. The VHT-SIGA2 field includes short guard interval (GI) related information.

The information indicating a MIMO transmission method and the information indicating the target transmission STA group may be implemented as a single piece of MIMO indication information. For example, they can be implemented as a group ID. The group ID may be set to values in a specific range. A specific value in the range may indicate the SU-MIMO transmission method and other values may be used as an ID for the transmission target STA group when the PPDU 900 is transmitted using the MU-MIMO transmission method.

When the group ID indicates that the PPDU 900 is transmitted through the SU-MIMO transmission method, the VHT-SIGA2 field includes coding indication information indicating whether a coding scheme applied to a data field is BCC (Binary Convolution Coding) or LDPC (Low Density Parity Check) coding, and information on an MCS (modulation coding scheme) for a channel between a transmitter and a receiver. In addition, the VHT-SIGA2 field may include an AID of a transmission target STA of the PPDU and/or a partial AID including some bit sequences of the AID.

When the group ID indicates that the PPDU 900 is transmitted through the MU-MIMO transmission method, the VHT-SIGA field 940 includes coding indication information indicating whether a coding scheme applied a data field intended to be transmitted to MU-MIMO-paired STAs is BCC or LDPC coding. In this case, MCS (modulation coding scheme) information for each receiving STA may be included in the VHT-SIGB field 970.

The VHT-STF 950 is used to improve AGC estimation performance in MIMO transmission.

The VHT-LTF 960 is used for an STA to estimate a MIMO channel. Since VHT WLAN systems support MU-MIMO, as many VHT-LTFs 960 as the number of spatial streams through which the PPDU 900 is transmitted can be set. Additionally, full channel sounding is supported, and when this is performed, the number of VHT LTFs may increase.

The VHT-SIGB field 970 includes dedicated control information necessary for a plurality of MIMO-paired STAs to receive the PPDU 900 and acquire data. Accordingly, STAs may be designed such that they decode the VHT-SIGB field 970 only when the control information included in the VHT-SIGA field 940 indicates that the currently received PPDU 900 has been transmitted through MU-MIMO. On the other hand, STAs may be designated such that they do not decode the VHT-SIGB field 970 when the control information included in the VHT-SIGA field 940 indicates that the currently received PPDU 900 is for a single STA (including SU-MIMO).

The VHT-SIGB field 970 may include information about an MCS (modulation and coding scheme) and information about rate-matching with respect to each STA. In addition, the VHT-SIGB field 970 may include information indicating a PSDU length included in a data field for each STA. The information indicating the PSDU length indicates the length of a bit sequence of a PSDU and can indicate the length in octets. Meanwhile, when the PPDU is transmitted through SU-MIMO, the information about the MCS is included in the VHT-SIGA field 940 and thus may not be included in the VHT-SIGB field 970. The size of the VHT-SIGB field 970 may depend on a MIMO type (MU-MIMO or SU-MIMO) and a channel bandwidth used for PPDU transmission.

The data field 980 includes data intended to be transmitted to an STA. The data field 980 includes a service field for initializing a PSDU (PLCP Service Data Unit) carrying an MPDU (MAC Protocol Data Unit) in the MAC layer and a scrambler, a tail field including a bit sequence necessary to return a convolution encoder to a zero state, and padding bits for standardizing the length of the data field. In the case of MU transmission, the data field 980 transmitted to each STA may include a data unit intended to be transmitted, and the data unit may be an A-MPDU (aggregate MPDU).

Figure 10:
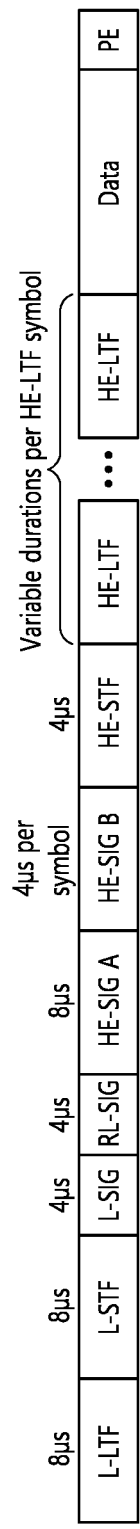
FIG. 10 is a diagram illustrating an example of an HE PPDU.

FIG. 10 is a diagram illustrating an example of an HE PPDU.

A control information field proposed in the present embodiment may be HE-SIG-B included in the HE PPDU illustrated in FIG. 10. The HE PPDU in FIG. 10 is an example of a PPDU for multiple users, HE-SIG-B is included only in the HE PPDU for multiple users and may be omitted in a PPDU for a single user.

As illustrated, the HE-PPDU for multiple users (MU) may include an L-STF (legacy-short training field), an L-LTF (legacy-long training field), an L-SIG (legacy-signal) field, an HE-SIG-A (high efficiency-signal A) field, an HE-SIG-B (high efficiency-signal-B) field, an HE-STF (high efficiency-short training field), an HE-LTF (high efficiency-long training field), a data field (or MAC payload), and a PE (Packet Extension) field. Each field can be transmitted for an illustrated time period (i.e., 4 or 8 μs).

The illustrated L-STF may include a short training orthogonal frequency division multiplexing (OFDM) symbol. The L-STF may be used for frame detection, AGC (automatic gain control), diversity detection, and coarse frequency/time synchronization.

The L-LTF may include a long training orthogonal frequency division multiplexing (OFDM) symbol. The L-LTF may be used for fine frequency/time synchronization and channel prediction.

The L-SIG may be used to transmit control information. The L-SIG may include information about a data rate and a data length. In addition, the L-SIG may be repeatedly transmitted. That is, the L-SIG may be configured in a repeated format (which may be called R-LSIG, for example).

The HE-SIG-A may include control information common for reception stations.

Specifically, the HE-SIG-A may include information about 1) a DL/UL indicator, 2) a BSS color field that is a BSS identifier, 3) a field indicating a remaining time of the current TXOP period, 4) a bandwidth field indicating 20, 40, 80, 160, or 80+80 MHz, 5) a field indicating an MCS scheme applied to HE-SIG-B, 6) a field indicating whether the HE-SIG-B is modulated through dual subcarrier modulation for MCS, 7) a field indicating the number of symbols used for the HE-SIG-B, 8) a field indicating whether the HE-SIG-B is generated over an entire band, 9) a field indicating the number of symbols of the HE-LTF, 10) a field indicating the length of the HE-LTF and a CP length, 11) a field indicating whether additional OFDM symbols are present for LDPC coding, 12) a field indicating control information about PE (Packet Extension), and 13) a field indicating information about a CRC field of the HE-SIG-A. These specific fields of the HE-SIG-A may be added or some thereof may be omitted. In addition, some fields may be added to or omitted from the HE-SIG-A in environments other than the MU environment.

Furthermore, the HE-SIG-A may be composed of two parts of HE-SIG-A1 and HE-SIG-A2.

As described above, the HE-SIG-B may be included only in a PPDU for multiple users (MU). Basically, the HE-SIG-A or the HE-SIG-B may include resource allocation information (or virtual resource allocation information) for at least one receiving STA.

Figure 11:
FIG. 11 is a block diagram illustrating a format of a MAC frame provided in a WLAN system.

FIG. 11 is a block diagram illustrating a format of a MAC frame provided in WLAN systems. The MAC frame may be an MPDU (PSDU when transmitted through the PHY layer) included in the data field of the aforementioned PPDU.

Referring to FIG. 11, the MAC frame 1100 includes a frame control field 1110, a duration/ID field 1120, address 1 field 1131, address 2 field 1132, address 3 field 1133, a sequence control field 1140, address 4 field 1134, a QoS control field 1150, an HT control field 1160, a frame body 1170, and a frame check sequence (FCS) field 1180.

The frame control field 1110 includes information about frame properties. A more detailed structure of the frame control field 1110 will be described with reference to FIG. 12.

The duration/ID field 1120 may be implemented such that it has different values depending on types and subtypes of the frame 1100. When the type and subtype of the frame 1100 are a PS-poll frame for power save operation, the duration/ID field 1120 may be configured to include an AID of an STA that has transmitted the frame 1100. In other cases, the duration/ID field 1120 may be configured to have a specific duration value in response to the type and subtype of the frame 1100. When the frame 1100 is an MPDU included in an A-MPDU format, the duration/ID fields 1120 included in MAC headers of MPDUs may have the same value.

Address 1 field to address 4 field 1131 to 1134 may be configured to implement specific fields among a BSSID field indicating a BSSID, a source address (SA) field indicating an SA, a destination address (DA) field indicating a DA, a transmitting address (TA) field indicating a transmitting STA address, and a receiving address field indicating a receiving STA address. Meanwhile, an address field implemented as a TA field may be set to a bandwidth signaling TA value. In this case, the TA field can indicate that the frame includes additional information in a scrambling sequence. Although the bandwidth signaling TA may be represented as a MAC address of an STA that transmits the corresponding frame, an individual/group bit included in the MAC address may be set to a specific value, for example, "1".

The sequence control field 1140 is configured to include a sequence number and a fragment number. The sequence number can indicate a sequence number allocated to the frame 1100. The fragment number can indicate a number of each fragment of the frame 1100.

The QoS control field 1150 includes information about QoS.

The HT control field 1160 includes control information related to a high throughput (HT) transmission/reception method and/or a very high throughput (VHT) transmission/reception method. Implementation of the HT control field 1160 will be described in more detail below.

The frame body 1170 may include data to be transmitted by a transmitting STA and/or an AP. A body component except a MAC header and an FCS in a control frame, a management frame, an action frame, and/or data frame to be transmitted may be implemented in the frame body 1170. When the frame 1100 is a management frame and/or an action frame, information elements included in the management frame and/or the action frame can be implemented in the frame body 1170.

The FCS field 1180 includes a bit sequence for CRC.

Figure 12:
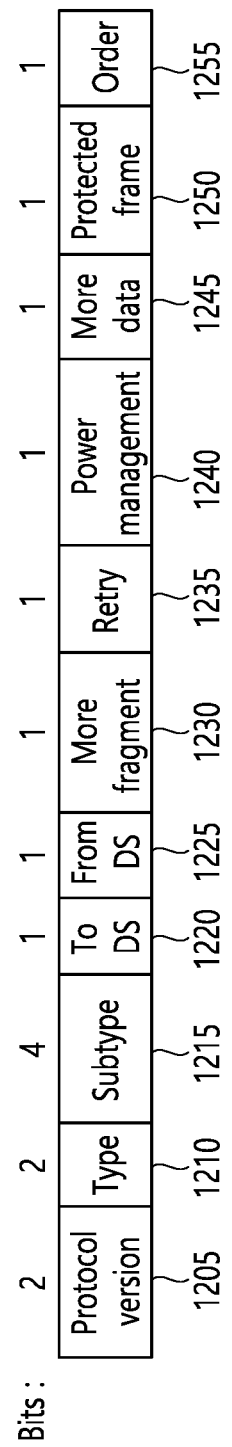
FIG. 12 is a block diagram illustrating an example of a frame control field format of a MAC frame.

FIG. 12 is a block diagram illustrating an example of a frame control field format of the MAC frame.

Referring to FIG. 12, the frame control field includes a protocol version subfield 1205, a type subfield 1210, a subtype subfield 1215, a To DS subfield 1220, a From DS subfield 1225, a more fragment subfield 1230, a retry subfield 1235, a power management subfield 1240, a more data subfield 1245, a protected frame subfield 1250, and an order subfield 1255.

The protocol version subfield 1205 may be configured to indicate the version of a WLAN protocol applied to the corresponding MAC frame.

The type subfield 1210 and the subtype subfield 1215 may be configured to indicate information for identifying a function of the frame including the frame control field 1200.

The more fragment subfield 1230 may be configured to indicate whether there is a fragment to be transmitted following the corresponding MAC frame.

The retry subfield 1235 may be configured to indicate whether the corresponding MAC frame is caused by retransmission of a previous frame.

The power management subfield 1240 may be configured to indicate a power management mode of an STA.

The more data subfield 1245 may be configured to indicate whether there is a frame to be additionally transmitted.

The protected frame subfield 1250 may be configured to include information indicating whether the frame body has been processed by an encoding encapsulation algorithm.

In the MAC frame format as illustrated in FIG. 11, the four address fields may be configured to implement the BSSID field, the SA field, the DA field, the TA field, and the RA field, as described above. Meanwhile, the four address fields may be implemented differently according to configurations of the To DS subfield and the From DS subfield of the frame control field.

Hereinafter, a resource unit (RU) used in the PPDU will be described. The RU may include a plurality of subcarriers (or tones). The RU may be used in the case of transmitting signals to multiple STAs based on the OFDMA technique. Also, the RU may be defined even when a signal is transmitted to one STA. The RU may be used for STF, LTF, data field, and the like.

Figure 13:
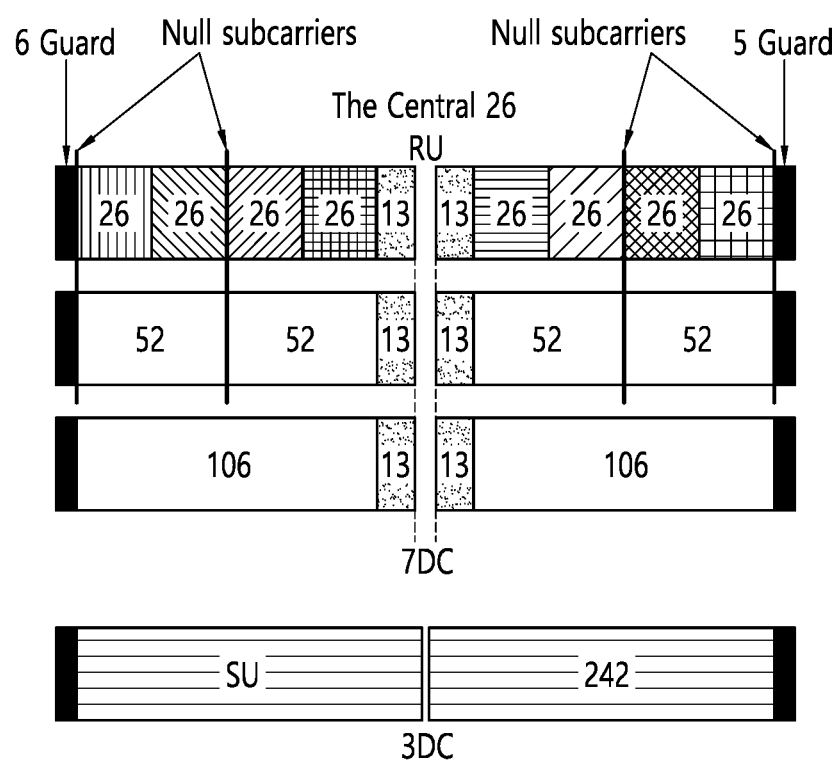
FIG. 13 illustrates a layout of resource units (RUs) used in a 20 MHz band.

FIG. 13 illustrates a layout of resource units (RUs) used in a band of 20 MHz.

As illustrated in FIG. 13, resource units (RUs) corresponding to different numbers of tones (i.e., subcarriers) may be used to form some fields of an HE-PPDU. For example, resources may be allocated in illustrated RUs for an HE-STF, an HE-LTF, and a data field.

As illustrated in the uppermost part of FIG. 13, a 26-unit (i.e., a unit corresponding to 26 tones) may be disposed. Six tones may be used for a guard band in the leftmost band of the 20 MHz band, and five tones may be used for a guard band in the rightmost band of the 20 MHz band. Further, seven DC tones may be inserted in a center band, that is, a DC band, and a 26-unit corresponding to 13 tones on each of the left and right sides of the DC band may be disposed. A 26-unit, a 52-unit, and a 106-unit may be allocated to other bands. Each unit may be allocated for a receiving STA, that is, a user.

The layout of the RUs in FIG. 13 may be used not only for a multiple users (MUs) but also for a single user (SU), in which case one 242-unit may be used and three DC tones may be inserted as illustrated in the lowermost part of FIG. 13.

Although FIG. 13 proposes RUs having various sizes, that is, a 26-RU, a 52-RU, a 106-RU, and a 242-RU, specific sizes of RUs may be extended or increased. Therefore, the present embodiment is not limited to the specific size of each RU (i.e., the number of corresponding tones).

Figure 14:
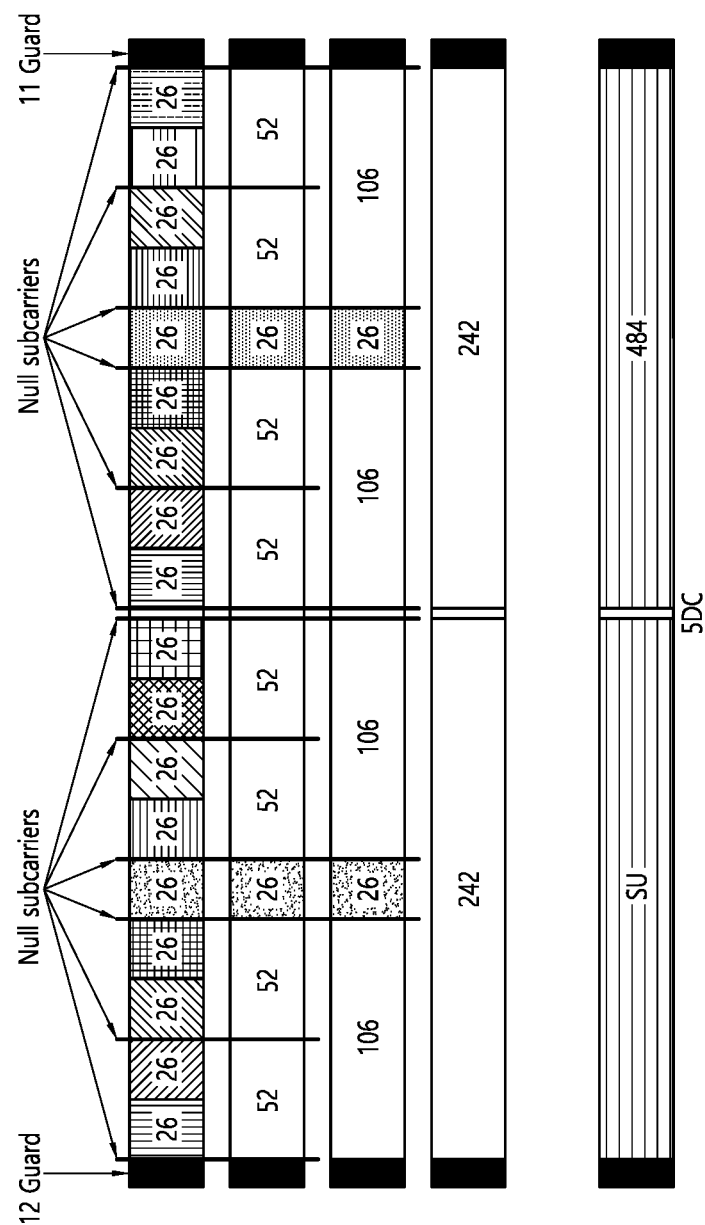
FIG. 14 illustrates a layout of RUs used in a 40 MHz band.

FIG. 14 illustrates a layout of RUs used in a band of 40 MHz.

Similarly to FIG. 13 in which RUs having various sizes are used, a 26-RU, a 52-RU, a 106-RU, a 242-RU, a 484-RU, and the like may be used in an example of FIG. 9. Further, five DC tones may be inserted in a center frequency, 12 tones may be used for a guard band in the leftmost band of the 40 MHz band, and 11 tones may be used for a guard band in the rightmost band of the 40 MHz band.

As illustrated, when the layout of the RUs is used for a single user, a 484-RU may be used. The specific number of RUs may be changed similarly to FIG. 13.

Figure 15:
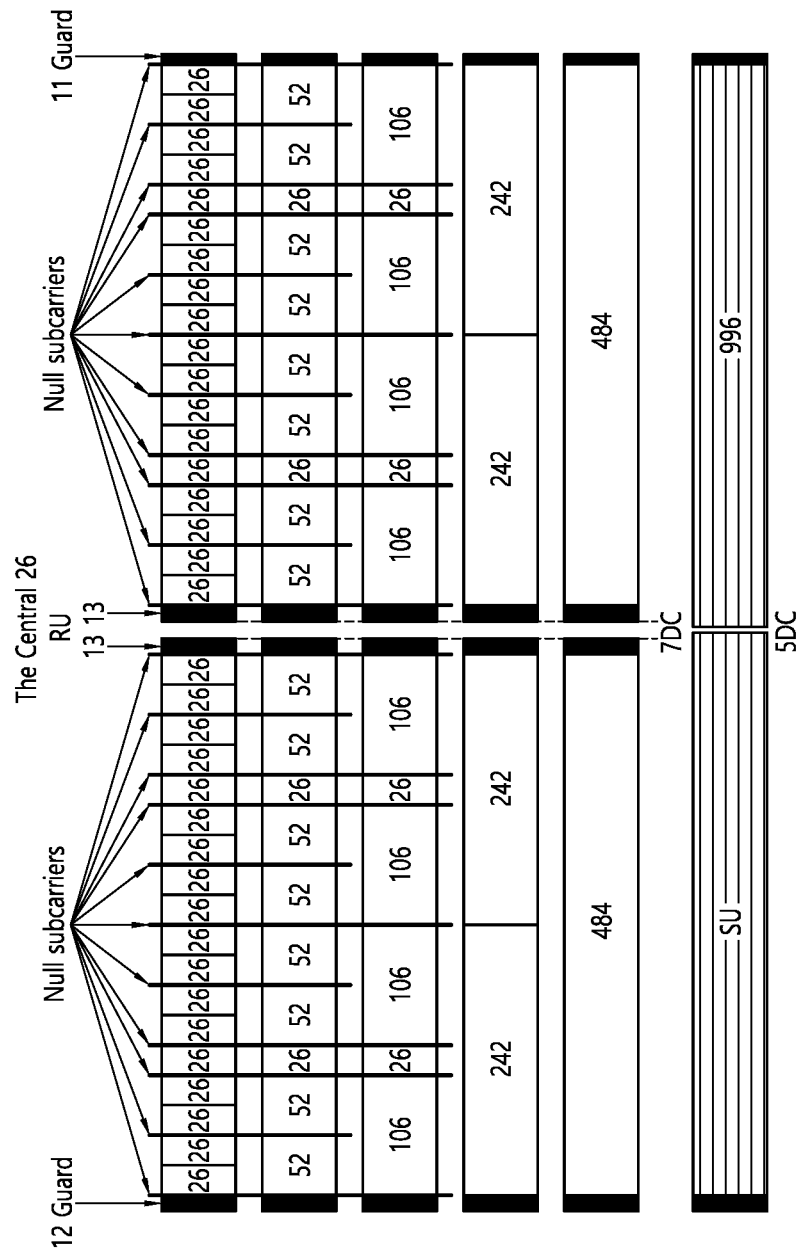
FIG. 15 illustrates a layout of RUs used in an 80 MHz band.

FIG. 15 illustrates a layout of RUs used in a band of 80 MHz.

Similarly to FIG. 13 and FIG. 14 in which RUs having various sizes are used, a 26-RU, a 52-RU, a 106-RU, a 242-RU, a 484-RU, a 996-RU, and the like may be used in an example of FIG. 6. Further, seven DC tones may be inserted in the center frequency, 12 tones may be used for a guard band in the leftmost band of the 80 MHz band, and 11 tones may be used for a guard band in the rightmost band of the 80 MHz band. In addition, a 26-RU corresponding to 13 tones on each of the left and right sides of the DC band may be used.

As illustrated, when the layout of the RUs is used for a single user, a 996-RU may be used, in which case five DC tones may be inserted.

The specific number of RUs may be changed similarly to FIG. 13 and FIG. 14.

In the conventional 11ax, a tone plan for full band and OFDMA transmission is designed at 20/40/80/80+80/160 MHz, and a 160 MHz tone plan is used by simply repeating the existing 80 MHz tone plan two times. This is designed by considering a case of performing transmission based on two RFs. And, therefore, this may be an appropriate tone plan for a case of non-contiguous 80+80 MHz. However, in a case of contiguous 160 MHz, a situation where transmission is performed by using one RF may be considered. And, in this case, since a large number of subcarriers are wasted in the existing (or conventional) tone plan, a new tone plan for increasing efficiency and throughput of the subcarriers that are being used may be proposed.

1. New 160 MHz Tone Plan
<Full Band>

In case of performing transmission by using a full band, a new RU may be proposed, and a size of the new RU may be determined by considering various DCs in accordance with an influence of a DC offset and by considering a 160 MHz Guard tone of the conventional 11ax.

The existing 11ax guard tones are left 12 and right 11, and the number of DCs of 80 MHz is equal to 5 or 7. Based on this structure, the new RU of a full band is 2020RU or 2018RU.

12/11 guard tone, 5DC, 2020RU
12/11 guard tone, 7DC, 2018RU

Considering the influence of the DC offset at 160 MHz, it is not preferable to use less than 5/7 DCs, which is the number(s) of DCs used at 80 MHz, and 5/7 DCs may be sufficient in light of performance (or capability). Considering the following OFDMA tone plan, a maximum of 7 DCs may be appropriate. The DCs in the OFDMA tone plan shown below are designed based on 7DC and 5DC in the existing 80 MHz OFDMA tone plan. And, it is not preferable to use DCs that are less than 5 DCs, and, in light of performance, 5/7 DCs may be sufficient. 7DC is used at 20 MHz and 80 MHz, wherein central 26RU (13+13 RUs) is used in the existing 11ax.

<OFDMA Tone Plan>

The OFDMA tone plan may be expressed by using the existing 996RU and 26RU (13+13 RUs) as shown below. In the following structure, G denotes guard tone, and N denotes null tone.

12$G$+996RU+13RU+7DC+13RU+996RU+11$G$

12$G$+996RU+1$N$+13RU+5DC+13RU+1$N$+996RU+11$G$

In the structures presented above, the number of DCs and the number of null subcarriers on both sides may be configured by the performance of the central 26RU (13+13 RUs) according to the influence of the DC offset and interference. Considering the influence of interference, 5 DCs and 1 null carrier on both sides may be an advantageous structure.

Two types of configurations of 996RU may be proposed as follows.

996RU=484RU+1$N$+26RU+1$N$+484RU

996RU=1$N$+484RU+26RU+484RU+1$N$

The first structure is configured to reduce the influence of the interference from/to an adjacent RU by putting a null tone on both sides of the 26RU, and the second structure is configured to reduce the influence of the interference between 484RU and its adjacent RU. Since a RU using a small number of subcarriers, such as 26RU, causes significant influence on performance, it may be preferable to use the first structure.

The 484RU has a structure of two 242 RUs as in the existing 11ax.

484RU=242RU+242RU

The 242RU has the following structure as in the existing 11ax.

242RU=1$N$+106RU+1$N$+26RU+1$N$+106RU+1$N$

The 106RU has the following structure as in the existing 11ax.

106RU=52RU+2$N$+52RU

The 52RU has the following structure as in the existing 11ax.

52RU=26RU+26RU 2. 320 MHz Tone Plan

The configuration of 320 MHz may consider various options as follows.

Option 1: Combination of four existing 11ax 80 MHz tone plans

This combination takes into account both contiguous and non-contiguous situations and may be expressed as shown below.

80+80+80+80 MHz/160+80+80 MHz/80+160+80 MHz/80+80+160 MHz/240+80 MHz/80+240 MHz/320 MHz

+ means a non-contiguous situation, and 160/240/320 means that 2/3/4 of 80 MHz tone plans are contiguously aligned in succession.

<In Case there is a Contiguous Band>

In case 160 MHz is used, a tone index of the 80 MHz tone plan on the left side is tone index −512 of the existing 80 MHz tone plan, and a tone index of the 80 MHz tone plan on the right side is tone index+512 of the existing 80 MHz tone plan.

In case 240 MHz is used, a tone index of the 80 MHz tone plan in the middle is the same as the tone index of the existing 80 MHz tone plan, and a tone index of the leftmost 80 MHz tone plan is tone index −1024 of the existing 80 MHz tone plan, and a tone index of the rightmost tone plan is tone index+1024 of the existing 80 MHz tone plan.

In case 320 MHz is used, a tone index of a first 80 MHz tone plan starting from the left is tone index −1536 of the existing 80 MHz tone plan, and a tone index of a second 80 MHz tone plan is tone index −512 of the existing 80 MHz tone plan, and a tone index of a third 80 MHz tone plan is tone index+512 of the existing 80 MHz tone plan, and a tone index of a fourth tone plan is tone index+1536 of the existing 80 MHz tone plan.

The various non-contiguous combinations presented above may also use different bands as well as the same band. For example, at 80+160+80 MHz, each 80/160/80 MHz bandwidth may be transmitted by using the 2.4 GHz/5 GHz/6 GHz band.

Option 2: Combination of Two New 160 MHz Tone Plans

This combination takes into account both contiguous and non-contiguous situations and may be expressed as shown below.

160+160 MHz/320 MHz
+ means a non-contiguous situation, and 320 MHz means that two new 160 MHz tone plans are contiguously aligned.

<In Case there is a Contiguous Band>

In case 320 MHz is used, a tone index of the 160 MHz tone plan on the left side is tone index −1024 of a new 160 MHz tone plan, and a tone index of the 160 MHz tone plan on the right side is tone index+1024 of a new 160 MHz tone plan.

The non-contiguous combination presented above may also use different bands as well as the same band. For example, at 160+160 MHz, each 160 MHz bandwidth may be transmitted by using the 2.4 GHz/5 GHz band.

Option 3: Combination of Two Existing 11 Ax 80 MHz Tone Plans and One New 160 MHz Tone Plan This combination takes into account both contiguous and non-contiguous situations and may be expressed as shown below.

c80+c80+n160 MHz/c80+n160 MHz+c80/n160+c80+c80 MHz/cc160+n160 MHz/n160+cc160 MHz/ncc320 MHz/cnc320 MHz/ccn320 MHz
+ means a non-contiguous situation, and each of c80 MHz, cc160 MHz, and n160 MHz means the existing 11ax 80 MHz tone plan, two contiguous existing 11ax 80 MHz tone plans, and a new 160 MHz tone plan, respectively. ncc320 MHz/cnc320 MHz/ccn320 MHz means a contiguous alignment of a new 160 MHz tone plan and two existing 11ax 80 MHz tone plans. And, ncc/cnc/ccn indicates a contiguous (or sequential) order of each tone plan.

<In Case there is a Contiguous Band>

In case cc160 MHz is used, a tone index of the 80 MHz tone plan on the left side is tone index −512 of the existing 80 MHz tone plan, and a tone index of the 80 MHz tone plan on the right side is tone index+512 of the existing 80 MHz tone plan.

In case ncc320 MHz is used, a tone index of the 160 MHz tone plan on the left side is tone index −1024 of the new 160 MHz tone plan, a tone index of the next 80 MHz tone plan is tone index+512 of the existing 80 MHz tone plan, and a tone index of the last 80 MHz tone plan is tone index+1536 of the existing 80 MHz tone plan.

In case cnc320 MHz is used, a tone index of the 80 MHz tone plan on the left side is tone index −1536 of the existing 80 MHz tone plan, a tone index of the 160 MHz tone plan in the middle is the same tone index of the new 160 MHz tone plan, and a tone index of the last tone plan is tone index+1536 of the existing 80 MHz tone.

In case ccn320 MHz is used, a tone index of the 80 MHz tone plan on the left side is tone index −1536 of the existing 80 MHz tone plan, a tone index of the next 80 MHz tone plan is the tone index −512 of the existing 80 MHz tone plan, and a tone index of the last 160 MHz tone plan is tone index+1024 of the new 160 MHz tone plan.

In the option presented above, various combinations of tone plans having different structures of c80 and n160 may be considered. In this case, there lies a disadvantage in that an indication related to RU allocation may become very complicated. Therefore, in order to reduce signaling overhead, the combinations may be limited to using only structures having specific orders. For example, only c80+c80+n160 MHz/ccn320 MHz may be used.

The various non-contiguous combinations presented above may also use different bands as well as the same band. For example, at c80+n160+c80 MHz, each c80/n160/c80 MHz bandwidth may be transmitted by using the 2.4 GHz/5 GHz/6 GHz band.

Option 4: Alternative 320 MHz Tone Plan Considering the Usage of One RF

In the case of contiguous 320 MHz, a situation where transmission is performed by using one RF may be considered. And, in this case, since 320 MHz, which is configured of a combination of 160 MHz or 80 MHz tone plans, has a large number of wasted subcarriers, a new tone plan may be proposed in order to increase efficiency and throughput of the subcarriers that are used. Various alternative tone plans will be proposed as follows.

A. Alternative 320 MHz Tone Plan 1

In case of configuring 320 MHz with two contiguous 160 MHz tone plans, 12 left/11 right guard tones are used, and these may be directly applied to the alternative 320 MHz tone plan without modification. Additionally, in case of performing transmission by using a full band, a new RU may be proposed, and various DCs may be considered according to the influence of the DC offset, and a size of the new RU may be determined by considering the guard tone size. The number of DCs of 80 MHz of the existing 11ax is equal to 5 or 7. And, considering this, the new RU of the full band is 4068RU or 4066RU.

12/11 guard tone, 5DC, 4068RU (RU subcarrier index is −2036:−3, 3:2036)

12/11 guard tone, 7DC, 4066RU (RU subcarrier index is −2036:−4, 4:2036)

Considering the effects of DC offset at 320 MHz, it is not preferable to use less than 5/7 DCs, which is the number of DCs used at 80 MHz, and 5/7 DCs may be sufficient in light of performance (or capability). Considering the OFDMA tone plan used in 2020RU, which is presented below, a maximum of 7 DCs may be appropriate. Since the number of DCs in the OFDMA tone plan is designed based on the 7 DCs used in the existing 11ax 80 MHz OFDMA tone plan, it is not preferable to use a number of DCs that is smaller than 7, and, in light of performance, 7 DCs may also be sufficient at 320 MHz.

The OFDMA tone plan may be expressed by using the existing 2020RU and 26RU (13+13 RUs) as shown below.

$12G+2020RU+13RU+7DC+13RU+2020RU+11G$

Two types of configurations of 2020RU may be proposed as follows.

$2020RU=996RU+1N+26RU+1N+996RU$ $2020RU=1N+996RU+26RU+996RU+1N$

The first structure is configured to reduce the influence of the interference from/to an adjacent RU by putting a null tone on both sides of the 26RU, and the second structure is configured to reduce the influence of the interference between 996RU and its adjacent RU. Since a RU using a small number of subcarriers, such as 26RU, causes significant influence on performance, it may be preferable to use the first structure.

Two types of configurations of 996RU may be proposed as in the new 160 MHz.

996RU=484RU+1$N$+26RU+1$N$+484RU

996RU=1$N$+484RU+26RU+484RU+1$N$

The 484RU has a structure of two 242 RUs as in the existing 11ax.

484RU=242RU+242RU

The 242RU has the following structure as in the existing 11ax.

242RU=1$N$+106RU+1$N$+26RU+1$N$+106RU+1$N$

The 106RU has the following structure as in the existing 11ax.

106RU=52RU+2$N$+52RU

The 52RU has the following structure as in the existing 11ax.

52RU=26RU+26RU 3. 240 MHz

An AP may transmit a PPDU by using a bandwidth of 240 MHz, and 240 MHz may be configured by combining three existing 1 lax 80 MHz tone plans. This combination takes into account both contiguous and non-contiguous situations and may be expressed as follows.

80+80+80 MHz/160+80 MHz/80+160 MHz/240 MHz
+ means a non-contiguous situation, and 160/240 means that ⅔ of 80 MHz tone plans are contiguously aligned in succession.

<In Case there is a Contiguous Band>

In case 160 MHz is used, a tone index of the 80 MHz tone plan on the left side is tone index −512 of the existing 80 MHz tone plan, and a tone index of the 80 MHz tone plan on the right side is tone index+512 of the existing 80 MHz tone plan.

In case 240 MHz is used, a tone index of the 80 MHz tone plan in the middle is the same as the tone index of the existing 80 MHz tone plan, and a tone index of the leftmost 80 MHz tone plan is tone index −1024 of the existing 80 MHz tone plan, and a tone index of the rightmost tone plan is tone index+1024 of the existing 80 MHz tone plan.

A pilot subcarrier shall also be calibrated according to its position. And, in case 160 MHz is used, a pilot tone index of the 80 MHz tone plan on the left side is pilot tone index −512 of the existing 80 MHz tone plan, and a pilot tone index of the 80 MHz tone plan on the right side is pilot tone index+512 of the existing 80 MHz tone plan.

In case 240 MHz is used, a pilot tone index of the 80 MHz tone plan in the middle is the same as the pilot tone index of the existing 80 MHz tone plan, and a pilot tone index of the leftmost 80 MHz tone plan is pilot tone index −1024 of the existing 80 MHz tone plan, and a pilot tone index of the rightmost 80 MHz tone plan is pilot tone index+1024 of the existing tone plan.

Alternatively, the existing 11ax 80 MHz tone plan and the new 160 MHz tone plan may be used, and both contiguous and non-contiguous situations may be considered and expressed as follows.

c80+n160 MHz/n160 MHz+c80/nc240 MHz/cn240 MHz
+ means a non-contiguous situation, and each of c80 MHz and n160 MHz means the existing 11ax 80 MHz tone plan and a new 160 MHz tone plan, respectively. nc240 MHz/cn240 MHz means a contiguous alignment of the new 160 MHz tone plan and the existing 11ax 80 MHz tone plan. And, nc/cn indicates a contiguous (or sequential) order of each tone plan.

In case nc240 MHz is used, a tone index of the 160 MHz tone plan on the left side is tone index −512 of the new 160 MHz tone plan, and a tone index of 80 MHz on the right side is tone index+1024 of the existing 80 MHz tone plan.

In case cn240 MHz is used, a tone index of the 80 MHz tone plan on the left side is tone index −1024 of the existing 80 MHz tone plan, and a tone index of 160 MHz on the right side is tone index+512 of the new 160 MHz tone plan.

A pilot subcarrier shall also be calibrated according to its position. And, in case nc240 MHz is used, a pilot tone index of the 160 MHz tone plan on the left side is pilot tone index −512 of the new 160 MHz tone plan, and a pilot tone index of 80 MHz on the right side is pilot tone index+1024 of the existing 80 MHz tone plan.

In case cn240 MHz is used, a pilot tone index of the 80 MHz tone plan on the left side is pilot tone index −1024 of the existing 80 MHz tone plan, and a pilot tone index of 160 MHz on the right side is pilot tone index+512 of the new 160 MHz tone plan.

The various non-contiguous combinations presented above may also use different bands as well as the same band. For example, at 80+80+80 MHz, each 80 MHz bandwidth may be transmitted by using the 2.4 GHz/5 GHz/6 GHz band.

More specifically, a tone plan of 240 MHz may be configured by broadly using 3 different methods.

Option 1: combination of three 80 MHz tone plans (80+80+80)

Option 2: combination of two 80 MHz tone plans and one new 160 MHz tone plan (160+80/80+160)

Option 3: alternative 240 MHz tone plan (240)

A non-contiguous situation may also be a case where different bands are used. An index of a RU subcarrier may be calibrated according to its position.

An index of a 240 MHz pilot subcarrier may be calibrated according to its position as follows.

−160 MHz: existing 80 MHz±512 (RU tone index also the same)

−240 MHz: existing 80 MHz±1024, existing 80 MHz (RU tone index also the same), new 160 MHz±512 (RU tone index also the same)

Tone Plan 1

In case of using a full band, a new RU may be proposed by considering the guard tones and DC tones. The existing 1 lax 80 MHz and 160 MHz use 12 right and 11 left guard tones, and these guard tones are also used in 240 MHz without modification. When considering actual interference from an adjacent channel or interference to an adjacent channel, the usage of these guard tones shall not cause any significant problem. Additionally, a number of DCs equal to or greater than the number of DCs used in the existing 80 MHz, which is 5 or 7 DCs, shall be used. However, when considering the DC offset, the usage of 5 or 7 DCs shall not cause any significant problem. Considering this, a tone plan may be proposed as presented below. In the following, G denotes guard tone, and N denotes null tone.

1. Alternative 240 MHz Tone Plan 1
<Full Band Tone Plan>
12/11 guard, DC 5 or 7, RU 3044 or 3042
<OFMDA Tone Plan>

12G+996RU+1N+26RU+1N+996RU (5DC)+1N+
26RU+1N+996RU+11G

996RU on both sides=484RU+1N+26RU+1N+
484RU (ver1) (or 1N+484RU+26RU+484RU+
1N (ver2))

996RU (5DC) in the middle=484RU+13RU+7DC+
13RU+484RU (the same as existing 80 MHz)

484RU=242RU+242RU

242RU=1N+106RU+1N+26RU+1N+106RU+1N

106RU=52RU+2N+52RU

52RU=26RU+26RU

In a full band, 5 or 7 DCs are configured according to the influence of the DC offset.

The number of DCs may be smaller than that of 80 MHz/160 MHz but not larger than 7, which is used in OFDMA.

The two-configuration option of the 996RU on both sides may be viewed in light of ensured performance (or capability) of 26RU or ensured performance of 484RU. Configurations of the 996RU in the middle and the RUs that follow are the same as the existing ax.

More specifically, the configuration of the 996RU on both sides may be proposed in two different structures. A first structure is a structure that puts a null tone on both sides of the 26RU in order to reduce the influence of the interference to/from an adjacent RU, and a second structure is a structure that is capable of reducing the influence of the interference between the 484RU and its adjacent RU. Since a RU using a small number of subcarriers, such as 26RU, causes significant influence on performance, it may be preferable to use the first structure.

The 996RU in the middle uses the same 996RU tone plan of the existing 80 MHz without modification. Additionally, 484/242/106/52RU may use the same structure as the existing (or conventional) flax without modification.

4. Exemplary Tone Plans

Figure 16:
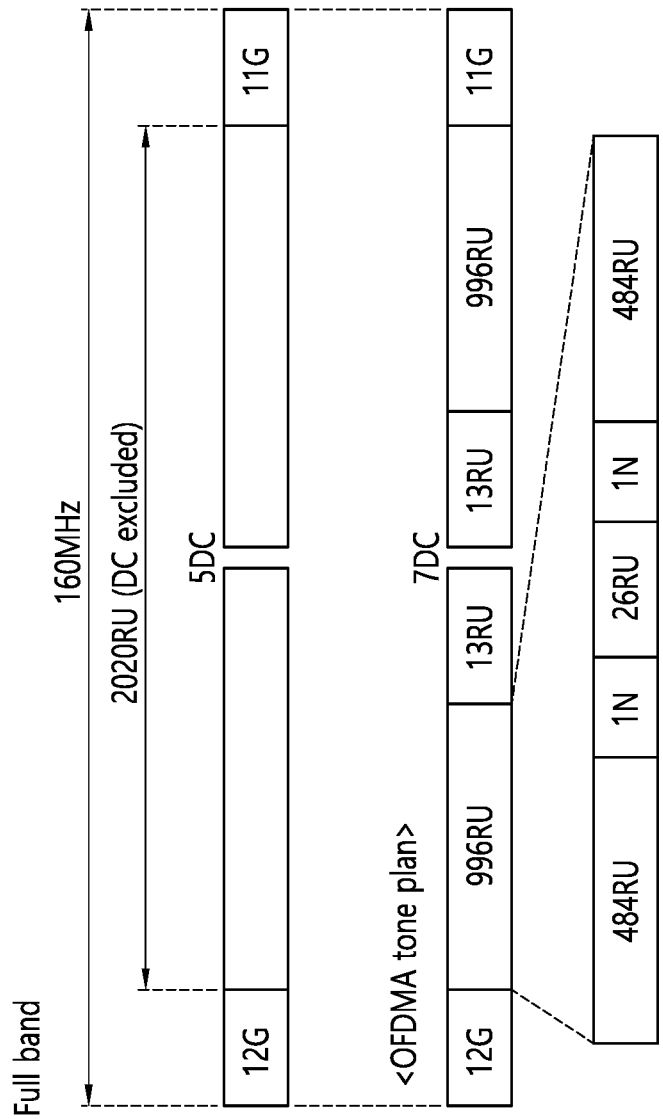
FIG. 16 shows an example of a tone plan in a 160 MHz band according to the present embodiment.

FIG. 16 shows an example of a tone plan in a 160 MHz band according to the present embodiment.

A tone plan in case of a full band and a tone plan in case of applying OFDMA are both illustrated in FIG. 16.

First, in case of the full band, a tone plan of 160 MHz may sequentially consist of 12 guard tones, 2020RU, 5 DC tones, and 11 guard tones. 5 DC tones may be located at the center of 160 MHz, and data may be transmitted in the 2020RU. However, FIG. 16 is for one embodiment only, and thus the 12 guard tones and the 11 guard tones may change in locations. When 7 DC tones are located at the center of 160 MHz, the data may be transmitted in 2018RU.

In case of applying OFDMA, a tone plan of 160 MHz may sequentially consist of 12 guard tones, 996RU, 13RU, 7 DC tones, 13RU, 996RU, and 11 guard tones. In addition, the 996RU may consist of 484RU, one null tone, 26RU, one null tone, and 484RU. However, FIG. 16 is for one embodiment only, and thus the 12 guard tones and the 11 guard tones may change in locations. The 996RU may consist of one null tone, 484RU, 26RU, 484RU, and one null tone.

The 484RU and subordinate RUs are not shown since they may have the same configuration as in the existing 11ax.

Figure 17:
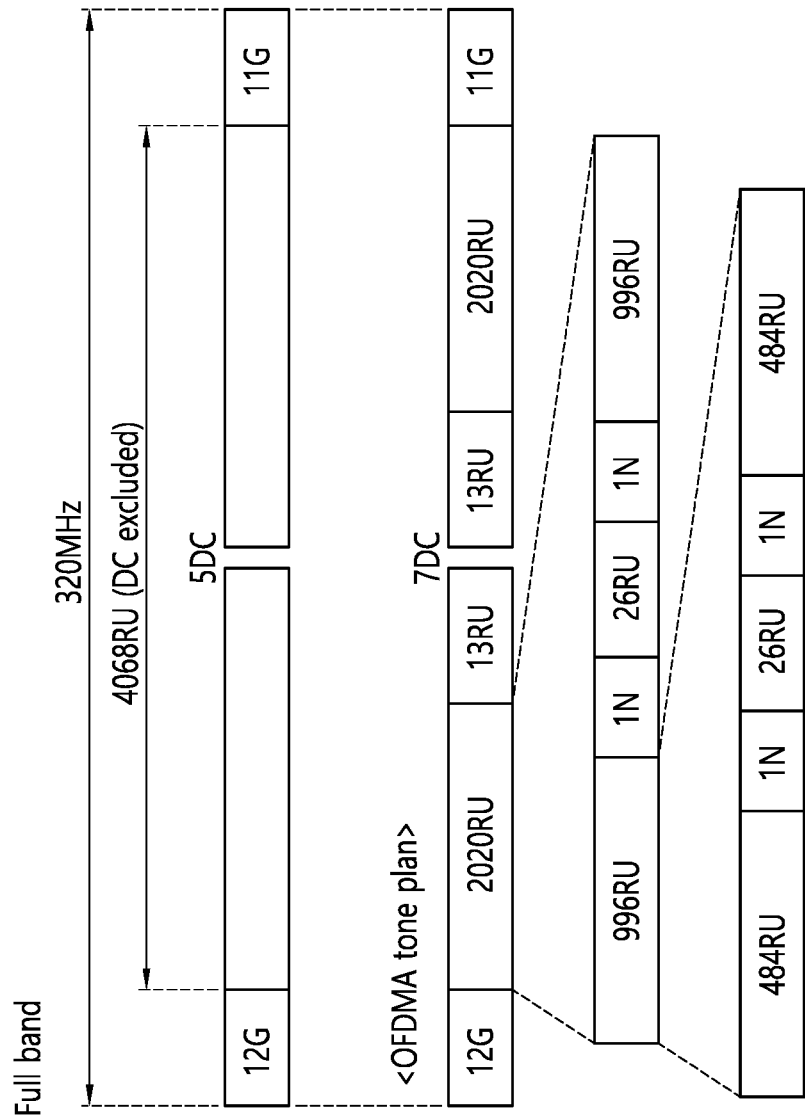
FIG. 17 shows an example of a tone plan in a 320 MHz band according to the present embodiment.

FIG. 17 shows an example of a tone plan in a 320 MHz band according to the present embodiment.

A tone plan in case of a full band and a tone plan in case of applying OFDMA are both illustrated in FIG. 17.

First, in case of the full band, a tone plan of 320 MHz may sequentially consist of 12 guard tones, 4068RU, 5 DC tones, and 11 guard tones. 5 DC tones may be located at the center of 320 MHz, and data may be transmitted in the 4068RU. However, FIG. 17 is for one embodiment only, and thus the 12 guard tones and the 11 guard tones may change in locations. When 7 DC tones are located at the center of 320 MHz, the data may be transmitted in 4066RU.

In case of applying OFDMA, a tone plan of 320 MHz may sequentially consist of 12 guard tones, 2020RU, 13RU, 7 DC tones, 13RU, 2020RU, and 11 guard tones. In addition, the 2020-tone RU may consist of 996RU, one null tone, 26RU, one null tone, and 996RU. In addition, the 996RU may consist of 484RU, one null tone, 26RU, one null tone, and 484RU. However, FIG. 17 is for one embodiment only, and thus the 12 guard tones and the 11 guard tones may change in locations. The 996RU may consist of one null tone, 484RU, 26RU, 484RU, and one null tone.

The 484RU and subordinate RUs are not shown since they may have the same configuration as in the existing 11ax.

Figure 18:
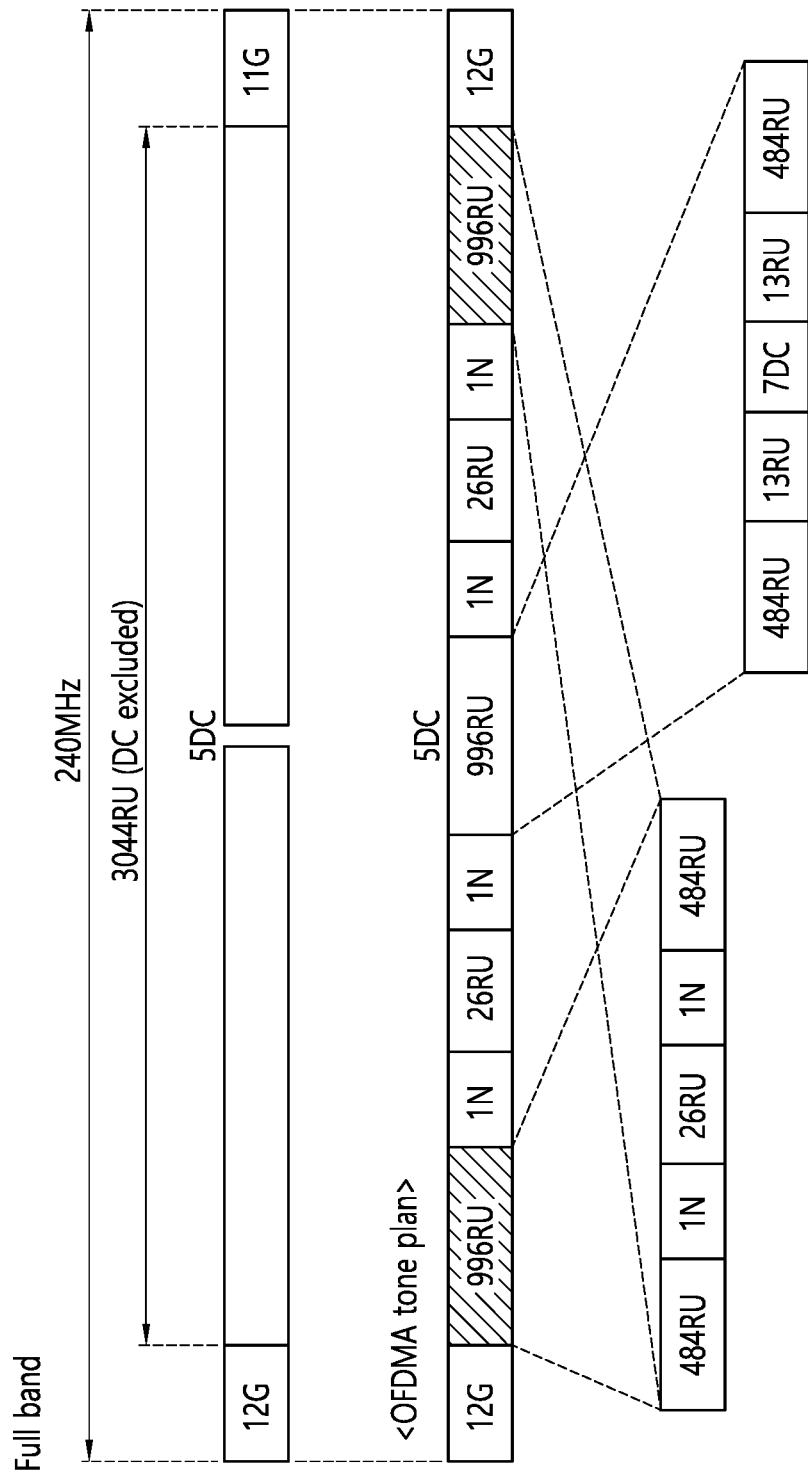
FIG. 18 shows an example of a tone plan in a 240 MHz band according to the present embodiment.

FIG. 18 shows an example of a tone plan in a 240 MHz band according to the present embodiment.

FIG. 18 illustrates both a tone plan in case of a full band and a tone plan in a case where OFDMA is applied, which are described above in tone plan 1.

Firstly, in case of a full band, a tone plan of 240 MHz may be configured in the order of 12 guard tones, 3044RU, 5 DC tones, and 11 guard tones. 5 DC tones may be positioned in the middle of the 160 MHz, and data may be transmitted from the 3044RU. However, FIG. 18 is merely an exemplary embodiment. And, therefore, the positions of the 12 guard tones and the 11 guard tones may be changed, and, if 7 DC tones are positioned in the middle of the 240 MHz, data may be transmitted from 3042RU.

In the case where OFDMA is applied, a tone plan of 320 MHz may be configured in the order of 12 guard tones, 996RU, 1N, 26RU, 1N, 996RU, 5 DC tones, 1N, 26RU, 1N, 996RU, and 11 guard tones.

Additionally, the 996RU on both ends may be configured of 484RU, 1 null tone, 26RU, 1 null tone, and 484RU. And, the 996RU in the middle may be configured of 484RU, 13RU, 7 DC tones, 13.RU, and 484RU. However, FIG. 18 is merely an exemplary embodiment. And, therefore, the positions of the 12 guard tones and the 11 guard tones may be changed, and the 996RU on both ends may be configured of 1 null tone, 484RU, 26RU, 484RU, and 1 null tone.

Since the tone plan may have the same structure as the existing flax starting from the 484RU, the structure will not be shown in the drawing.

5. Technical Task to be Achieved by the Present Disclosure

The specification proposes phase rotation applied to a legacy preamble when packets are transmitted using 80/160/240/320 MHz in a WLAN system (802.11). In particular, the specification proposes phase rotation that can also be extended and applied to 240/320 MHz in consideration of preamble puncturing introduced to flax and is optimized in consideration of various RF capabilities, that is, a device situation having different maximum transmission-available bandwidths of RFs.

In the WLAN 802.11 system, transmission of an increased number of streams using a wider band or a larger number of antennas than those in legacy flax is considered for peak throughput increase. Furthermore, a method of aggregating and using various bands is also considered.

This specification considers a case of using a wide band, i.e., a case of transmitting a packet by using 80/160/240/320 MHz, and proposes phase rotation being applied to a legacy preamble of such case. Most particularly, by considering preamble puncturing adopted to 11ax at 80/160 MHz, and by applying 80 MHz-based preamble puncturing at 240/320 MHz, phase rotation that is optimized in such situation is proposed.

Firstly, an encoding procedure of a PPDU may be described as follows.

An L-STF included in the PPDU may be configured according to the following procedure.
- a) Determine the channel bandwidth from the TXVECTOR parameter CH_BANDWIDTH.
- b) Sequence generation: Generate the L-STF sequence over the channel bandwidth as described in 27.3.10.3 (L-STF). Apply a 3 dB power boost if transmitting an HE ER SU PPDU as described in 27.3.10.3 (L-STF).
- c) Phase rotation: Apply appropriate phase rotation for each 20 MHz subchannel as described in 27.3.9 (Mathematical description of signals) and 21.3.7.5 (Definition of tone rotation).
- d) CSD per STS: If the TXVECTOR parameter BEAM_CHANGE is 0, apply CSD per STS for each space-time stream and frequency segment as described in 27.3.10.2.2 (Cyclic shift for HE modulated fields).
- e) Spatial mapping: If the TXVECTOR parameter BEAM_CHANGE is 0, apply the A matrix and the Q matrix as described in 27.3.10.3 (L-STF).
- f) IDFT: Compute the inverse discrete Fourier transform.
- g) CSD per chain: If the TXVECTOR parameter BEAM_CHANGE is 1 or not present, apply CSD per chain for each transmit chain and frequency segment as described in 27.3.10.2.1 (Cyclic shift for pre-HE modulated fields).
- h) Insert GI and apply windowing: Prepend a GI ($T_{GI,Pre-HE}$) and apply windowing as described in 27.3.9 (Mathematical description of signals).
- i) Analog and RF: Upconvert the resulting complex baseband waveform associated with each transmit chain to an RF signal according to the center frequency of the desired channel and transmit. Refer to 27.3.9 (Mathematical description of signals) and 27.3.10 (HE preamble) for details.

An L-LTF included in the PPDU may be configured according to the following procedure.
- a) Determine the channel bandwidth from the TXVECTOR parameter CH_BANDWIDTH.
- b) Sequence generation: Generate the L-LTF sequence over the channel bandwidth as described in 27.3.10.4 (L-LTF). Apply a 3 dB power boost if transmitting an HE ER SU PPDU as described in 27.3.10.4 (L-LTF).
- c) Phase rotation: Apply appropriate phase rotation for each 20 MHz subchannel as described in 27.3.9 (Mathematical description of signals) and 21.3.7.5 (Definition of tone rotation).
- d) CSD per STS: If the TXVECTOR parameter BEAM_CHANGE is 0, apply CSD per STS for each space-time stream and frequency segment as described in 27.3.10.2.2 (Cyclic shift for HE modulated fields) before spatial mapping.
- e) Spatial mapping: If the TXVECTOR parameter BEAM_CHANGE is 0, apply the A matrix and the Q matrix as described in 27.3.10.4 (L-LTF).
- f) IDFT: Compute the inverse discrete Fourier transform.
- g) CSD per chain: If the TXVECTOR parameter BEAM_CHANGE is 1 or not present, apply CSD per chain for each transmit chain and frequency segment as described in 27.3.10.2.1 (Cyclic shift for pre-HE modulated fields).
- h) Insert GI and apply windowing: Prepend a GI ($T_{GI,L-LTF}$) and apply windowing as described in 27.3.9 (Mathematical description of signals).
- i) Analog and RF: Upconvert the resulting complex baseband waveform associated with each transmit chain to an RF signal according to the carrier frequency of the desired channel and transmit. Refer to 27.3.9 (Mathematical description of signals) and 27.3.10 (HE preamble) for details.

An L-SIG included in the PPDU may be configured according to the following procedure.
- a) Set the RATE subfield in the SIGNAL field to 6 Mb/s. Set the LENGTH, Parity, and Tail fields in the SIGNAL field as described in 27.3.10.5 (L-SIG).
- b) BCC encoder: Encode the SIGNAL field by a convolutional encoder at the rate of R=½ as described in 27.3.11.5.1 (Binary convolutional coding and puncturing).
- c) BCC interleaver: Interleave as described in 17.3.5.7 (BCC interleavers).
- d) Constellation Mapper: BPSK modulate as described in 27.3.11.9 (Constellation mapping).
- e) Pilot insertion: Insert pilots as described in 27.3.10.5 (L-SIG).
- f) Extra tone insertion: Four extra tones are inserted in subcarriers k∈{−28, −27, 27, 28} for channel estimation purpose and the values on these four extra tones are {−1, −1, −1, 1}, respectively. Apply a 3 dB power boost to the four extra tones if transmitting an HE ER SU PPDU as described in 27.3.10.5 (L-SIG).
- g) Duplication and phase rotation: Duplicate the L-SIG field over each occupied 20 MHz subchannel of the channel bandwidth. Apply appropriate phase rotation for each occupied 20 MHz subchannel as described in 27.3.9 (Mathematical description of signals) and 21.3.7.5 (Definition of tone rotation).
- h) CSD per STS: If the TXVECTOR parameter BEAM_CHANGE is 0, apply CSD per STS for each space-time stream and frequency segment as described in 27.3.10.2.2 (Cyclic shift for HE modulated fields) before spatial mapping.
- i) Spatial mapping: If the TXVECTOR parameter BEAM_CHANGE is 0, apply the A matrix and Q matrix as described in 27.3.10.5 (L-SIG).
- j) IDFT: Compute the inverse discrete Fourier transform.
- k) CSD per chain: If the TXVECTOR parameter BEAM_CHANGE is 1 or not present, apply CSD per chain for each transmit chain and frequency segment as described in 27.3.10.2.1 (Cyclic shift for pre-HE modulated fields).
- l) Insert GI and apply windowing: Prepend a GI ($T_{GI,Pre-HE}$) and apply windowing as described in Pre-HE) 27.3.9 (Mathematical description of signals)
- m) Analog and RF: Upconvert the resulting complex baseband waveform associated with each transmit chain Refer to 27.3.9 (Mathematical description of signals) and 27.3.10 (HE preamble) for details.

The L-STF, L-LTF, and L-SIG may apply adequate phase rotation in 20 MHz
subchannel units (ref. c) of the L-STF, c) of the L-LTF, and g) of the L-SIG). At this point, L-SIG may be duplicated in 20 MHz units when transmitted from a bandwidth equal to or larger than 40 MHz and may apply each phase transmission one by one (ref. g) of L-SIG). The phase rotation may be described in more detail as follows.

The following shows a phase rotation being used in a legacy preamble and HE-SIG-A/B in the existing 11ax.

Function $\gamma_{k,BW}$ is used for indicating a rotation of a tone. The $\gamma_{k,BW}$ may be defined by a phase rotation value. In $\gamma_{k,BW}$ the bandwidth (BW) is determined by TXVECTOR parameter CH_BANDWIDTH, which is defined in the following table. At this point, k is a subcarrier index.

TABLE 2

| CH_BANDWIDTH | $\Upsilon_{k, BW}$ |
|---|---|
| CBW20 | $\Upsilon_{k, 20}$ |
| CBW40 | $\Upsilon_{k, 40}$ |
| CBW80 | $\Upsilon_{k, 80}$ |
| CBW160 | $\Upsilon_{k, 160}$ |
| CBW80 + 80 | $\Upsilon_{k, 80}$ per frequency segment |

Hereinafter, $\gamma_{k,BW}$ according to the bandwidth will be defined.

For a 20 MHz PPDU transmission, $\gamma_{k,20} = 1$

For a 40 MHz PPDU transmission, $$\Upsilon_{k,40} = \begin{cases} 1, & k < 0 \\ j, & k \geq 0 \end{cases}$$

For an 80 MHz PPDU transmission, $$\Upsilon_{k,80} = \begin{cases} 1, & k < -64 \\ -1, & k \geq -64 \end{cases}$$

For an 80+80 MHz PPDU transmission, each 80 MHz frequency segment shall use a phase rotation for the 80 MHz PPDU transmission.

For a 160 MHz PPDU transmission, $$\Upsilon_{k,160} = \begin{cases} 1, & k < -192 \\ -1, & -192 \leq k < 0 \\ 1, & 0 \leq k < 64 \\ -1, & 64 \leq k \end{cases}$$

As it is apparent in the description presented above, 160 MHz is used by repeating the phase rotation of 80 MHz two times.

In Wi-Fi succeeding 11ax, a wider band may be used in order to enhance the peak throughput, and this application considers a band of up to 240/320 MHz. Additionally, although the form of the packet that is to be used is unknown, it will be apparent that the start of the packet will be a legacy preamble for its co-existence with the existing legacy. Additionally, by using more enhanced hardware and RF, a situation where a contiguous 160/240/320 MHz packet is transmitted by using one RF may also be considered. The present application proposes various methods of phase rotation for optimizing PAPR in L-STF and L-LTF by considering such situations. And, most particularly, by considering preamble puncturing proposed in 11ax at 80/160 MHz, and by applying 80 MHz-based preamble puncturing at 240/320 MHz, the present application proposes a maximum PAPR for minimizing the phase rotation. In this case, the phase rotation considers a method having one unified form and not a method having different values according to the preamble puncturing pattern. For example, when considering 11ax preamble puncturing at 80/160 MHz, a primary 20 MHz may always be used for PPDU transmission, whereas a secondary 20/40/80 MHz may not be used for the PPDU transmission. Alternatively, when considering 80 MHz-based preamble puncturing at 240/320 MHz, a primary 80 MHz may always be used for PPDU transmission, whereas a secondary 80/160 MHz may not be used for the PPDU transmission. In such various preamble puncturing patterns, a specific phase rotation is applied, and, by calculating a PAPR for each preamble puncturing pattern, a maximum PAPR value is extracted. Even in a case where another phase rotation is applied, this is repeated so as to extract a maximum PAPAR from each phase rotation. Thereafter, by comparing the extracted maximum PAPR values, an optimized phase rotation may be selected.

In 11ax, preamble puncturing up to 16 MHz is considered and this can be extended and applied to 240 MHz and 320 MHz. In this situation, phase rotation optimized per bandwidth is proposed. That is, phase rotation optimized in view of PAPR is proposed on the assumption that 20 MHz bands other than the primary 20 MHz band may be used or may not be used for PPDU transmission in a wide bandwidth.

In addition, maximum transmission-available bandwidths considered in the specification are 80/160/240/320 MHz. In addition, only a contiguous situation is considered. That is, the following situations are considered in each bandwidth for each preamble puncturing pattern. Only one PAPR is considered in 80 MHz transmission and a total of three PAPRs: the first 80 MHz; the second 80 MHz; and all 160 MHz are considered in 160 MHz transmission. A total of six PAPRs: the first 80 MHz; second 80 MHz; the third 80 MHz; the first 160 MHz corresponding to a combination of the first 80 MHz and the second 80 MHz; the second 160 MHz corresponding to a combination of the second 80 MHz and the third 80 MHz; and all 240 MHz are considered in 240 MHz transmission. A total of ten PAPRs: the first 80 MHz, the second 80 MHz, the third 80 MHz, the fourth 80 MHz; the first 160 MHz corresponding to a combination of the first 80 MHz and the second 80 MHz; the second 160 MHz corresponding to a combination of the second 80 MHz and the third 80 MHz; the third 160 MHz corresponding to a combination of the third 80 MHz and the fourth 80 MHz; the first 240 MHz corresponding to a combination of the first 80 MHz, the second 80 MHz, and the third 80 MHz; the second 240 MHz corresponding to a combination of the second 80 MHz, the third 80 MHz, and the fourth 80 MHz; and all 320 MHz are considered in 320 MHz transmission.

In 11ax, phase rotation of legacy 11ac is applied to 80/160 MHz without consideration of preamble puncturing, and thus a satisfactory PAPR cannot be guaranteed. Accordingly, the specification provides a method for decreasing a PAPR and improving hardware efficiency by proposing new phase rotation in consideration of preamble puncturing in 80/160 MHz as well as 240/320 MHz.

The following is L-STF and L-LTF sequences corresponding to 20 MHz, which are applied to each 20 MHz bandwidth in a wide bandwidth.

L-STF=sqrt(½)*[0 0 0 0 0 0 0 0 1+j00 0 −1−j0 0 0
1+j0 0 0 −1−j0 0 0 −1−j0 0 0 1+j0 0 00 0 0 0
−1−j0 0 0 −1−j0 0 0 01+j0 0 01+j0 0 01+j0 0
01+j0 0 00 0 00]

L-LTF=[0 0 00 0 0 1 1 −1 −1 1 1 −1 1 −1 1 1 1 1 1
1 −1 −1 1 1 −1 1 −1 1 1 1 1 0 1 −1 −1 1 1 −1
1 −1 1 1 1 1 1 1 1 1 −1 −1 1 1 −1 1 −1 1 1 1 1
0 0 0 0 0]

A PAPR may considerably increase in a signal having a repeated frequency domain as described above. To reduce the PAPR, phase rotation is applied, which is proposed as follows. In the proposed phase rotation situation, a maximum PAPR in L-STF and L-LTF in consideration of preamble puncturing and various RF capabilities is proposed as follows.

A. 80 MHz (when 80 MHz is represented by a subcarrier index, −128≤k<127. k is a subcarrier index)

1) Conventional Phase Rotation is Applied

The conventional phase rotation can be applied as it is as follows. However, this may not be desirable because a relatively large PAPR compared to the following propositions A. 2) and 3) is provided in a situation in which preamble puncturing is considered.

Gamma_k,80=1 if k<−64
−1 if −64≤k

TABLE 3

| L-STF | L-LTF |
|---|---|
| 6.8606 | 7.9370 |

Gamma_k,BW represents a phase rotation value at a subcarrier index k of a contiguous bandwidth BW.

2) PAPR Optimization Phase Rotation Applied Per 20 MHz Bandwidth

Phase rotation applied per 20 MHz bandwidth which optimizes a PAPR in L-STF, and PAPR are represented below.

Gamma_k,80=1 if k<−64
j if −64≤k<0
1 if 0≤k<64
j if 64≤k
or
Gamma_k,80=1 if k<−64
−j if −64≤k<0
1 if 0≤k<64
−j if 64≤k

TABLE 4

| L-STF | L-LTF |
|---|---|
| 5.8219 | 6.8980 |

Phase rotation applied per 20 MHz bandwidth which optimizes a PAPR in L-STF, and PAPR are represented below.

Gamma_k,80=1 if k<−64
1 if −64≤k<0
−1 if 0≤k<64
−1 if 64≤k

TABLE 5

| L-STF | L-LTF |
|---|---|
| 5.8847 | 6.6178 |

While the aforementioned three types of phase rotation have similar PAPRs in each field, phase rotation that optimizes L-LTF having a larger PAPR may be preferred from the viewpoint of packets.

3) Phase Rotation Having Performance Similar to PAPR Optimization Phase Rotation Applied Per 20 MHz Bandwidth Phase rotation having a PAPR similar to those of phase rotation proposed in A. 2) and the PAPR in this case are represented below.

Gamma_k,80=1 if k<−64
−1 if −64≤k<0
−1 if 0≤k<64
1 if 64≤k

TABLE 6

| L-STF | L-LTF |
|---|---|
| 5.9681 | 6.7153 |

B. 160 MHz (when 160 MHz is represented by a subcarrier index, −256≤k<255.)

160 MHz includes both contiguous 160 MHz/non-contiguous 160 MHz, and non-contiguous 160 MHz may be 80+80 MHz. Particularly, in the case of a non-contiguous band, channels may be positioned in different bands. In this case, the following phase rotation can be applied as it is for simplification. Otherwise, phase rotation may be applied in response to a channel size used in a band because it is obvious that different RFs are used, and thus, PAPR is not affected. This can also be applied to 240/320 MHz.

Contiguous/non-contiguous 160 MHz phase rotation proposed below can be applied to 160 MHz in a wide non-contiguous transmission situation of 240/320 MHz.

1) Repetition of 80 MHz Phase Rotation

This is the same approach as the method used in legacy 11ax, and in a situation in which contiguous/non-contiguous 160 MHz packets are transmitted using two RFs each corresponding to 80 MHz, phase rotations used for the RFs are identical and thus implementation may be easy. In contiguous 160 MHz, phase rotation and a maximum PAPR are as follows.

Gamma_k,160=1 if k<−192
1 if −192≤k<−128
−1 if −128≤k<−64
−1 if −64≤k<0
1 if 0≤k<64
1 if 64≤k<128
−1 if 128≤k<192
−1 if 192≤k

TABLE 7

| L-STF | L-LTF |
|---|---|
| 8.4454 | 9.1864 |

Gamma_k,160=1 if k<−192
−1 if −192≤k<−128
−1 if −128≤k<−64
1 if −64≤k<0

1 if 0≤k<64
−1 if 64≤k<128
−1 if 128≤k<192
1 if 192≤k

TABLE 8

| L-STF | L-LTF |
|---|---|
| 8.4874 | 9.1864 |

Gamma_k,160=1 if k<−192
j if −192≤k<−128
1 if −128≤k<−64
j if −64≤k<0
1 if 0≤k<64
j if 64≤k<128
1 if 128≤k<192
j if 192≤k

TABLE 9

| L-STF | L-LTF |
|---|---|
| 8.3369 | 9.4172 |

Gamma_k,160=1 if k<−192
−j if −192≤k<−128
1 if −128≤k<−64
−j if −64≤k<0
1 if 0≤k<64
−j if 64≤k<128
1 if 128≤k<192
−j if 192≤k

TABLE 10

| L-STF | L-LTF |
|---|---|
| 8.3369 | 9.4172 |

Gamma_k,160=1 if k<−192
−1 if −192≤k<−128
−1 if −128≤k<−64
−1 if −64≤k<0
1 if 0≤k<64
−1 if 64≤k<128
−1 if 128≤k<192
−1 if 192≤k

TABLE 11

| L-STF | L-LTF |
|---|---|
| 9.8709 | 10.9473 |

When non-contiguous 160 MHz, that is, 80+80 MHz is considered, the proposition of A can be applied to each 80 MHz.

In the above various propositions, repetition of the conventional phase rotation that does not have a satisfactory PAPR in 80 MHz has a PAPR inferior to those of other phase rotations, and thus, it may not be desirable.

2) 80 MHz Phase Rotation Repetition and Phase Rotation Addition in Units of 80 MHz Bandwidth This is a method of repeating 80 MHz phase rotation twice and additionally applying phase rotation in units of 80 MHz to further optimize a PAPR. In a situation in which contiguous/non-contiguous 160 MHz packets are transmitted using two RFs MHz each corresponding to 80 MHz, the same 80 MHz phase rotation is applied to each RF and additional phase rotation per 80 MHz is applied.

In this case, when conventional 80 MHz phase rotation is applied, phase rotation is the same as B. 1) except the fifth phase rotation of B. 1), and a case in which 80 MHz phase rotation is repeated and phase rotation is added in units of 80 MHz bandwidth is as follows.

Gamma_k,160=1 if k<−192
−1 if −192≤k<−128
−1 if −128≤k<−64
−1 if −64≤k<0
−1 if 0≤k<64
1 if 64≤k<128
1 if 128≤k<192
1 if 192≤k

TABLE 12

| L-STF | L-LTF |
|---|---|
| 8.1473 | 9.1912 |

The first two types of phase rotation of B. 1) which minimize a PAPR of L-LTF may be preferred with respect to packets, the first phase rotation of B. 1) may be preferred if L-SFT is also considered.

3) PAPR Optimization Phase Rotation Applied Per 20 MHz Bandwidth

This method is phase rotation applied in units of 20 MHz bandwidth which optimizes a PAPR when a contiguous 160 MHz packet is transmitted using one RF and is as follows. A subcarrier index may be corrected and applied to non-contiguous 160 MHz. That is, in the following mathematical expressions, phase rotation of −256≤k<0 can be applied to 80 MHz having a low frequency and phase rotation of 0≤k<256 can be applied to 80 MHz having a high frequency. Phase rotation applied to each RF having a maximum transmission available bandwidth of 80 MHz varies according to bandwidth position, which may cause complicated implementation.

Phase rotation optimized in L-STF is as follows.
Gamma_k,160=1 if k<−192
j if −192≤k<−128
1 if −128≤k<−64
j if −64≤k<0
−j if 0≤k<64
−1 if 64≤k<128
−j if 128≤k<192
−1 if 192≤k
or
Gamma_k,160=1 if k<−192
−j if −192≤k<−128
1 if −128≤k<−64
−j if −64≤k<0
j if 0≤k<64
−1 if 64≤k<128
j if 128≤k<192
−1 if 192≤k

TABLE 13

| L-STF | L-LTF |
|---|---|
| 8.0872 | 9.3396 |

Phase rotation optimized in L-LTF is as follows.
Gamma_k,160=1 if k<−192
1 if −192≤k<−128
−1 if −128≤k<−64
−1 if −64≤k<0
−j if 0≤k<64
j if 64≤k<128
j if 128≤k<192
−j if 192≤k
or
Gamma_k,160=1 if k<−192
1 if −192≤k<−128
−1 if −128≤k<−64
−1 if −64≤k<0
j if 0≤k<64
−j if 64≤k<128
−j if 128≤k<192
j if 192≤k
or
Gamma_k,160=1 if k<−192
−1 if −192≤k<−128
−1 if −128≤k<−64
1 if −64≤k<0
j if 0≤k<64
j if 64≤k<128
−j if 128≤k<192
−j if 192≤k
or
Gamma_k,160=1 if k<−192
−1 if −192≤k<−128
−1 if −128≤k<−64
1 if −64≤k<0
−j if 0≤k<64
−j if 64≤k<128
j if 128≤k<192
j if 192≤k

TABLE 14

| L-STF | L-LTF |
|---|---|
| 8.4274 | 9.0736 |

This has a PAPR slightly superior to those in the propositions 1) and 2) although implementation may be complicated, and phase rotation of the second group of 3) which minimizes a PAPR of L-LTF having a larger PAPR may be preferred in view of packets.

C. 240 MHz (when 240 MHz is Represented by a Subcarrier Index, −384≤k<383.)

240 MHz includes both contiguous 240 MHz/non-contiguous 240 MHz, and non-contiguous 240 MHz may be 160+80/80+160/80+80+80 MHz. Contiguous/non-contiguous 240 MHz phase rotation proposed below can be applied to 240 MHz of a non-contiguous transmission situation of wider 320 MHz.

1) 80 MHz Phase Rotation Repetition

This is the same approach as the method used in legacy 11ax, and in a situation in which contiguous/non-contiguous 240 MHz packets are transmitted using multiple RFs respectively corresponding to 80/160 MHz, phase rotations used for the RFs are identical and thus implementation may be easy. In contiguous 240 MHz, phase rotation and a maximum PAPR are as follows.
Gamma_k,240=1 if k<−320
1 if −320≤k<−256
−1 if −256≤k<−192
−1 if −192≤k<−128
1 if −128≤k<−64
1 if −64≤k<0
−1 if 0≤k<64
−1 if 64≤k<128
1 if 128≤k<192
1 if 192≤k<256
−1 if 256≤k<320
−1 if 320≤k

TABLE 15

| L-STF | L-LTF |
|---|---|
| 10.2254 | 11.1571 |

Gamma_k,240=1 if k<−320
−1 if −320≤k<−256
−1 if −256≤k<−192
1 if −192≤k<−128
1 if −128≤k<−64
−1 if −64≤k<0
−1 if 0≤k<64
1 if 64≤k<128
1 if 128≤k<192
−1 if 192≤k<256
−1 if 256≤k<320
1 if 320≤k

TABLE 16

| L-STF | L-LTF |
|---|---|
| 10.2349 | 11.1571 |

Gamma_k,240=1 if k<−320
j if −320≤k<−256
1 if −256≤k<−192
j if −192≤k<−128
1 if −128≤k<−64
j if −64≤k<0
1 if 0≤k<64
j if 64≤k<128
1 if 128≤k<192
j if 192≤k<256
1 if 256≤k<320
j if 320≤k

TABLE 17

| L-STF | L-LTF |
|---|---|
| 10.1510 | 11.1635 |

Gamma_k,240=1 if k<−320
−j if −320≤k<−256
1 if −256≤k<−192
−j if −192≤k<−128
1 if −128≤k<−64
−j if −64≤k<0
1 if 0≤k<64
−j if 64≤k<128
1 if 128≤k<192
−j if 192≤k<256
1 if 256≤k<320
−j if 320≤k

TABLE 18

| L-STF | L-LTF |
|---|---|
| 10.1510 | 11.2026 |

Gamma_k,240=1 if k<−320
−1 if −320≤k<−256
−1 if −256≤k<−192
−1 if −192≤k<−128
1 if −128≤k<−64
−1 if −64≤k<0
−1 if 0≤k<64
−1 if 64≤k<128
1 if 128≤k<192
−1 if 192≤k<256
−1 if 256≤k<320
−1 if 320≤k

TABLE 19

| L-STF | L-LTF |
|---|---|
| 11.8514 | 12.9324 |

In non-contiguous 240 MHz, phase rotation of contiguous 80/160 MHz can be proposed as in A and 1) of B.

Simple repetition phase rotation as in the above various propositions has a PAPR inferior to that in the following proposition of 2). Particularly, repetition of conventional phase rotation has a PAPR much inferior to those of other phase rotations. Accordingly, the above propositions may not be desirable.

2) 80 MHz Phase Rotation Repetition and Phase Rotation Addition in Units of 80 MHz Bandwidth This is a method of repeating 80 MHz phase rotation three times and additionally applying phase rotation in units of 80 MHz to further optimize a PAPR. In a situation in which contiguous/non-contiguous 240 MHz packets are transmitted using multiple RFs respectively corresponding to 80/160 MHz, the same 80 MHz phase rotation is applied to the respective RFs, and additional 80 MHz phase rotation is applied.

Phase rotation to which phase rotation optimized in units of 80 MHz bandwidth in L-STF is added and PAPR are represented below.

Gamma_k,240=1 if k<−320
1 if −320≤k<−256
−1 if −256≤k<−192
−1 if −192≤k<−128
1 if −128≤k<−64
1 if −64≤k<0
−1 if 0≤k<64
−1 if 64≤k<128
−1 if 128≤k<192
−1 if 192≤k<256
1 if 256≤k<320
1 if 320≤k
or
Gamma_k,240=1 if k<−320
1 if −320≤k<−256
−1 if −256≤k<−192
−1 if −192≤k<−128
−1 if −128≤k<−64
−1 if −64≤k<0
1 if 0≤k<64
1 if 64≤k<128
−1 if 128≤k<192
−1 if 192≤k<256
1 if 256≤k<320
1 if 320≤k

TABLE 20

| L-STF | L-LTF |
|---|---|
| 10.1009 | 11.1584 |

Gamma_k,240=1 if k<−320
−1 if −320≤k<−256
−1 if −256≤k<−192
1 if −192≤k<−128
1 if −128≤k<−64
−1 if −64≤k<0
−1 if 0≤k<64
1 if 64≤k<128
−1 if 128≤k<192
1 if 192≤k<256
1 if 256≤k<320
−1 if 320≤k
or
Gamma_k,240=1 if k<−320
−1 if −320≤k<−256
−1 if −256≤k<−192
1 if −192≤k<−128
−1 if −128≤k<−64
1 if −64≤k<0
1 if 0≤k<64
−1 if 64≤k<128
−1 if 128≤k<192
1 if 192≤k<256
1 if 256≤k<320
−1 if 320≤k

TABLE 21

| L-STF | L-LTF |
|---|---|
| 10.0527 | 11.1562 |

Gamma_k,240=1 if k<−320
j if −320≤k<−256
1 if −256≤k<−192
j if −192≤k<−128
j if −128≤k<−64
−1 if −64≤k<0
j if 0≤k<64
−1 if 64≤k<128
1 if 128≤k<192
j if 192≤k<256
1 if 256≤k<320
j if 320≤k
or
Gamma_k,240=1 if k<−320
j if −320≤k<−256
1 if −256≤k<−192
j if −192≤k<−128
−j if −128≤k<−64
1 if −64≤k<0
−j if 0≤k<64
1 if 64≤k<128
1 if 128≤k<192 j if 192≤k<256
1 if 256≤k<320
j if 320≤k

TABLE 22

| L-STF | L-LTF |
|---|---|
| 9.9620 | 11.1564 |

Gamma_k,240=1 if k<−320
−j if −320≤k<−256
1 if −256≤k<−192
−j if −192≤k<−128
j if −128≤k<−64
1 if −64≤k<0
j if 0≤k<64
1 if 64≤k<128
1 if 128≤k<192
−j if 192≤k<256
1 if 256≤k<320
−j if 320≤k
or
Gamma_k,240=1 if k<−320
−j if −320≤k<−256
1 if −256≤k<−192
−j if −192≤k<−128
−j if −128≤k<−64
−1 if −64≤k<0
−j if 0≤k<64
−1 if 64≤k<128
1 if 128≤k<192
−j if 192≤k<256
1 if 256≤k<320
−j if 320≤k

TABLE 23

| L-STF | L-LTF |
|---|---|
| 9.9620 | 11.1564 |

Gamma_k,240=1 if k<−320
−1 if −320≤k<−256
−1 if −256≤k<−192
−1 if −192≤k<−128
j if −128≤k<−64
−j if −64≤k<0
−j if 0≤k<64
−j if 64≤k<128
1 if 128≤k<192
−1 if 192≤k<256
−1 if 256≤k<320
−1 if 320≤k
or
Gamma_k,240=1 if k<−320
−1 if −320≤k<−256
−1 if −256≤k<−192
−1 if −192≤k<−128
−j if −128≤k<−64
j if −64≤k<0
j if 0≤k<64
j if 64≤k<128
1 if 128≤k<192
−1 if 192≤k<256
−1 if 256≤k<320
−1 if 320≤k

TABLE 24

| L-STF | L-LTF | |
|---|---|---|
| 10.2924 | 11.3417 | 1.3258 |

Phase rotation to which phase rotation optimized in units of 80 MHz bandwidth in L-LTF is added and PAPR are represented below.

Gamma_k,240=1 if k<−320 1 if −320≤k<−256
−1 if −256≤k<−192
−1 if −192≤k<−128
−j if −128≤k<−64
−j if −64≤k<0
j if 0≤k<64
j if 64≤k<128
1 if 128≤k<192
1 if 192≤k<256
−1 if 256≤k<320
−1 if 320≤k
or
Gamma_k,240=1 if k<−320
1 if −320≤k<−256
−1 if −256≤k<−192
−1 if −192≤k<−128
j if −128≤k<−64
j if −64≤k<0
−j if 0≤k<64
−j if 64≤k<128
1 if 128≤k<192
1 if 192≤k<256
−1 if 256≤k<320
−1 if 320≤k

TABLE 25

| L-STF | L-LTF |
|---|---|
| 10.1646 | 10.7714 |

Gamma_k,240=1 if k<−320
−1 if −320≤k<−256
−1 if −256≤k<−192
1 if −192≤k<−128
j if −128≤k<−64
−j if −64≤k<0
−j if 0≤k<64
j if 64≤k<128
1 if 128≤k<192
−1 if 192≤k<256
−1 if 256≤k<320
1 if 320≤k
or
Gamma_k,240=1 if k<−320
−1 if −320≤k<−256
−1 if −256≤k<−192
1 if −192≤k<−128
−j if −128≤k<−64
j if −64≤k<0
j if 0≤k<64
−j if 64≤k<128
1 if 128≤k<192
−1 if 192≤k<256
−1 if 256≤k<320
1 if 320≤k

TABLE 26

| L-STF | L-LTF |
|---|---|
| 10.1646 | 10.6317 |

Gamma_k,240=1 if k<−320
j if −320≤k<−256
1 if −256≤k<−192
j if −192≤k<−128
−1 if −128≤k<−64
−j if −64≤k<0
−1 if 0≤k<64
−j if 64≤k<128
−1 if 128≤k<192
−j if 192≤k<256
−1 if 256≤k<320
−j if 320≤k
or
Gamma_k,240=1 if k<−320
j if −320≤k<−256
1 if −256≤k<−192
j if −192≤k<−128
1 if −128≤k<−64
j if −64≤k<0
1 if 0≤k<64
j if 64≤k<128
−1 if 128≤k<192
−j if 192≤k<256
−1 if 256≤k<320
−j if 320≤k

TABLE 27

| L-STF | L-LTF |
|---|---|
| 10.1702 | 11.0311 |

Gamma_k,240=1 if k<−320
−j if −320≤k<−256
1 if −256≤k<−192
−j if −192≤k<−128
1 if −128≤k<−64
−j if −64≤k<0
1 if 0≤k<64
−j if 64≤k<128
−1 if 128≤k<192
j if 192≤k<256
−1 if 256≤k<320
j if 320≤k
or
Gamma_k,240=1 if k<−320
−j if −320≤k<−256
1 if −256≤k<−192
−j if −192≤k<−128
−1 if −128≤k<−64
j if −64≤k<0
−1 if 0≤k<64
j if 64≤k<128
−1 if 128≤k<192
j if 192≤k<256
−1 if 256≤k<320
j if 320≤k

TABLE 28

| L-STF | L-LTF |
|---|---|
| 10.1668 | 11.0355 |

Gamma_k,240=1 if k<−320
−1 if −320≤k<−256
−1 if −256≤k<−192
−1 if −192≤k<−128
j if −128≤k<−64
−j if −64≤k<0
−j if 0≤k<64
−j if 64≤k<128
−j if 128≤k<192
j if 192≤k<256
j if 256≤k<320
j if 320≤k

TABLE 29

| L-STF | L-LTF |
|---|---|
| 10.3116 | 11.3194 |

A subcarrier index may also be corrected and applied to non-contiguous 240 MHz. In the above mathematical expressions, phase rotation of −384≤k<−128 can be applied to 80 MHz having the lowest frequency, phase rotation of −128≤k<128 can be applied to 80 MHz having a second lowest frequency, and phase rotation of 128≤k<384 can be applied to 80 MHz having the highest frequency.

Phase rotation of the seventh group which has a larger PAPR and minimizes a PAPR of L-LTF may be preferred in view of packets.

D. 320 MHz (when 320 MHz is Represented by a Subcarrier Index, −512≤k<511.)

320 MHz includes both contiguous 320 MHz/non-contiguous 320 MHz, and non-contiguous 320 MHz may be 240+80/80+240/160+160/160+80+80/80+160+80/80+80+160/80+80+80+80 MHz.

1) 80 MHz Phase Rotation Repetition

This is the same approach as the method used in legacy 11ax, and in a situation in which contiguous/non-contiguous 320 MHz packets are transmitted using multiple RFs respectively corresponding to 80/160/240 MHz, phase rotations used for the RFs are identical, and thus, implementation may be easy. In contiguous 320 MHz, phase rotation and a maximum PAPR are as follows.

Gamma_k,320=1 if k<−448
1 if −448≤k<−384
−1 if −384≤k<−320
−1 if −320≤k<−256
1 if −256≤k<−192
1 if −192≤k<−128
−1 if −128≤k<−64
−1 if −64≤k<0
1 if 0≤k<64
1 if 64≤k<128
−1 if 128≤k<192
−1 if 192≤k<256
1 if 256≤k<320
1 if 320≤k<384
−1 if 384≤k<448
−1 if 448≤k<512

TABLE 30

| L-STF | L-LTF |
|---|---|
| 11.2703 | 12.2923 |

Gamma_k,320=1 if k<−448
−1 if −448≤k<−384
−1 if −384≤k<−320
1 if −320≤k<−256
1 if −256≤k<−192
−1 if −192≤k<−128
−1 if −128≤k<−64
1 if −64≤k<0
1 if 0≤k<64
−1 if 64≤k<128
−1 if 128≤k<192
1 if 192≤k<256
1 if 256≤k<320
−1 if 320≤k<384
−1 if 384≤k<448
1 if 448≤k<512

TABLE 31

| L-STF | L-LTF |
|---|---|
| 11.2703 | 12.2923 |

Gamma_k,320=1 if k<−448
j if −448≤k<−384
1 if −384≤k<−320
j if −320≤k<−256
1 if −256≤k<−192
j if −192≤k<−128
1 if −128≤k<−64
j if −64≤k<0
1 if 0≤k<64
j if 64≤k<128
1 if 128≤k<192
j if 192≤k<256
1 if 256≤k<320
j if 320≤k<384
1 if 384≤k<448
j if 448≤k<512

TABLE 32

| L-STF | L-LTF |
|---|---|
| 11.2703 | 12.2749 |

Gamma_k,320=1 if k<−448
−j if −448≤k<−384
1 if −384≤k<−320
−j if −320≤k<−256
1 if −256≤k<−192
−j if −192≤k<−128
1 if −128≤k<−64
−j if −64≤k<0
1 if 0≤k<64
−j if 64≤k<128
1 if 128≤k<192
−j if 192≤k<256
1 if 256≤k<320
−j if 320≤k<384
1 if 384≤k<448
−j if 448≤k<512

TABLE 33

| L-STF | L-LTF |
|---|---|
| 11.2703 | 12.2931 |

Gamma_k,320=1 if k<−448
−1 if −448≤k<−384
−1 if −384≤k<−320
−1 if −320≤k<−256
1 if −256≤k<−192
−1 if −192≤k<−128
−1 if −128≤k<−64
−1 if −64≤k<0
1 if 0≤k<64
−1 if 64≤k<128
−1 if 128≤k<192
−1 if 192≤k<256
1 if 256≤k<320
−1 if 320≤k<384
−1 if 384≤k<448
−1 if 448≤k<512

TABLE 34

| L-STF | L-LTF |
|---|---|
| 12.8812 | 14.0793 |

In non-contiguous 320 MHz, phase rotation of contiguous 80/160/240 MHz can be proposed as in A, 1) of B, and 1) of C.

Simple repetition phase rotation as in the above various propositions has a PAPR inferior to that in the following proposition of 2). Particularly, repetition of conventional phase rotation has a PAPR much inferior to those of other phase rotations. Accordingly, the above propositions may not be desirable.

2) 80 MHz phase rotation repetition and phase rotation addition in units of 80 MHz bandwidth This is a method of repeating 80 MHz phase rotation four times and additionally applying phase rotation in units of 80 MHz to further optimize a PAPR. In a situation in which contiguous/non-contiguous 320 MHz packets are transmitted using multiple RFs respectively corresponding to 80/160/240 MHz, the same 80 MHz phase rotation is applied to the respective RFs and additional 80 MHz phase rotation is applied.

Phase rotation to which phase rotation optimized in units of 80 MHz bandwidth in L-STF is added and PAPR are represented below.

Gamma_k,320=1 if k<−448
1 if −448≤k<−384
−1 if −384≤k<−320
−1 if −320≤k<−256
j if −256≤k<−192
j if −192≤k<−128
−j if −128≤k<−64
−j if −64≤k<0
−j if 0≤k<64
−j if 64≤k<128
j if 128≤k<192
j if 192≤k<256
−1 if 256≤k<320
−1 if 320≤k<384
1 if 384≤k<448
1 if 448≤k<512 or
Gamma_k,320=1 if k<−448
1 if −448≤k<−384
−1 if −384≤k<−320
−1 if −320≤k<−256
−j if −256≤k<−192
−j if −192≤k<−128
j if −128≤k<−64
j if −64≤k<0
j if 0≤k<64
j if 64≤k<128
−j if 128≤k<192
−j if 192≤k<256
−1 if 256≤k<320
−1 if 320≤k<384
1 if 384≤k<448
1 if 448≤k<512

TABLE 35

| L-STF | L-LTF |
|---|---|
| 10.6648 | 11.7882 |

Gamma_k,320=1 if k<−448
−1 if −448≤k<−384
−1 if −384≤k<−320
1 if −320≤k<−256
j if −256≤k<−192
−j if −192≤k<−128
−j if −128≤k<−64
j if −64≤k<0
−j if 0≤k<64
j if 64≤k<128
j if 128≤k<192
−j if 192≤k<256
−1 if 256≤k<320
1 if 320≤k<384
1 if 384≤k<448
−1 if 448≤k<512
or
Gamma_k,320=1 if k<−448
−1 if −448≤k<−384
−1 if −384≤k<−320
1 if −320≤k<−256
−j if −256≤k<−192
j if −192≤k<−128
j if −128≤k<−64
−j if −64≤k<0
j if 0≤k<64
−j if 64≤k<128
−j if 128≤k<192
j if 192≤k<256
−1 if 256≤k<320
1 if 320≤k<384
1 if 384≤k<448
−1 if 448≤k<512

TABLE 36

| L-STF | L-LTF |
|---|---|
| 10.5969 | 11.7304 |

Gamma_k,320=1 if k<−448
j if −448≤k<−384
1 if −384≤k<−320
j if −320≤k<−256
j if −256≤k<−192
−1 if −192≤k<−128
j if −128≤k<−64
−1 if −64≤k<0
1 if 0≤k<64
j if 64≤k<128
1 if 128≤k<192
j if 192≤k<256
−j if 256≤k<320
1 if 320≤k<384
−j if 384≤k<448
1 if 448≤k<512
or
Gamma_k,320=1 if k<−448
j if −448≤k<−384
1 if −384≤k<−320
j if −320≤k<−256
−j if −256≤k<−192
1 if −192≤k<−128
−j if −128≤k<−64
1 if −64≤k<0
−1 if 0≤k<64
−j if 64≤k<128
−1 if 128≤k<192
−j if 192≤k<256
−j if 256≤k<320
1 if 320≤k<384
−j if 384≤k<448
1 if 448≤k<512

TABLE 37

| L-STF | L-LTF |
|---|---|
| 10.7636 | 11.7791 |

Gamma_k,320=1 if k<−448
−j if −448≤k<−384
1 if −384≤k<−320
−j if −320≤k<−256
j if −256≤k<−192
1 if −192≤k<−128
j if −128≤k<−64
1 if −64≤k<0
−1 if 0≤k<64
j if 64≤k<128
−1 if 128≤k<192
j if 192≤k<256
j if 256≤k<320
1 if 320≤k<384
j if 384≤k<448
1 if 448≤k<512
or
Gamma_k,320=1 if k<−448
−j if −448≤k<−384
1 if −384≤k<−320
−j if −320≤k<−256
−j if −256≤k<−192
−1 if −192≤k<−128
−j if −128≤k<−64
−1 if −64≤k<0
1 if 0≤k<64
−j if 64≤k<128
1 if 128≤k<192
−j if 192≤k<256
j if 256≤k<320

1 if 320≤k<384
j if 384≤k<448
1 if 448≤k<512

TABLE 38

| L-STF | L-LTF |
|---|---|
| 10.7636 | 11.7791 |

Gamma_k,320=1 if k<−448
−1 if −448≤k<−384
−1 if −384≤k<−320
−1 if −320≤k<−256
j if −256≤k<−192
−j if −192≤k<−128
−j if −128≤k<−64
−j if −64≤k<0
1 if 0≤k<64
−1 if 64≤k<128
−1 if 128≤k<192
−1 if 192≤k<256
j if 256≤k<320
−j if 320≤k<384
−j if 384≤k<448
−j if 448≤k<512
or
Gamma_k,320=1 if k<−448
−1 if −448≤k<−384
−1 if −384≤k<−320
−1 if −320≤k<−256
−j if −256≤k<−192
j if −192≤k<−128
j if −128≤k<−64
j if −64≤k<0
1 if 0≤k<64
−1 if 64≤k<128
−1 if 128≤k<192
−1 if 192≤k<256
−j if 256≤k<320
j if 320≤k<384
j if 384≤k<448
j if 448≤k<512

TABLE 39

| L-STF | L-LTF |
|---|---|
| 10.7392 | 11.8510/11.8567 |

Phase rotation to which phase rotation optimized in units of 80 MHz bandwidth in L-LTF and PAPR are represented below.
Gamma_k,320=1 if k<−448
1 if −448≤k<−384
−1 if −384≤k<−320
−1 if −320≤k<−256
1 if −256≤k<−192
1 if −192≤k<−128
−1 if −128≤k<−64
−1 if −64≤k<0
j if 0≤k<64
j if 64≤k<128
−j if 128≤k<192
−j if 192≤k<256
−j if 256≤k<320
−j if 320≤k<384
j if 384≤k<448
j if 448≤k<512
or
Gamma_k,320=1 if k<−448
1 if −448≤k<−384
−1 if −384≤k<−320
−1 if −320≤k<−256
−1 if −256≤k<−192
−1 if −192≤k<−128
1 if −128≤k<−64
1 if −64≤k<0
−j if 0≤k<64
−j if 64≤k<128
j if 128≤k<192
j if 192≤k<256
−j if 256≤k<320
−j if 320≤k<384
j if 384≤k<448
j if 448≤k<512

TABLE 40

| L-STF | L-LTF |
|---|---|
| 10.8912 | 11.7654 |

Gamma_k,320=1 if k<−448
−1 if −448≤k<−384
−1 if −384≤k<−320
1 if −320≤k<−256
1 if −256≤k<−192
−1 if −192≤k<−128
−1 if −128≤k<−64
1 if −64≤k<0
j if 0≤k<64
−j if 64≤k<128
−j if 128≤k<192
j if 192≤k<256
−j if 256≤k<320
j if 320≤k<384
j if 384≤k<448
−j if 448≤k<512
or
Gamma_k,320=1 if k<−448
−1 if −448≤k<−384
−1 if −384≤k<−320
1 if −320≤k<−256
1 if −256≤k<−192
−1 if −192≤k<−128
−1 if −128≤k<−64
1 if −64≤k<0
−j if 0≤k<64
j if 64≤k<128
j if 128≤k<192
−j if 192≤k<256
j if 256≤k<320
−j if 320≤k<384
−j if 384≤k<448
j if 448≤k<512
or
Gamma_k,320=1 if k<−448
−1 if −448≤k<−384
−1 if −384≤k<−320
1 if −320≤k<−256
−1 if −256≤k<−192
1 if −192≤k<−128
1 if −128≤k<−64

−1 if −64≤k<0
j if 0≤k<64
−j if 64≤k<128
−j if 128≤k<192
j if 192≤k<256
j if 256≤k<320
−j if 320≤k<384
−j if 384≤k<448
j if 448≤k<512
or
Gamma_k,320=1 if k<−448
−1 if −448≤k<−384
−1 if −384≤k<−320
1 if −320≤k<−256
−1 if −256≤k<−192
1 if −192≤k<−128
1 if −128≤k<−64
−1 if −64≤k<0
−j if 0≤k<64
j if 64≤k<128
j if 128≤k<192
−j if 192≤k<256
−j if 256≤k<320
j if 320≤k<384
j if 384≤k<448
−j if 448≤k<512

TABLE 41

| L-STF | L-LTF |
| --- | --- |
| 10.9746 | 11.7227 |

Gamma_k,320=1 if k<−448
j if −448≤k<−384
1 if −384≤k<−320
j if −320≤k<−256
j if −256≤k<−192
−1 if −192≤k<−128
j if −128≤k<−64
−1 if −64≤k<0
−j if 0≤k<64
1 if 64≤k<128
−j if 128≤k<192
1 if 192≤k<256
−1 if 256≤k<320
−j if 320≤k<384
−1 if 384≤k<448
−j if 448≤k<512
or
Gamma_k,320=1 if k<−448
j if −448≤k<−384
1 if −384≤k<−320
j if −320≤k<−256
−j if −256≤k<−192
1 if −192≤k<−128
−j if −128≤k<−64
1 if −64≤k<0
j if 0≤k<64
−1 if 64≤k<128
j if 128≤k<192
−1 if 192≤k<256
−1 if 256≤k<320
−j if 320≤k<384
−1 if 384≤k<448
−j if 448≤k<512

TABLE 42

| L-STF | L-LTF |
| --- | --- |
| 10.8137 | 11.5886 |

Gamma_k,320=1 if k<−448
−j if −448≤k<−384
1 if −384≤k<−320
−j if −320≤k<−256
j if −256≤k<−192
1 if −192≤k<−128
j if −128≤k<−64
1 if −64≤k<0
−j if 0≤k<64
−1 if 64≤k<128
−j if 128≤k<192
−1 if 192≤k<256
−1 if 256≤k<320
j if 320≤k<384
−1 if 384≤k<448
j if 448≤k<512
or
Gamma_k,320=1 if k<−448
−j if −448≤k<−384
1 if −384≤k<−320
−j if −320≤k<−256
−j if −256≤k<−192
−1 if −192≤k<−128
−j if −128≤k<−64
−1 if −64≤k<0
j if 0≤k<64
1 if 64≤k<128
j if 128≤k<192
1 if 192≤k<256
−1 if 256≤k<320
j if 320≤k<384
−1 if 384≤k<448
j if 448≤k<512

TABLE 43

| L-STF | L-LTF |
| --- | --- |
| 10.8137 | 11.5909 |

Gamma_k,320=1 if k<−448
−1 if −448≤k<−384
−1 if −384≤k<−320
−1 if −320≤k<−256
j if −256≤k<−192
−j if −192≤k<−128
−j if −128≤k<−64
−j if −64≤k<0
1 if 0≤k<64
−1 if 64≤k<128
−1 if 128≤k<192
−1 if 192≤k<256
j if 256≤k<320
−j if 320≤k<384
−j if 384≤k<448
−j if 448≤k<512

TABLE 44

| L-STF | L-LTF |
|---|---|
| 10.7392 | 11.8510 |

TABLE 45

| L-STF | L-LTF |
|---|---|
| 10.7332 | 12.1712 |

A subcarrier index may also be corrected and applied to non-contiguous 320 MHz. In the above mathematical expressions, phase rotation of $-512 \leq k < -256$ can be applied to 80 MHz having the lowest frequency, phase rotation of $-256 \leq k < 0$ can be applied to 80 MHz having a second lowest frequency, phase rotation of $0 \leq k < 256$ can be applied to 80 MHz having a third lowest frequency, and phase rotation of $256 \leq k < 512$ can be applied to 80 MHz having the highest frequency.

This may be preferred with respect to PAPR although implementation complexity is slightly high, and phase rotation of the eighth group which has a larger PAPR and minimizes a PAPR of L-LTF may be particularly preferred.

3) 160 MHz Phase Rotation Repetition

In this case, since 160 MHz phase rotation (phase rotation proposed in B) is repeatedly applied twice, phase rotations used for RFs are identical in a situation in which contiguous/non-contiguous 320 MHz packets are transmitted using two RFs each corresponding to 160 MHz, and thus implementation may be easy. In contiguous 160 MHz, phase rotation and a maximum PAPR are as follows. Here, phase rotation applied to each RF having a maximum transmission available bandwidth of 80/240 MHz varies according to bandwidth position. Phase rotation may be represented as follows in contiguous 320 MHz, and a maximum PAPR is also represented below.

Gamma_k,320=1 if k<−448
j if −448≤k<−384
1 if −384≤k<−320
j if −320≤k<−256
−j if −256≤k<−192
−1 if −192≤k<−128
−j if −128≤k<−64
−1 if −64≤k<0
1 if 0≤k<64
j if 64≤k<128
1 if 128≤k<192
j if 192≤k<256
−j if 256≤k<320
−1 if 320≤k<384
−j if 384≤k<448
−1 if 448≤k<512
or
Gamma_k,320=1 if k<−448
−j if −448≤k<−384
1 if −384≤k<−320
−j if −320≤k<−256
j if −256≤k<−192
−1 if −192≤k<−128
j if −128≤k<−64
−1 if −64≤k<0
1 if 0≤k<64
−j if 64≤k<128
1 if 128≤k<192
−j if 192≤k<256
j if 256≤k<320
−1 if 320≤k<384
j if 384≤k<448
−1 if 448≤k<512

Gamma_k,320=1 if k<−448
1 if −448≤k<−384
−1 if −384≤k<−320
−1 if −320≤k<−256
−j if −256≤k<−192
j if −192≤k<−128
j if −128≤k<−64
−j if −64≤k<0
1 if 0≤k<64
1 if 64≤k<128
−1 if 128≤k<192
−1 if 192≤k<256
−j if 256≤k<320
j if 320≤k<384
j if 384≤k<448
−j if 448≤k<512
or
Gamma_k,320=1 if k<−448
1 if −448≤k<−384
−1 if −384≤k<−320
−1 if −320≤k<−256
j if −256≤k<−192
−j if −192≤k<−128
−j if −128≤k<−64
j if −64≤k<0
1 if 0≤k<64
1 if 64≤k<128
−1 if 128≤k<192
−1 if 192≤k<256
j if 256≤k<320
−j if 320≤k<384
−j if 384≤k<448
j if 448≤k<512
or
Gamma_k,320=1 if k<−448
−1 if −448≤k<−384
−1 if −384≤k<−320
1 if −320≤k<−256
j if −256≤k<−192
j if −192≤k<−128
−j if −128≤k<−64
−j if −64≤k<0
1 if 0≤k<64
−1 if 64≤k<128
−1 if 128≤k<192
1 if 192≤k<256
j if 256≤k<320
j if 320≤k<384
−j if 384≤k<448
−j if 448≤k<512 or
Gamma_k,320=1 if k<−448
−1 if −448≤k<−384
−1 if −384≤k<−320
1 if −320≤k<−256
−j if −256≤k<−192
−j if −192≤k<−128
j if −128≤k<−64
j if −64≤k<0
1 if 0≤k<64
−1 if 64≤k<128
−1 if 128≤k<192

1 if 192≤k<256
−j if 256≤k<320
−j if 320≤k<384
j if 384≤k<448
j if 448≤k<512

TABLE 46

| L-STF | L-LTF |
|---|---|
| 11.2703 | 11.8169 |

Gamma_k,320=1 if k<−448
−1 if −448≤k<−384
−1 if −384≤k<−320
−1 if −320≤k<−256
1 if −256≤k<−192
−1 if −192≤k<−128
−1 if −128≤k<−64
−1 if −64≤k<0
1 if 0≤k<64
−1 if 64≤k<128
−1 if 128≤k<192
−1 if 192≤k<256
1 if 256≤k<320
−1 if 320≤k<384
−1 if 384≤k<448
−1 if 448≤k<512

TABLE 47

| L-STF | L-LTF |
|---|---|
| 12.8812 | 14.0793 |

Gamma_k,320=1 if k<−448
1 if −448≤k<−384
−1 if −384≤k<−320
−1 if −320≤k<−256
1 if −256≤k<−192
1 if −192≤k<−128
−1 if −128≤k<−64
−1 if −64≤k<0
1 if 0≤k<64
1 if 64≤k<128
−1 if 128≤k<192
−1 if 192≤k<256
1 if 256≤k<320
1 if 320≤k<384
−1 if 384≤k<448
−1 if 448≤k<512

TABLE 48

| L-STF | L-LTF |
|---|---|
| 11.2703 | 12.2923 |

Gamma_k,320=1 if k<−448
−1 if −448≤k<−384
−1 if −384≤k<−320
1 if −320≤k<−256
1 if −256≤k<−192
−1 if −192≤k<−128
−1 if −128≤k<−64
1 if −64≤k<0
1 if 0≤k<64
−1 if 64≤k<128

−1 if 128≤k<192
1 if 192≤k<256
1 if 256≤k<320
−1 if 320≤k<384
−1 if 384≤k<448
1 if 448≤k<512

TABLE 49

| L-STF | L-LTF |
|---|---|
| 11.2703 | 12.2923 |

Gamma_k,320=1 if k<−448
j if −448≤k<−384
1 if −384≤k<−320
j if −320≤k<−256
1 if −256≤k<−192
j if −192≤k<−128
1 if −128≤k<−64
j if −64≤k<0
1 if 0≤k<64
j if 64≤k<128
1 if 128≤k<192
j if 192≤k<256
1 if 256≤k<320
j if 320≤k<384
1 if 384≤k<448
j if 448≤k<512

TABLE 50

| L-STF | L-LTF |
|---|---|
| 11.2703 | 12.2749 |

Gamma_k,320=1 if k<−448
−j if −448≤k<−384
1 if −384≤k<−320
−j if −320≤k<−256
1 if −256≤k<−192
−j if −192≤k<−128
1 if −128≤k<−64
−j if −64≤k<0
1 if 0≤k<64
−j if 64≤k<128
1 if 128≤k<192
−j if 192≤k<256
1 if 256≤k<320
−j if 320≤k<384
1 if 384≤k<448
−j if 448≤k<512

TABLE 51

| L-STF | L-LTF |
|---|---|
| 11.2703 | 12.2931 |

Gamma_k,320=1 if k<−448
−1 if −448≤k<−384
−1 if −384≤k<−320
−1 if −320≤k<−256
−1 if −256≤k<−192
1 if −192≤k<−128
1 if −128≤k<−64
1 if −64≤k<0
1 if 0≤k<64

−1 if 64≤k<128
−1 if 128≤k<192
−1 if 192≤k<256
−1 if 256≤k<320
1 if 320≤k<384
1 if 384≤k<448
1 if 448≤k<512

TABLE 52

| L-STF | L-LTF |
|---|---|
| 11.1203 | 12.3068 |

A subcarrier index may be corrected and applied to any type of non-contiguous 320 MHz. In the above mathematical expressions, phase rotation of −512≤k<−256 can be applied to 80 MHz having the lowest frequency, phase rotation of −256≤k<0 can be applied to 80 MHz having a second lowest frequency, phase rotation of 0≤k<256 can be applied to 80 MHz having a third lowest frequency, and phase rotation of 256≤k<512 can be applied to 80 MHz having the highest frequency.

Simple repetition phase rotation as in the above various propositions has a PAPR inferior to that in the following proposition of 4). Accordingly, the above propositions may not be desirable.

4) 160 MHz Phase Rotation Repetition and Phase Rotation Addition in Units of 160 MHz Bandwidth This is a method of repeating 160 MHz phase rotation (phase rotation proposed in B) twice and additionally applying phase rotation in units of 160 MHz to further optimize a PAPR. In a situation in which contiguous/non-contiguous 320 MHz packets are transmitted using two RFs MHz each corresponding to 160 MHz, the same 160 MHz phase rotation is applied to each RF and additional phase rotation per 160 MHz is applied. Here, phase rotation applied to the RFs having maximum transmission available bandwidths of 80/240 MHz may vary according to bandwidth position.

Phase rotation to which phase rotation optimized in units of 160 MHz bandwidth in L-STF is added and PAPR are represented below.

Gamma_k,320=1 if k<−448
j if −448≤k<−384
1 if −384≤k<−320
j if −320≤k<−256
−j if −256≤k<−192
−1 if −192≤k<−128
−j if −128≤k<−64
−1 if −64≤k<0
1 if 0≤k<64
j if 64≤k<128
1 if 128≤k<192
j if 192≤k<256
−j if 256≤k<320
−1 if 320≤k<384
−j if 384≤k<448
−1 if 448≤k<512
or
Gamma_k,320=1 if k<−448
−j if −448≤k<−384
1 if −384≤k<−320
−j if −320≤k<−256
j if −256≤k<−192
−1 if −192≤k<−128
j if −128≤k<−64
−1 if −64≤k<0
1 if 0≤k<64
−j if 64≤k<128
1 if 128≤k<192
−j if 192≤k<256
j if 256≤k<320
−1 if 320≤k<384
j if 384≤k<448
−1 if 448≤k<512

TABLE 53

| L-STF | L-LTF |
|---|---|
| 10.7332 | 12.1712 |

Gamma_k,320=1 if k<−448
1 if −448≤k<−384
−1 if −384≤k<−320
−1 if −320≤k<−256
−j if −256≤k<−192
j if −192≤k<−128
j if −128≤k<−64
−j if −64≤k<0
−1 if 0≤k<64
−1 if 64≤k<128
1 if 128≤k<192
1 if 192≤k<256
j if 256≤k<320
−j if 320≤k<384
−j if 384≤k<448
j if 448≤k<512
or
Gamma_k,320=1 if k<−448
1 if −448≤k<−384
−1 if −384≤k<−320
−1 if −320≤k<−256
j if −256≤k<−192
−j if −192≤k<−128
−j if −128≤k<−64
j if −64≤k<0
−1 if 0≤k<64
−1 if 64≤k<128
1 if 128≤k<192
1 if 192≤k<256
−j if 256≤k<320
j if 320≤k<384
j if 384≤k<448
−j if 448≤k<512
or
Gamma_k,320=1 if k<−448
−1 if −448≤k<−384
−1 if −384≤k<−320
1 if −320≤k<−256
j if −256≤k<−192
j if −192≤k<−128
−j if −128≤k<−64
−j if −64≤k<0
−1 if 0≤k<64
1 if 64≤k<128
1 if 128≤k<192
−1 if 192≤k<256
−j if 256≤k<320
−j if 320≤k<384
j if 384≤k<448
j if 448≤k<512
or
Gamma_k,320=1 if k<−448

−1 if −448≤k<−384
−1 if −384≤k<−320
1 if −320≤k<−256
−j if −256≤k<−192
−j if −192≤k<−128
j if −128≤k<−64
j if −64≤k<0
−1 if 0≤k<64
1 if 64≤k<128
1 if 128≤k<192
−1 if 192≤k<256
j if 256≤k<320
j if 320≤k<384
−j if 384≤k<448
−j if 448≤k<512

TABLE 54

| L-STF | L-LTF |
|---|---|
| 11.2437 | 11.9929 |

Gamma_k,320=1 if k<−448
−1 if −448≤k<−384
−1 if −384≤k<−320
−1 if −320≤k<−256
1 if −256≤k<−192
−1 if −192≤k<−128
−1 if −128≤k<−64
−1 if −64≤k<0
−1 if 0≤k<64
1 if 64≤k<128
1 if 128≤k<192
1 if 192≤k<256
−1 if 256≤k<320
1 if 320≤k<384
1 if 384≤k<448
1 if 448≤k<512

TABLE 55

| L-STF | L-LTF |
|---|---|
| 11.1203 | 12.3025 |

Gamma_k,320=1 if k<−448
1 if −448≤k<−384
−1 if −384≤k<−320
−1 if −320≤k<−256
1 if −256≤k<−192
−1 if −192≤k<−128
−1 if −128≤k<−64
−1 if −64≤k<0
−1 if 0≤k<64
−1 if 64≤k<128
1 if 128≤k<192
1 if 192≤k<256
−1 if 256≤k<320
−1 if 320≤k<384
1 if 384≤k<448
1 if 448≤k<512

TABLE 56

| L-STF | L-LTF |
|---|---|
| 11.1203 | 12.3004 |

Gamma_k,320=1 if k<−448
−1 if −448≤k<−384
−1 if −384≤k<−320
1 if −320≤k<−256
1 if −256≤k<−192
−1 if −192≤k<−128
−1 if −128≤k<−64
1 if −64≤k<0
−1 if 0≤k<64
1 if 64≤k<128
1 if 128≤k<192
−1 if 192≤k<256
−1 if 256≤k<320
1 if 320≤k<384
1 if 384≤k<448
−1 if 448≤k<512

TABLE 57

| L-STF | L-LTF |
|---|---|
| 11.1570 | 12.2875 |

Gamma_k,320=1 if k<−448
j if −448≤k<−384
1 if −384≤k<−320
j if −320≤k<−256
1 if −256≤k<−192
j if −192≤k<−128
1 if −128≤k<−64
j if −64≤k<0
−j if 0≤k<64
1 if 64≤k<128
−j if 128≤k<192
1 if 192≤k<256
−j if 256≤k<320
1 if 320≤k<384
−j if 384≤k<448
1 if 448≤k<512

TABLE 58

| L-STF | L-LTF |
|---|---|
| 11.1203 | 12.4099 |

Gamma_k,320=1 if k<−448
−j if −448≤k<−384
1 if −384≤k<−320
−j if −320≤k<−256
1 if −256≤k<−192
−j if −192≤k<−128
1 if −128≤k<−64
−j if −64≤k<0
j if 0≤k<64
1 if 64≤k<128
j if 128≤k<192
1 if 192≤k<256
j if 256≤k<320
1 if 320≤k<384
j if 384≤k<448
1 if 448≤k<512

TABLE 59

| L-STF | L-LTF |
|---|---|
| 11.1203 | 12.4099 |

Gamma_k,320=1 if k<−448
−1 if −448≤k<−384
−1 if −384≤k<−320
−1 if −320≤k<−256
−1 if −256≤k<−192
1 if −192≤k<−128
1 if −128≤k<−64
1 if −64≤k<0
1 if 0≤k<64
−1 if 64≤k<128
−1 if 128≤k<192
−1 if 192≤k<256
−1 if 256≤k<320
1 if 320≤k<384
1 if 384≤k<448
1 if 448≤k<512
or
Gamma_k,320=1 if k<−448
−1 if −448≤k<−384
−1 if −384≤k<−320
−1 if −320≤k<−256
−1 if −256≤k<−192
1 if −192≤k<−128
1 if −128≤k<−64
1 if −64≤k<0
−1 if 0≤k<64
1 if 64≤k<128
1 if 128≤k<192
1 if 192≤k<256
1 if 256≤k<320
−1 if 320≤k<384
−1 if 384≤k<448
−1 if 448≤k<512

TABLE 60

| L-STF | L-LTF |
|---|---|
| 11.1203 | 12.3068/12.3023 |

Phase rotation to which phase rotation optimized in units of 160 MHz bandwidth in L-LTF is added and PAPR are represented below.
Gamma_k,320=1 if k<−448
j if −448≤k<−384
1 if −384≤k<−320
j if −320≤k<−256
−j if −256≤k<−192
−1 if −192≤k<−128
−j if −128≤k<−64
−1 if −64≤k<0
1 if 0≤k<64
j if 64≤k<128
1 if 128≤k<192
j if 192≤k<256
−j if 256≤k<320
−1 if 320≤k<384
−j if 384≤k<448
−1 if 448≤k<512
or
Gamma_k,320=1 if k<−448
−j if −448≤k<−384
1 if −384≤k<−320
−j if −320≤k<−256
j if −256≤k<−192
−1 if −192≤k<−128
j if −128≤k<−64
−1 if −64≤k<0
1 if 0≤k<64
−j if 64≤k<128
1 if 128≤k<192
−j if 192≤k<256
j if 256≤k<320
−1 if 320≤k<384
j if 384≤k<448
−1 if 448≤k<512

TABLE 61

| L-STF | L-LTF |
|---|---|
| 10.7332 | 12.1712 |

Gamma_k,320=1 if k<−448
1 if −448≤k<−384
−1 if −384≤k<−320
−1 if −320≤k<−256
−j if −256≤k<−192
j if −192≤k<−128
j if −128≤k<−64
−j if −64≤k<0
1 if 0≤k<64
1 if 64≤k<128
−1 if 128≤k<192
−1 if 192≤k<256
−j if 256≤k<320
j if 320≤k<384
j if 384≤k<448
−j if 448≤k<512
or
Gamma_k,320=1 if k<−448
1 if −448≤k<−384
−1 if −384≤k<−320
−1 if −320≤k<−256
j if −256≤k<−192
−j if −192≤k<−128
−j if −128≤k<−64
j if −64≤k<0
1 if 0≤k<64
1 if 64≤k<128
−1 if 128≤k<192
−1 if 192≤k<256
j if 256≤k<320
−j if 320≤k<384
−j if 384≤k<448
j if 448≤k<512
or
Gamma_k,320=1 if k<−448
−1 if −448≤k<−384
−1 if −384≤k<−320
1 if −320≤k<−256
j if −256≤k<−192
j if −192≤k<−128
−j if −128≤k<−64
−j if −64≤k<0
1 if 0≤k<64
−1 if 64≤k<128
−1 if 128≤k<192

1 if 192≤k<256
j if 256≤k<320
j if 320≤k<384
−j if 384≤k<448
−j if 448≤k<512
or
Gamma_k,320=1 if k<−448
−1 if −448≤k<−384
−1 if −384≤k<−320
1 if −320≤k<−256
−j if −256≤k<−192
−j if −192≤k<−128
j if −128≤k<−64
j if −64≤k<0
1 if 0≤k<64
−1 if 64≤k<128
−1 if 128≤k<192
1 if 192≤k<256
−j if 256≤k<320
−j if 320≤k<384
j if 384≤k<448
j if 448≤k<512

TABLE 62

| L-STF | L-LTF |
|---|---|
| 11.2703 | 11.8169 |

Gamma_k,320=1 if k<−448
−1 if −448≤k<−384
−1 if −384≤k<−320
−1 if −320≤k<−256
1 if −256≤k<−192
−1 if −192≤k<−128
−1 if −128≤k<−64
−1 if −64≤k<0
−1 if 0≤k<64
1 if 64≤k<128
1 if 128≤k<192
1 if 192≤k<256
−1 if 256≤k<320
1 if 320≤k<384
1 if 384≤k<448
1 if 448≤k<512

TABLE 63

| L-STF | L-LTF |
|---|---|
| 11.1203 | 12.3025 |

Gamma_k,320=1 if k<−448
1 if −448≤k<−384
−1 if −384≤k<−320
−1 if −320≤k<−256
1 if −256≤k<−192
1 if −192≤k<−128
−1 if −128≤k<−64
−1 if −64≤k<0
j if 0≤k<64
j if 64≤k<128
−j if 128≤k<192
−j if 192≤k<256
j if 256≤k<320
j if 320≤k<384
−j if 384≤k<448

−j if 448≤k<512
or
Gamma_k,320=1 if k<−448
1 if −448≤k<−384
−1 if −384≤k<−320
−1 if −320≤k<−256
1 if −256≤k<−192
1 if −192≤k<−128
−1 if −128≤k<−64
−1 if −64≤k<0
−j if 0≤k<64
−j if 64≤k<128
j if 128≤k<192
j if 192≤k<256
−j if 256≤k<320
−j if 320≤k<384
j if 384≤k<448
j if 448≤k<512

TABLE 64

| L-STF | L-LTF |
|---|---|
| 11.4557 | 12.0470 |

Gamma_k,320=1 if k<−448
−1 if −448≤k<−384
−1 if −384≤k<−320
1 if −320≤k<−256
1 if −256≤k<−192
−1 if −192≤k<−128
−1 if −128≤k<−64
1 if −64≤k<0
−j if 0≤k<64
j if 64≤k<128
j if 128≤k<192
−j if 192≤k<256
−j if 256≤k<320
j if 320≤k<384
j if 384≤k<448
−j if 448≤k<512
or
Gamma_k,320=1 if k<−448
−1 if −448≤k<−384
−1 if −384≤k<−320
1 if −320≤k<−256
1 if −256≤k<−192
−1 if −192≤k<−128
−1 if −128≤k<−64
1 if −64≤k<0
j if 0≤k<64
−j if 64≤k<128
−j if 128≤k<192
j if 192≤k<256
j if 256≤k<320
−j if 320≤k<384
−j if 384≤k<448
j if 448≤k<512

TABLE 65

| L-STF | L-LTF |
|---|---|
| 11.4977 | 12.1431 |

Gamma_k,320=1 if k<−448
j if −448≤k<−384

1 if $-384 \leq k < -320$
j if $-320 \leq k < -256$
1 if $-256 \leq k < -192$
j if $-192 \leq k < -128$
1 if $-128 \leq k < -64$
j if $-64 \leq k < 0$
-1 if $0 \leq k < 64$
-j if $64 \leq k < 128$
-1 if $128 \leq k < 192$
-j if $192 \leq k < 256$
-1 if $256 \leq k < 320$
-j if $320 \leq k < 384$
-1 if $384 \leq k < 448$
-j if $448 \leq k < 512$

TABLE 66

| L-STF | L-LTF |
|---|---|
| 11.2703 | 12.1489 |

Gamma_k,320=1 if $k < -448$
-j if $-448 \leq k < -384$
1 if $-384 \leq k < -320$
-j if $-320 \leq k < -256$
1 if $-256 \leq k < -192$
-j if $-192 \leq k < -128$
1 if $-128 \leq k < -64$
-j if $-64 \leq k < 0$
-1 if $0 \leq k < 64$
j if $64 \leq k < 128$
-1 if $128 \leq k < 192$
j if $192 \leq k < 256$
-1 if $256 \leq k < 320$
j if $320 \leq k < 384$
-1 if $384 \leq k < 448$
j if $448 \leq k < 512$

TABLE 67

| L-STF | L-LTF |
|---|---|
| 11.2703 | 12.1515 |

Gamma_k,320=1 if $k < -448$
-1 if $-448 \leq k < -384$
-1 if $-384 \leq k < -320$
-1 if $-320 \leq k < -256$
-1 if $-256 \leq k < -192$
1 if $-192 \leq k < -128$
1 if $-128 \leq k < -64$
1 if $-64 \leq k < 0$
j if $0 \leq k < 64$
-j if $64 \leq k < 128$
-j if $128 \leq k < 192$
-j if $192 \leq k < 256$
-j if $256 \leq k < 320$
j if $320 \leq k < 384$
j if $384 \leq k < 448$
j if $448 \leq k < 512$
or
Gamma_k,320=1 if $k < -448$
-1 if $-448 \leq k < -384$
-1 if $-384 \leq k < -320$
-1 if $-320 \leq k < -256$
-1 if $-256 \leq k < -192$
1 if $-192 \leq k < -128$
1 if $-128 \leq k < -64$
1 if $-64 \leq k < 0$
-j if $0 \leq k < 64$
j if $64 \leq k < 128$
j if $128 \leq k < 192$
j if $192 \leq k < 256$
j if $256 \leq k < 320$
-j if $320 \leq k < 384$
-j if $384 \leq k < 448$
-j if $448 \leq k < 512$

TABLE 68

| L-STF | L-LTF |
|---|---|
| 11.1576 | 12.2669 |

A subcarrier index may be corrected and applied to any type of non-contiguous 320 MHz. In the above mathematical expressions, phase rotation of $-512 \leq k < -256$ can be applied to 80 MHz having the lowest frequency, phase rotation of $-256 \leq k < 0$ can be applied to 80 MHz having a second lowest frequency, phase rotation of $0 \leq k < 256$ can be applied to 80 MHz having a third lowest frequency, and phase rotation of $256 \leq k < 512$ can be applied to 80 MHz having the highest frequency.

The above proposition is more complicated than the proposition of 2) of D and does not have satisfactory PAPR, and thus, may not be preferred.

The phase rotation values proposed above may be multiplied by the same value and used (e.g., multiplied by 1, -1, j, or -j and used), the order thereof may be changed and used (e.g., [1 -1 -1 -1 1 -1 -1 -1] is changed to [-1 -1 -1 1 1 -1 -1 -1 1] from a low frequency to a high frequency), or the order of the phase rotation values may be changed and the phase rotation values may be multiplied by the same value (e.g., [1 -1 -1 -1 1 -1 -1 -1] is changed to [-1 -1 -1 1 1 -1 -1 -1 1] from a low frequency to a high frequency and multiplied by -1). In this case, the phase rotation values have the same PAPR.

Figure 19:
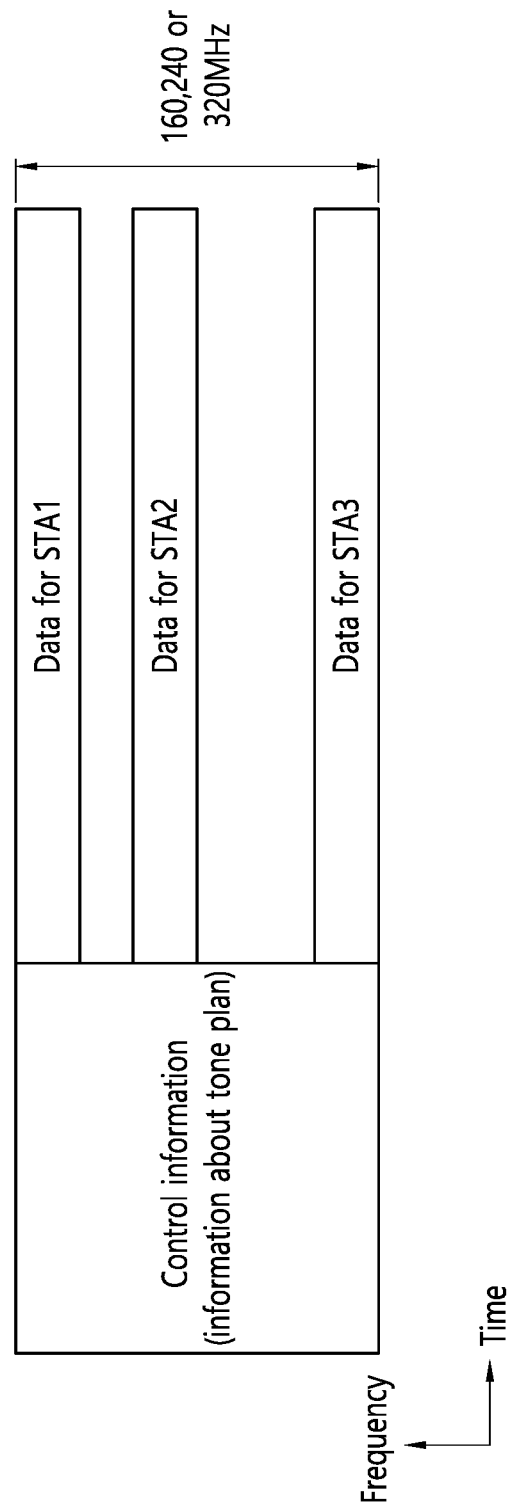
FIG. 19 illustrates an example of performing OFDMA transmission in a 160 MHz, 240 MHz, or 320 MHz band according to the present embodiment.

FIG. 19 illustrates an example of OFDMA transmission in a 160 MHz, 240 MHz, or 320 MHz band according to the present embodiment.

Referring to FIG. 19, an AP may transmit PPDU to STA 1 to STA 3.

The PPDU may include control information including information about a tone plan. STA1 to STA 3 may transmit/receive data in RUs based on the information about the tone plan in 160 MHz, 240 MHz, or 320 MHz.

That is, the AP may transmit the information about the tone plan to all STAs in a BSS in 160 MHz, 240 MHz, or 320 MHz, and the STAs may acquire scheduling information of data thereof based on the information about the tone plan. Accordingly, STA 1 to STA 3 having data among all STAs in the BSS can transmit/receive data through RUs allocated thereto based on the information about the tone plan. The data may include both downlink data and uplink data.

Figure 20:
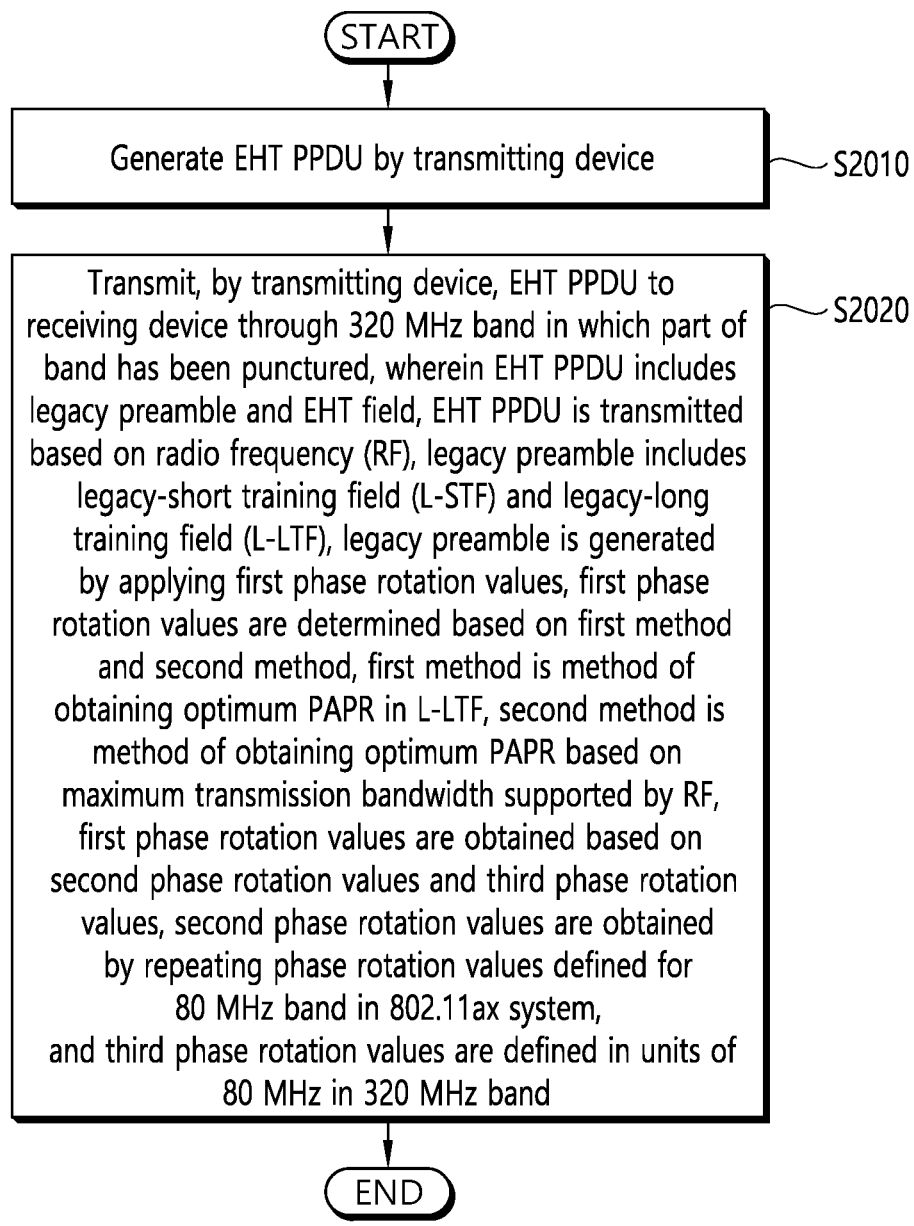
FIG. 20 is a flowchart illustrating a procedure of transmitting an EHT PPDU according to the present embodiment.

FIG. 20 is a flowchart illustrating a procedure of transmitting an EHT PPDU according to the present embodiment.

The example of FIG. 20 may be performed in network environments in which a next-generation WLAN system is supported. The next-generation WLAN system is a WLAN system evolving from the 802.11ax system and can satisfy backward compatibility with the 802.11ax system. The next-generation WLAN system may correspond to an EHT (Extreme High Throughput) WLAN system or the 802.11be WLAN system.

The example of FIG. 20 may be performed in a transmitting device, and the transmitting device may correspond to an AP. A receiving device may correspond to an STA (non-AP STA).

The present embodiment proposes a method and device for setting phase rotation values by which optimized PAPR can be obtained in consideration of both a case in which preamble puncturing introduced in 802.11ax is performed on 80 MHz, 160 MHz, 240 MHz, and 320 MHz bands and a case in which there are wireless devices having different maximum transmission bandwidths supported by RF (Radio Frequency). That is, preamble puncturing proposed in 802.11ax is extended and applied to 240 MHz/320 MHz bands, and phase rotation values for minimizing a maximum PAPR in consideration of RF capabilities of wireless devices having different maximum transmission bandwidths of RF in a BSS are proposed. An EHT PPDU proposed in the present embodiment can be transmitted and received in 80/160/240/320 MHz bands. However, description will be limited to the 320 MHz band.

In step S2010, the transmitting device generates the aforementioned EHT PPDU (Physical Protocol Data Unit). The EHT PPDU includes a legacy preamble and an EHT field.

In step S2020, the transmitting device transmits the PPDU to a receiving device through a 320 MHz band in which some bands are punctured.

The legacy preamble includes an L-STF (Legacy-Short Training Field) and an L-LTF (Legacy-Long Training Field). In addition, the legacy preamble may further include an L-SIG (Legacy-Signal). The EHT field may include EHT-SIG, EHT-STF, EHT-LTF, and a data field. The legacy field is a field supported by WLAN systems before 802.11be and the EHT field may be a field supported by the 802.11be WLAN system.

The EHT PPDU is transmitted based on RF (Radio Frequency). Specifically, the transmitting device may transmit the EHT PPDU in the 320 MHz band through a transmission-available bandwidth supported by RF (RF capacity).

The legacy preamble is generated by applying first phase rotation values thereto. That is, the first phase rotation values can be commonly applied to all fields included in the legacy preamble.

The first phase rotation values are determined based on a first method and a second method.

The first method is a method of acquiring an optimum PAPR in the L-LTF. The second method is a method of acquiring an optimum PAPR based on a maximum transmission bandwidth supported by RF.

That is, the first phase rotation values are phase rotation values defined for an optimum PAPR of the L-STF and the L-LTF. When the PAPR of the L-STF and the L-LTF is large, the first phase rotation values can be applied to the legacy preamble in order to minimize the PAPR. Further, the first phase rotation values are also phase rotation values defined to minimize a maximum PAPR acquired in consideration of a maximum transmission bandwidth supported by RF. That is, the first phase rotation values may be phase rotation values defined to acquire an optimum PAPR in the L-STF and the L-LTF in a situation in which various RF capabilities are considered.

The first phase rotation values are acquired based on second phase rotation values and third phase rotation values.

The second phase rotation values are obtained by repeating phase rotation values defined for an 80 MHz band in the 802.11ax system. Since the EHT PPDU is transmitted through the 320 MHz band, the second phase rotation values may be obtained by repeating phase rotation values of the 80 MHz band, which optimizes the PAPR in the L-STF and the L-LTF and is applied in units of 20 MHz, four times. If the PPDU is transmitted through a 160 MHz band, the second phase rotation values may be obtained by repeating the phase rotation values of the 80 MHz band (which optimizes the PAPR in the L-STF and the L-LTF and is applied in units of 20 MHz) twice. If the EHT PPDU is transmitted through a 240 MHz band, the second phase rotation values may be obtained by repeating the phase rotation values of the 80 MHz band (which optimizes the PAPR in the L-STF and the L-LTF and is applied in units of 20 MHz) three times.

The third phase rotation values are phase rotation values defined in units of 80 MHz in the 320 MHz band. Since the 320 MHz band can be divided into four 80 MHz bands, the third phase rotation values can be defined for each of the four 80 MHz bands. If the EHT PPDU is transmitted through the 160 MHz band, the third phase rotation values may be defined for each of two 80 MHz bands based on an optimum PAPR of the L-STF and the L-LTF. If the EHT PPDU is transmitted through the 240 MHz band, the third phase rotation values may be defined for each of three 80 MHz bands based on the optimum PAPR of the L-STF and the L-LTF.

That is, the present embodiment proposes a method of additionally performing phase rotation (third phase rotation values) in units of 80 MHz in the whole band while applying phase rotation values (second phase rotation values) defined in the 80 MHz band. Hereinafter, a subcarrier range to which phase rotation values are applied will be described.

The aforementioned 320 MHz band may be composed of subcarriers having subcarrier indexes of −512 to 511.

The second phase rotation values may be [1 −1 −1 −1 1 −1 −1 −1 1 −1 −1 −1 1 −1 −1 −1] because it is obtained by repeating the phase rotation values [1 −1 −1 −1] of the 80 MHz band, defined above, four times.

The first value "1" in the second phase rotation values may be applied to subcarriers having subcarrier indexes of −512 to −449, the second value "−1" in the second phase rotation value may be applied to subcarriers having subcarrier indexes of −448 to −385, the third value "−1" in the second phase rotation value may be applied to subcarriers having subcarrier indexes of −384 to −321, and the fourth value "−1" in the second phase rotation value may be applied to subcarriers having subcarrier indexes of −320 to −257. That is, the first to fourth values [1 −1 −1 −1] in the second phase rotation values may be applied to the first 80 MHz band in the 320 MHz band.

The fifth value "1" in the second phase rotation values may be applied to subcarriers having subcarrier indexes of −256 to −193, the sixth value "−1" in the second phase rotation value may be applied to subcarriers having subcarrier indexes of −192 to −129, the seventh value "−1" in the second phase rotation value may be applied to subcarriers having subcarrier indexes of −128 to −65, and the eighth value "−1" in the second phase rotation value may be applied to subcarriers having subcarrier indexes of −64 to −1. That is, the fifth to eighth values [1 −1 −1 −1] in the second phase rotation values may be applied to the second 80 MHz band in the 320 MHz band.

The ninth value "1" in the second phase rotation values may be applied to subcarriers having subcarrier indexes of 0 to 63, the tenth value "−1" in the second phase rotation value may be applied to subcarriers having subcarrier indexes of 64 to 127, the eleventh value "−1" in the second phase rotation value may be applied to subcarriers having subcarrier indexes of 128 to 191, and the twelfth value "−1" in the second phase rotation value may be applied to subcarriers having subcarrier indexes of 192 to 255. That is, the ninth to twelfth values [1 −1 −1 −1] in the second phase rotation values may be applied to the third 80 MHz band in the 320 MHz band.

The thirteenth value "1" in the second phase rotation values may be applied to subcarriers having subcarrier indexes of 256 to 319, the fourteenth value "−1" in the second phase rotation value may be applied to subcarriers having subcarrier indexes of 320 to 383, the fifteenth value "−1" in the second phase rotation value may be applied to subcarriers having subcarrier indexes of 384 to 447, and the sixteenth value "−1" in the second phase rotation value may be applied to subcarriers having subcarrier indexes of 448 to 511. That is, the thirteenth to sixteenth values [1 −1 −1 −1] in the second phase rotation values may be applied to the fourth 80 MHz band in the 320 MHz band.

For example, the third phase rotation values may be [1 j 1 j]. Since the 320 MHz band has four 80 MHz bands, the third phase rotation values may be defined for each of the four 80 MHz bands.

The first value "1" in the third phase rotation values may be applied to the first 80 MHz band in the 320 MHz band, the second value "j" in the third phase rotation values may be applied to the second 80 MHz band in the 320 MHz band, the third value "1" in the third phase rotation values may be applied to the third 80 MHz band in the 320 MHz band, and the fourth value "j" in the third phase rotation values may be applied to the fourth 80 MHz band in the 320 MHz band.

The first phase rotation values may be obtained based on products of the second phase rotation values and the third phase rotation values. That is, the first phase rotation values can be obtained by multiplying the second phase rotation values by the third phase rotation values in accordance with frequency bands (or subcarrier indexes). Here, the first phase rotation values are [1 −1 −1 −1 j −j −j −j 1 −1 −1 −1 j −j −j −j]. By applying the first phase rotation values to the legacy preamble, an optimum PAPR with respect to the L-STF and the L-LTF can be ensured for transmission through the 320 MHz band on which preamble puncturing proposed in 802.11ax is performed in consideration of various RF capabilities.

Some of the aforementioned bands may include all 20 MHz bands except the primary MHz band. That is, the primary 20 MHz band can be used for PPDU transmission all the time, but the remaining 20 MHz bands other than the primary 20 MHz band may not be used for PPDU transmission.

The first phase rotation values may be obtained based on a preamble puncturing pattern. The preamble puncturing pattern may be a band pattern obtained by puncturing at least one of MHz bands except the primary 20 MHz band. That is, the preamble puncturing pattern may correspond to a pattern in any case in which at least one 20 MHz band in the 320 MHz band is punctured. However, the first phase rotation values have a unified form instead of a form having different values depending on the preamble puncturing pattern.

In addition, the maximum transmission bandwidth supported by RF may be 80 MHz, 160 MHz, 240 MHz, or 320 MHz. When the maximum transmission bandwidth supported by RF is 80 MHz, the transmitting device can transmit the PPDU using one RF having 80 MHz capacity. When the maximum transmission bandwidth supported by RF is 160 MHz, the transmitting device can transmit the PPDU using two RFs each having 80 MHz capacity. When the maximum transmission bandwidth supported by RF is 240 MHz, the transmitting device can transmit the PPDU using three RFs each having 80 MHz capacity. When the maximum transmission bandwidth supported by RF is 320 MHz, the transmitting device can transmit the PPDU using four RFs each having 80 MHz capacity.

An optimum PAPR obtained based on the maximum transmission bandwidth supported by RF may be selected by comparing first to fourth PAPRs. That is, the transmitting device may extract maximum PAPR values by calculating PAPRs for RFs having various capacities and compare the extracted PAPR values to determine optimized phase rotation values. Here, the first phase rotation values have a unified form instead of a form having different values depending on the RFs having various capacities.

The first PAPR may be an optimum PAPR obtained when the maximum transmission bandwidth supported by RF is 80 MHz. The second PAPR may be an optimum PAPR obtained when the maximum transmission bandwidth supported by RF is 160 MHz. The third PAPR may be an optimum PAPR obtained when the maximum transmission bandwidth supported by RF is 240 MHz. The fourth PAPR may be an optimum PAPR obtained when the maximum transmission bandwidth supported by RF is 320 MHz.

The L-STF may be generated by applying the first phase rotation values to an L-STF sequence. Further, the L-LTF may be generated by applying the first phase rotation values to an L-LTF sequence.

The L-STF sequence may be a sequence obtained by repeating an L-STF sequence defined for a 20 MHz band. Since the L-STF is transmitted through the 320 MHz band, the L-STF sequence may be obtained by repeating the L-STF sequence of the 20 MHz band defined in legacy 802.11ax. Similarly, if L-STF is transmitted through the 160 MHz band, the L-STF sequence of the 20 MHz band defined in legacy 802.11ax may be repeated twice. If the L-STF is transmitted through the 240 MHz band, the L-STF sequence of the 20 MHz band defined in legacy 802.11ax may be repeated three times.

The L-STF sequence defined for the 20 MHz band is sqrt(½)*[0 0 0 0 0 0 0 0 1+j 0 0 −1−j 0 0 0 1+j 0 0 0 −1−j 0 0 0 −1−j 0 0 0 1+j 0 0 0 0 0 0 0 −1−j 0 0 0 −1−j 0 0 0 1+j 0 0 0 1+j 0 1+j 0 0 0 1+j 0 0 0 0 0 0 0].

The L-LTF sequence may be a sequence obtained by repeating an L-LTF sequence defined for the 20 MHz band. Since the L-LTF is transmitted through the 320 MHz band, the L-LTF sequence may be obtained by repeating the L-LTF sequence of the 20 MHz band defined in legacy 802.11ax. Similarly, if the L-LTF is transmitted through the 160 MHz band, the L-LTF sequence of the 20 MHz band defined in legacy 802.11ax may be repeated twice. If the L-LTF is transmitted through the 240 MHz band, the L-LTF sequence of the 20 MHz band defined in legacy 802.11ax may be repeated three times.

The L-LTF sequence defined for the 20 MHz band is [0 0 0 0 0 0 1 1 −1 −1 1 1 −1 1 −1 1 1 1 1 1 1 −1 −1 1 1 −1 1 −1 1 1 1 1 0 1 −1 −1 1 1 −1 1 −1 1 1 1 1 1 1 −1 −1 1 1 −1 1 −1 1 1 1 1 0 0 0 0 0].

In the above-described embodiment, even when the PPDU is transmitted through MHz bands, phase rotation values may be defined and applied to the legacy preamble in the same manner.

The EHT-SIG may include EHT-SIG-A and EHT-SIG-B. The EHT-SIG-B may include the RU information. That is, the AP can signal the information about the tone plan in the 80/160/240/320 MHz through the EHT-SIG-B in the PPDU. Further, the EHT-STF, EHT-LTF, and data field included in the EHT field may be transmitted/received in a band (RU) according to the tone plan in 80/160/240/320 MHz.

In addition, the EHT-SIG may be generated by applying the first phase rotation values or the second phase rotation values. If the EHT PPDU has the same preamble structure as that of flax, the same phase rotation values may be applied up to the EHT-SIG-B to generate the field.

Figure 21:
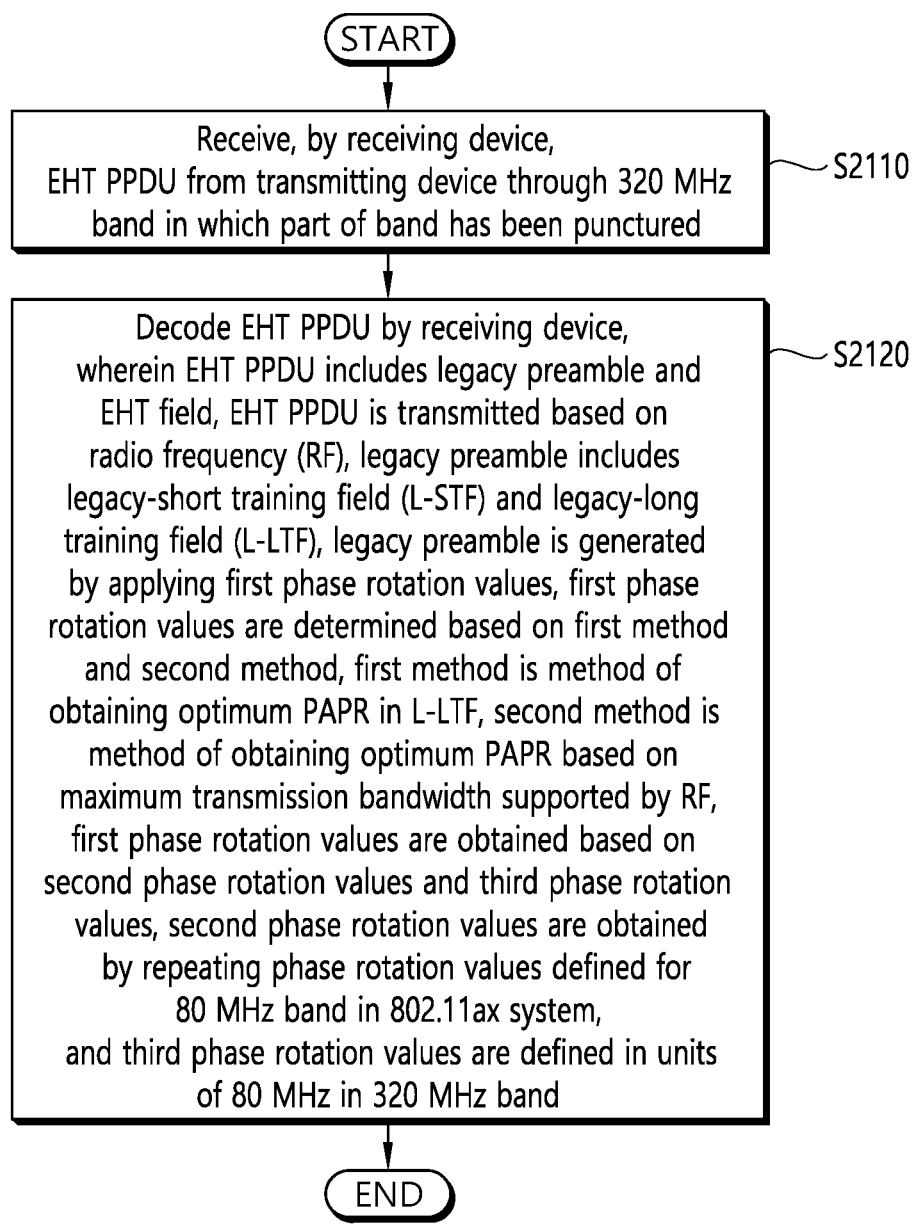
FIG. 21 is a flowchart illustrating a procedure of receiving an EHT PPDU according to the present embodiment.

FIG. 21 is a flowchart illustrating a procedure of receiving an EHT PPDU according to the present embodiment.

The example of FIG. 21 may be performed in network environments in which a next-generation WLAN system is supported. The next-generation WLAN system is a WLAN system evolving from the 802.11ax system and can satisfy backward compatibility with the 802.11ax system. The next-generation WLAN system may correspond to an EHT (Extreme High Throughput) WLAN system or the 802.11be WLAN system.

The example of FIG. 21 may be performed in a receiving device, and the receiving device may correspond to an STA (non-AP STA). A transmitting device may correspond to an AP.

The present embodiment proposes a method and device for setting phase rotation values by which an optimized PAPR can be obtained in consideration of both a case in which preamble puncturing introduced in 802.11ax is performed on 80 MHz, 160 MHz, 240 MHz, and 320 MHz bands and a case in which there are wireless devices having different maximum transmission bandwidths supported by RF (Radio Frequency). That is, preamble puncturing proposed in 802.11ax is extended and applied to 240 MHz/320 MHz bands, and phase rotation values for minimizing a maximum PAPR in consideration of RF capabilities of wireless devices having different maximum transmission bandwidths of RF in a BSS are proposed. An EHT PPDU proposed in the present embodiment can be transmitted and received in 80/160/240/320 MHz bands. However, description will be limited to the 320 MHz band.

In step S2110, the receiving device receives the aforementioned EHT PPDU from the transmitting device through a 320 MHz band in which some bands are punctured. The EHT PPDU includes a legacy preamble and an EHT field.

In step S2120, the receiving device decodes the EHT PPDU.

The legacy preamble includes an L-STF (Legacy-Short Training Field) and an L-LTF (Legacy-Long Training Field). In addition, the legacy preamble may further include an L-SIG (Legacy-Signal). The EHT field may include EHT-SIG, EHT-STF, EHT-LTF, and a data field. The legacy field is a field supported by WLAN systems before 802.11be and the EHT field may be a field supported by the 802.11be WLAN system.

The EHT PPDU is transmitted based on RF (Radio Frequency). Specifically, the transmitting device may transmit the EHT PPDU in the 320 MHz band through a transmission-available bandwidth supported by RF (RF capacity).

The legacy preamble is generated by applying first phase rotation values thereto. That is, the first phase rotation values can be commonly applied to all fields included in the legacy preamble.

The first phase rotation values are determined based on a first method and a second method.

The first method is a method of acquiring an optimum PAPR in the L-LTF. The second method is a method of acquiring an optimum PAPR based on a maximum transmission bandwidth supported by RF.

That is, the first phase rotation values are phase rotation values defined for an optimum PAPR of the L-STF and the L-LTF. When the PAPR of the L-STF and the L-LTF is large, the first phase rotation values can be applied to the legacy preamble in order to minimize the PAPR. Further, the first phase rotation values are also phase rotation values defined to minimize a maximum PAPR acquired in consideration of a maximum transmission bandwidth supported by RF. That is, the first phase rotation values may be phase rotation values defined to acquire an optimum PAPR in the L-STF and the L-LTF in a situation in which various RF capabilities are considered.

The first phase rotation values are acquired based on second phase rotation values and third phase rotation values.

The second phase rotation values are obtained by repeating phase rotation values defined for an 80 MHz band in the 802.11ax system. Since the EHT PPDU is transmitted through the 320 MHz band, the second phase rotation values may be obtained by repeating phase rotation values of the 80 MHz band, which optimizes a PAPR in the L-STF and the L-LTF and is applied in units of 20 MHz, four times. If the PPDU is transmitted through a 160 MHz band, the second phase rotation values may be obtained by repeating the phase rotation values of the 80 MHz band (which optimizes PAPR in the L-STF and the L-LTF and is applied in units of 20 MHz) twice. If the EHT PPDU is transmitted through a 240 MHz band, the second phase rotation values may be obtained by repeating the phase rotation values of the 80 MHz band (which optimizes PAPR in the L-STF and the L-LTF and is applied in units of 20 MHz) three times.

The third phase rotation values are phase rotation values defined in units of 80 MHz in the 320 MHz band. Since the 320 MHz band can be divided into four 80 MHz bands, the third phase rotation values can be defined for each of the four 80 MHz bands. If the EHT PPDU is transmitted through the 160 MHz band, the third phase rotation values may be defined for each of two 80 MHz bands based on an optimum PAPR of the L-STF and the L-LTF. If the EHT PPDU is transmitted through the 240 MHz band, the third phase rotation values may be defined for each of three 80 MHz bands based on the optimum PAPR of the L-STF and the L-LTF.

That is, the present embodiment proposes a method of additionally performing phase rotation (third phase rotation values) in units of 80 MHz in the whole band while applying phase rotation values (second phase rotation values) defined in the 80 MHz band.

Hereinafter, a subcarrier range to which phase rotation values are applied will be described.

The aforementioned 320 MHz band may be composed of subcarriers having subcarrier indexes of −512 to 511.

The second phase rotation values may be [1 −1 −1 −1 1 −1 −1 −1 1 −1 −1 −1 1 −1 −1 −1] because it is obtained by repeating the phase rotation values [1 −1 −1 −1] of the 80 MHz band, defined above, four times.

The first value "1" in the second phase rotation values may be applied to subcarriers having subcarrier indexes of −512 to −449, the second value "−1" in the second phase rotation value may be applied to subcarriers having subcarrier indexes of −448 to −385, the third value "−1" in the second phase rotation value may be applied to subcarriers having subcarrier indexes of −384 to −321, and the fourth value "−1" in the second phase rotation value may be applied to subcarriers having subcarrier indexes of −320 to −257. That is, the first to fourth values [1 −1 −1 −1] in the second phase rotation values may be applied to the first 80 MHz band in the 320 MHz band.

The fifth value "1" in the second phase rotation values may be applied to subcarriers having subcarrier indexes of −256 to −193, the sixth value "−1" in the second phase rotation value may be applied to subcarriers having subcarrier indexes of −192 to −129, the seventh value "−1" in the second phase rotation value may be applied to subcarriers having subcarrier indexes of −128 to −65, and the eighth value "−1" in the second phase rotation value may be applied to subcarriers having subcarrier indexes of −64 to −1. That is, the fifth to eighth values [1 −1 −1 −1] in the second phase rotation values may be applied to the second 80 MHz band in the 320 MHz band.

The ninth value "1" in the second phase rotation values may be applied to subcarriers having subcarrier indexes of 0 to 63, the tenth value "−1" in the second phase rotation value may be applied to subcarriers having subcarrier indexes of 64 to 127, the eleventh value "−1" in the second phase rotation value may be applied to subcarriers having subcarrier indexes of 128 to 191, and the twelfth value "−1" in the second phase rotation value may be applied to subcarriers having subcarrier indexes of 192 to 255. That is, the ninth to twelfth values [1 −1 −1 −1] in the second phase rotation values may be applied to the third 80 MHz band in the 320 MHz band.

The thirteenth value "1" in the second phase rotation values may be applied to subcarriers having subcarrier indexes of 256 to 319, the fourteenth value "−1" in the second phase rotation value may be applied to subcarriers having subcarrier indexes of 320 to 383, the fifteenth value "−1" in the second phase rotation value may be applied to subcarriers having subcarrier indexes of 384 to 447, and the sixteenth value "−1" in the second phase rotation value may be applied to subcarriers having subcarrier indexes of 448 to 511. That is, the thirteenth to sixteenth values [1 −1 −1 −1] in the second phase rotation values may be applied to the fourth 80 MHz band in the 320 MHz band.

For example, the third phase rotation values may be [1 j 1 j]. Since the 320 MHz band has four 80 MHz bands, the third phase rotation values may be defined for each of the four 80 MHz bands.

The first value "1" in the third phase rotation values may be applied to the first 80 MHz band in the 320 MHz band, the second value "j" in the third phase rotation values may be applied to the second 80 MHz band in the 320 MHz band, the third value "1" in the third phase rotation values may be applied to the third 80 MHz band in the 320 MHz band, and the fourth value "j" in the third phase rotation values may be applied to the fourth 80 MHz band in the 320 MHz band.

The first phase rotation values may be obtained based on products of the second phase rotation values and the third phase rotation values. That is, the first phase rotation values can be obtained by multiplying the second phase rotation values by the third phase rotation values in accordance with frequency bands (or subcarrier indexes). Here, the first phase rotation values are [1 −1 −1 −1 j −j −j −j 1 −1 −1 −1 j −j −j −j]. By applying the first phase rotation values to the legacy preamble, an optimum PAPR with respect to the L-STF and the L-LTF can be ensured for transmission through the 320 MHz band on which preamble puncturing proposed in 802.11ax is performed in consideration of various RF capabilities.

Some of the aforementioned bands may include all 20 MHz bands except the primary MHz band. That is, the primary 20 MHz band can be used for PPDU transmission all the time, but the remaining 20 MHz bands other than the primary 20 MHz band may not be used for PPDU transmission.

The first phase rotation values may be obtained based on a preamble puncturing pattern. The preamble puncturing pattern may be a band pattern obtained by puncturing at least one of MHz bands except the primary 20 MHz band. That is, the preamble puncturing pattern may correspond to a pattern in any case in which at least one 20 MHz band in the 320 MHz band is punctured. However, the first phase rotation values have a unified form instead of a form having different values depending on the preamble puncturing pattern.

In addition, the maximum transmission bandwidth supported by RF may be 80 MHz, 160 MHz, 240 MHz, or 320 MHz. When the maximum transmission bandwidth supported by RF is 80 MHz, the transmitting device can transmit the PPDU using one RF having 80 MHz capacity. When the maximum transmission bandwidth supported by RF is 160 MHz, the transmitting device can transmit the PPDU using two RFs each having 80 MHz capacity. When the maximum transmission bandwidth supported by RF is 240 MHz, the transmitting device can transmit the PPDU using three RFs each having 80 MHz capacity. When the maximum transmission bandwidth supported by RF is 320 MHz, the transmitting device can transmit the PPDU using four RFs each having 80 MHz capacity.

An optimum PAPR obtained based on the maximum transmission bandwidth supported by RF may be selected by comparing first to fourth PAPRs. That is, the transmitting device may extract maximum PAPR values by calculating PAPRs for RFs having various capacities and compare the extracted PAPR values to determine optimized phase rotation values. Here, the first phase rotation values have a unified form instead of a form having different values depending on the RFs having various capacities.

The first PAPR may be an optimum PAPR obtained when the maximum transmission bandwidth supported by RF is 80 MHz. The second PAPR may be an optimum PAPR obtained when the maximum transmission bandwidth supported by RF is 160 MHz. The third PAPR may be an optimum PAPR obtained when the maximum transmission bandwidth supported by RF is 240 MHz. The fourth PAPR may be an optimum PAPR obtained when the maximum transmission bandwidth supported by RF is 320 MHz.

The L-STF may be generated by applying the first phase rotation values to an L-STF sequence. Further, the L-LTF may be generated by applying the first phase rotation values to an L-LTF sequence.

The L-STF sequence may be a sequence obtained by repeating an L-STF sequence defined for a 20 MHz band. Since the L-STF is transmitted through the 320 MHz band, the L-STF sequence may be obtained by repeating the L-STF sequence of the 20 MHz band defined in legacy 802.11ax. Similarly, if L-STF is transmitted through the 160 MHz band, the L-STF sequence of the 20 MHz band defined in legacy 802.11ax may be repeated twice. If the L-STF is transmitted through the 240 MHz band, the L-STF sequence of the 20 MHz band defined in legacy 802.11ax may be repeated three times.

The L-STF sequence defined for the 20 MHz band is sqrt(½)*[0 0 0 0 0 0 0 0 1+j 0 0 −1−j 0 0 0 1+j 0 0 0 −1−j 0 0 0 −1−j 0 0 0 1+j 0 0 0 0 0 0 0 −1−j 0 0 0 −1−j 0 0 0 1+j 0 0 0 1+j 0 1+j 0 0 0 1+j 0 0 0 0 0 0 0].

The L-LTF sequence may be a sequence obtained by repeating an L-LTF sequence defined for the 20 MHz band. Since the L-LTF is transmitted through the 320 MHz band, the L-LTF sequence may be obtained by repeating the L-LTF sequence of the 20 MHz band defined in legacy 802.11ax. Similarly, if the L-LTF is transmitted through the 160 MHz band, the L-LTF sequence of the 20 MHz band defined in legacy 802.11ax may be repeated twice. If the L-LTF is transmitted through the 240 MHz band, the L-LTF sequence of the 20 MHz band defined in legacy 802.11ax may be repeated three times.

The L-LTF sequence defined for the 20 MHz band is [0 0 0 0 0 1 1 −1 −1 1 1 −1 1 −1 1 1 1 1 1 1 −1 −1 1 1 −1 1 −1 1 1 1 1 0 1 −1 −1 1 1 −1 1 1 1 1 1 1 1 1 −1 −1 1 −1 1 −1 1 1 1 1 0 0 0 0 0].

In the above-described embodiment, even when the PPDU is transmitted through 80/160/240 MHz bands, phase rotation values may be defined and applied to the legacy preamble in the same manner.

The EHT-SIG may include EHT-SIG-A and EHT-SIG-B. The EHT-SIG-B may include the RU information. That is, the AP can signal the information about the tone plan in the 80/160/240/320 MHz through the EHT-SIG-B in the PPDU. Further, the EHT-STF, EHT-LTF, and data field included in the EHT field may be transmitted/received in a band (RU) according to the tone plan in 80/160/240/320 MHz.

In addition, the EHT-SIG may be generated by applying the first phase rotation values or the second phase rotation values. If the EHT PPDU has the same preamble structure as that of 11ax, the same phase rotation values may be applied up to the EHT-SIG-B to generate the field.

6. Device Configuration

Figure 22:
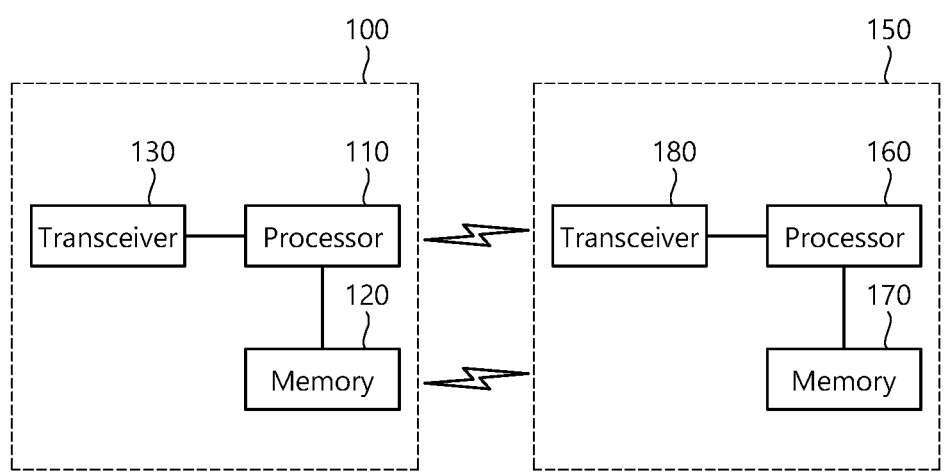
FIG. 22 is a diagram for describing a device for implementing the above-described method.

FIG. 22 is a diagram for describing devices for implementing the above-described method.

A wireless device 100 is a transmitting device capable of implementing the above-described embodiment and may operate as an AP STA. A wireless device 150 of FIG. 22 is a receiving device capable of implementing the above-described embodiment and may operate as a non-AP STA.

The transmitting device 100 may include a processor 110, a memory 120, and a transmitting/receiving unit 130, and the receiving device 150 may include a processor 160, a memory 170, and a transmitting/receiving unit 180. The transmitting/receiving unit 130 and 180 transmits/receives a radio signal and may be operated in a physical layer of IEEE 802.11/3GPP, and so on. The processor 110 and 160 may be operated in the physical layer and/or MAC layer and may be operatively connected to the transmitting/receiving unit 130 and 180.

The processor 110 and 160 and/or the transmitting/receiving unit 130 and 180 may include application-specific integrated circuit (ASIC), other chipset, logic circuit and/or data processor. The memory 120 and 170 may include read-only memory (ROM), random access memory (RAM), flash memory, memory card, storage medium and/or other storage unit. When the embodiments are executed by software, the techniques (or methods) described herein can be executed with modules (e.g., processes, functions, and so on) that perform the functions described herein. The modules can be stored in the memory 120 and 170 and executed by the processor 110 and 160. The memory 120 and 170 can be implemented (or positioned) within the processor 110 and 160 or external to the processor 110 and 160. Also, the memory 120 and 170 may be operatively connected to the processor 110 and 160 via various means known in the art.

The processor 110 and 160 may implement the functions, processes and/or methods proposed in the present disclosure. For example, the processor 110 and 160 may perform the operation according to the present embodiment.

The specific operation of the processor 110 of the transmitting device is as follows. The processor 110 of the transmitting device generates an EHT PPDU and transmits the EHT PPDU through a broad band on which preamble puncturing supported in 11ax is performed based on RF.

The specific operation of the processor 160 of the receiving device is as follows. The processor 160 of the receiving device receives the EHT PPDU from the transmitting device through a broad band on which preamble puncturing supported in 11ax is performed based on RF and decodes the EHT PPDU for a band supported by the receiving device.

Figure 23:
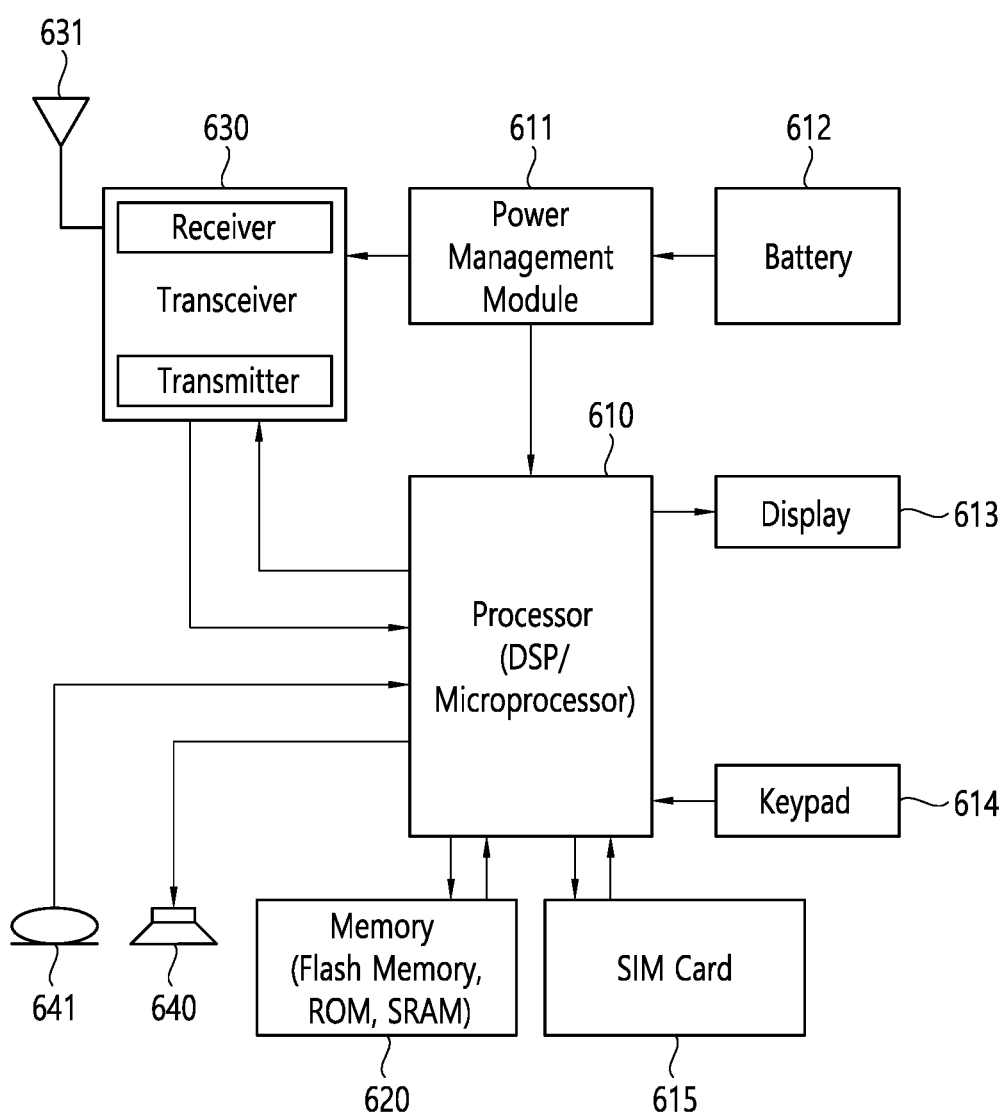
FIG. 23 illustrates a more detailed wireless device for implementing the embodiment of the present disclosure.

FIG. 23 shows a UE to which the technical features of the present disclosure can be applied.

A UE includes a processor 610, a power management module 611, a battery 612, a display 613, a keypad 614, a subscriber identification module (SIM) card 615, a memory 620, a transceiver 630, one or more antennas 631, a speaker 640, and a microphone 641.

The processor 610 may be configured to implement proposed functions, procedures and/or methods of the present disclosure described below. The processor 610 may be configured to control one or more other components of the UE 600 to implement proposed functions, procedures and/or methods of the present disclosure described below. Layers of the radio interface protocol may be implemented in the processor 610. The processor 610 may include application-specific integrated circuit (ASIC), other chipset, logic circuit and/or data processing device. The processor 610 may be an application processor (AP). The processor 610 may include at least one of a digital signal processor (DSP), a central processing unit (CPU), a graphics processing unit (GPU), a modem (modulator and demodulator). An example of the processor 610 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The power management module 611 manages power for the processor 610 and/or the transceiver 630. The battery 612 supplies power to the power management module 611. The display 613 outputs results processed by the processor 610. The keypad 614 receives inputs to be used by the processor 610. The keypad 614 may be shown on the display 613. The SIM card 615 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The memory 620 is operatively coupled with the processor 610 and stores a variety of information to operate the processor 610. The memory 620 may include read-only memory (ROM), random access memory (RAM), flash memory, memory card, storage medium and/or other storage device. When the embodiments are implemented in software, the techniques described herein can be implemented with modules (e.g., procedures, functions, and so on) that perform the functions described herein. The modules can be stored in the memory 620 and executed by the processor 610. The memory 620 can be implemented within the processor 610 or external to the processor 610 in which case those can be communicatively coupled to the processor 610 via various means as is known in the art.

The transceiver 630 is operatively coupled with the processor 610, and transmits and/or receives a radio signal. The transceiver 630 includes a transmitter and a receiver. The transceiver 630 may include baseband circuitry to process radio frequency signals. The transceiver 630 controls the one or more antennas 631 to transmit and/or receive a radio signal.

The speaker 640 outputs sound-related results processed by the processor 610. The microphone 641 receives sound-related inputs to be used by the processor 610.

In the case of the transmitting device, the processor 610 generates an EHT PPDU and transmits the EHT PPDU through a broad band on which preamble puncturing supported in 11ax is performed based on RF.

In the case of the receiving device, the processor 610 receives the EHT PPDU from the transmitting device through a broad band on which preamble puncturing supported in 11ax is performed based on RF and decodes the EHT PPDU for a band supported by the receiving device.

The legacy preamble includes an L-STF (Legacy-Short Training Field) and an L-LTF (Legacy-Long Training Field). In addition, the legacy preamble may further include an L-SIG (Legacy-Signal). The EHT field may include EHT-SIG, EHT-STF, EHT-LTF, and a data field. The legacy field is a field supported by WLAN systems before 802.11be and the EHT field may be a field supported by the 802.11be WLAN system.

The EHT PPDU is transmitted based on RF (Radio Frequency). Specifically, the transmitting device may transmit the EHT PPDU in the 320 MHz band through a transmission-available bandwidth supported by RF (RF capacity).

The legacy preamble is generated by applying first phase rotation values thereto. That is, the first phase rotation values can be commonly applied to all fields included in the legacy preamble.

The first phase rotation values are determined based on a first method and a second method.

The first method is a method of acquiring an optimum PAPR in the L-LTF. The second method is a method of acquiring an optimum PAPR based on a maximum transmission bandwidth supported by RF.

That is, the first phase rotation values are phase rotation values defined for an optimum PAPR of the L-STF and the L-LTF. When the PAPR of the L-STF and the L-LTF is large, the first phase rotation values can be applied to the legacy preamble in order to minimize the PAPR. Further, the first phase rotation values are also phase rotation values defined to minimize a maximum PAPR acquired in consideration of a maximum transmission bandwidth supported by RF. That is, the first phase rotation values may be phase rotation values defined to acquire an optimum PAPR in the L-STF and the L-LTF in a situation in which various RF capabilities are considered.

The first phase rotation values are acquired based on second phase rotation values and third phase rotation values.

The second phase rotation values are obtained by repeating phase rotation values defined for an 80 MHz band in the 802.11ax system. Since the EHT PPDU is transmitted through the 320 MHz band, the second phase rotation values may be obtained by repeating phase rotation values of the 80 MHz band, which optimizes a PAPR in the L-STF and the L-LTF and is applied in units of 20 MHz, four times. If the PPDU is transmitted through a 160 MHz band, the second phase rotation values may be obtained by repeating the phase rotation values of the 80 MHz band (which optimizes the PAPR in the L-STF and the L-LTF and is applied in units of 20 MHz) twice. If the EHT PPDU is transmitted through a 240 MHz band, the second phase rotation values may be obtained by repeating the phase rotation values of the MHz band (which optimizes the PAPR in the L-STF and the L-LTF and is applied in units of 20 MHz) three times.

The third phase rotation values are phase rotation values defined in units of 80 MHz in the 320 MHz band. Since the 320 MHz band can be divided into four 80 MHz bands, the third phase rotation values can be defined for each of the four 80 MHz bands. If the EHT PPDU is transmitted through the 160 MHz band, the third phase rotation values may be defined for each of two 80 MHz bands based on an optimum PAPR of the L-STF and the L-LTF. If the EHT PPDU is transmitted through the 240 MHz band, the third phase rotation values may be defined for each of three 80 MHz bands based on the optimum PAPR of the L-STF and the L-LTF.

That is, the present embodiment proposes a method of additionally performing phase rotation (third phase rotation values) in units of 80 MHz in the whole band while applying phase rotation values (second phase rotation values) defined in the 80 MHz band.

Hereinafter, a subcarrier range to which phase rotation values are applied will be described.

The aforementioned 320 MHz band may be composed of subcarriers having subcarrier indexes of −512 to 511.

The second phase rotation values may be [1 −1 −1 −1 1 −1 −1 −1 1 −1 −1 −1 1 −1 −1 −1] because it is obtained by repeating the phase rotation values [1 −1 −1 −1] of the 80 MHz band, defined above, four times.

The first value "1" in the second phase rotation values may be applied to subcarriers having subcarrier indexes of −512 to −449, the second value "−1" in the second phase rotation value may be applied to subcarriers having subcarrier indexes of −448 to −385, the third value "−1" in the second phase rotation value may be applied to subcarriers having subcarrier indexes of −384 to −321, and the fourth value "−1" in the second phase rotation value may be applied to subcarriers having subcarrier indexes of −320 to −257. That is, the first to fourth values [1 −1 −1 −1] in the second phase rotation values may be applied to the first 80 MHz band in the 320 MHz band.

The fifth value "1" in the second phase rotation values may be applied to subcarriers having subcarrier indexes of −256 to −193, the sixth value "−1" in the second phase rotation value may be applied to subcarriers having subcarrier indexes of −192 to −129, the seventh value "−1" in the second phase rotation value may be applied to subcarriers having subcarrier indexes of −128 to −65, and the eighth value "−1" in the second phase rotation value may be applied to subcarriers having subcarrier indexes of −64 to −1. That is, the fifth to eighth values [1 −1 −1 −1] in the second phase rotation values may be applied to the second 80 MHz band in the 320 MHz band.

The ninth value "1" in the second phase rotation values may be applied to subcarriers having subcarrier indexes of 0 to 63, the tenth value "−1" in the second phase rotation value may be applied to subcarriers having subcarrier indexes of 64 to 127, the eleventh value "−1" in the second phase rotation value may be applied to subcarriers having subcarrier indexes of 128 to 191, and the twelfth value "−1" in the second phase rotation value may be applied to subcarriers having subcarrier indexes of 192 to 255. That is, the ninth to twelfth values [1 −1 −1 −1] in the second phase rotation values may be applied to the third 80 MHz band in the 320 MHz band.

The thirteenth value "1" in the second phase rotation values may be applied to subcarriers having subcarrier indexes of 256 to 319, the fourteenth value "−1" in the second phase rotation value may be applied to subcarriers having subcarrier indexes of 320 to 383, the fifteenth value "−1" in the second phase rotation value may be applied to subcarriers having subcarrier indexes of 384 to 447, and the sixteenth value "−1" in the second phase rotation value may be applied to subcarriers having subcarrier indexes of 448 to 511. That is, the thirteenth to sixteenth values [1 −1 −1 −1] in the second phase rotation values may be applied to the fourth MHz band in the 320 MHz band.

For example, the third phase rotation values may be [1 j 1 j]. Since the 320 MHz band has four 80 MHz bands, the third phase rotation values may be defined for each of the four 80 MHz bands.

The first value "1" in the third phase rotation values may be applied to the first 80 MHz band in the 320 MHz band, the second value "j" in the third phase rotation values may be applied to the second 80 MHz band in the 320 MHz band, the third value "1" in the third phase rotation values may be applied to the third 80 MHz band in the 320 MHz band, and the fourth value "j" in the third phase rotation values may be applied to the fourth 80 MHz band in the 320 MHz band.

The first phase rotation values may be obtained based on products of the second phase rotation values and the third phase rotation values. That is, the first phase rotation values can be obtained by multiplying the second phase rotation values by the third phase rotation values in accordance with frequency bands (or subcarrier indexes). Here, the first phase rotation values are [1 −1 −1 −1 j −j −j −j 1 −1 −1 −1 j −j −j −j]. By applying the first phase rotation values to the legacy preamble, an optimum PAPR with respect to the L-STF and the L-LTF can be ensured for transmission through the 320 MHz band on which preamble puncturing proposed in 802.11ax is performed in consideration of various RF capabilities.

Some of the aforementioned bands may include all 20 MHz bands except the primary MHz band. That is, the primary 20 MHz band can be used for PPDU transmission all the time, but the remaining 20 MHz bands other than the primary 20 MHz band may not be used for PPDU transmission.

The first phase rotation values may be obtained based on a preamble puncturing pattern. The preamble puncturing pattern may be a band pattern obtained by puncturing at least one of MHz bands except the primary 20 MHz band. That is, the preamble puncturing pattern may correspond to a pattern in any case in which at least one 20 MHz band in the 320 MHz band is punctured. However, the first phase rotation values have a unified form instead of a form having different values depending on the preamble puncturing pattern.

In addition, the maximum transmission bandwidth supported by RF may be 80 MHz, 160 MHz, 240 MHz, or 320 MHz. When the maximum transmission bandwidth supported by RF is 80 MHz, the transmitting device can transmit the PPDU using one RF having 80 MHz capacity. When the maximum transmission bandwidth supported by RF is 160 MHz, the transmitting device can transmit the PPDU using two RFs each having 80 MHz capacity. When the maximum transmission bandwidth supported by RF is 240 MHz, the transmitting device can transmit the PPDU using three RFs each having 80 MHz capacity. When the maximum transmission bandwidth supported by RF is 320 MHz, the transmitting device can transmit the PPDU using four RFs each having 80 MHz capacity.

An optimum PAPR obtained based on the maximum transmission bandwidth supported by RF may be selected by comparing first to fourth PAPRs. That is, the transmitting device may extract maximum PAPR values by calculating PAPRs for RFs having various capacities and compare the extracted PAPR values to determine optimized phase rotation values. Here, the first phase rotation values have a unified form instead of a form having different values depending on the RFs having various capacities.

The first PAPR may be an optimum PAPR obtained when the maximum transmission bandwidth supported by RF is 80 MHz. The second PAPR may be an optimum PAPR obtained when the maximum transmission bandwidth supported by RF is 160 MHz. The third PAPR may be an optimum PAPR obtained when the maximum transmission bandwidth supported by RF is 240 MHz. The fourth PAPR may be an optimum PAPR obtained when the maximum transmission bandwidth supported by RF is 320 MHz.

The L-STF may be generated by applying the first phase rotation values to an L-STF sequence. Further, the L-LTF may be generated by applying the first phase rotation values to an L-LTF sequence.

The L-STF sequence may be a sequence obtained by repeating an L-STF sequence defined for a 20 MHz band. Since the L-STF is transmitted through the 320 MHz band, the L-STF sequence may be obtained by repeating the L-STF sequence of the 20 MHz band defined in legacy 802.11ax. Similarly, if L-STF is transmitted through the 160 MHz band, the L-STF sequence of the 20 MHz band defined in legacy 802.11ax may be repeated twice. If the L-STF is transmitted through the 240 MHz band, the L-STF sequence of the 20 MHz band defined in legacy 802.11ax may be repeated three times.

The L-STF sequence defined for the 20 MHz band is sqrt(½)*[0 0 0 0 0 0 0 0 1+j 0 0 0 0 1+j 0 0 0 −1−j 0 0 0 −1−j 0 0 0 1+j 0 0 0 0 0 0 0 −1−j 0 0 0 −1−j 0 0 0 1+j 0 0 0 1+j 0 1+j 0 0 0 1+j 0 0 0 0 0 0 0].

The L-LTF sequence may be a sequence obtained by repeating an L-LTF sequence defined for the 20 MHz band. Since the L-LTF is transmitted through the 320 MHz band, the L-LTF sequence may be obtained by repeating the L-LTF sequence of the 20 MHz band defined in legacy 802.11ax. Similarly, if the L-LTF is transmitted through the 160 MHz band, the L-LTF sequence of the 20 MHz band defined in legacy 802.11ax may be repeated twice. If the L-LTF is transmitted through the 240 MHz band, the L-LTF sequence of the 20 MHz band defined in legacy 802.11ax may be repeated three times.

The L-LTF sequence defined for the 20 MHz band is [0 0 0 0 0 1 1 −1 −1 1 1 −1 1 −1 1 1 1 1 1 1 −1 −1 1 1 −1 1 −1 1 1 1 1 0 1 −1 −1 1 1 −1 1 −1 1 1 1 1 1 1 1 1 −1 −1 1 1 −1 1 −1 1 1 1 1 0 0 0 0 0].

In the above-described embodiment, even when the PPDU is transmitted through MHz bands, phase rotation values may be defined and applied to the legacy preamble in the same manner.

The EHT-SIG may include EHT-SIG-A and EHT-SIG-B. The EHT-SIG-B may include the RU information. That is, the AP can signal the information about the tone plan in the 80/160/240/320 MHz through the EHT-SIG-B in the PPDU. Further, the EHT-STF, EHT-LTF, and data field included in the EHT field may be transmitted/received in a band (RU) according to the tone plan in 80/160/240/320 MHz.

In addition, the EHT-SIG may be generated by applying the first phase rotation values or the second phase rotation values. If the EHT PPDU has the same preamble structure as that of 11ax, the same phase rotation values may be applied up to the EHT-SIG-B to generate the field.

What is claimed is:

1. A method for transmitting a physical protocol data unit (PPDU) in a WLAN system, the method comprising:
    generating the PPDU by a transmitting device, the PPDU including a legacy preamble and a data field; and
    transmitting, by the transmitting device, the PPDU to a receiving device,
    wherein the legacy preamble includes a legacy-short training field (L-STF) and a legacy-long training field (L-LTF),
    wherein the legacy preamble is generated by applying a first phase rotation value for a 320 MHz band,
    wherein a first value "1" in the first phase rotation value is applied to subcarriers having subcarrier indexes of −512 to −449,
    wherein a second value "−1" in the first phase rotation value is applied to subcarriers having subcarrier indexes of −448 to −385,
    wherein a third value "−1" in the first phase rotation value is applied to subcarriers having subcarrier indexes of −384 to −321,
    wherein a fourth value "−1" in the first phase rotation value is applied to subcarriers having subcarrier indexes of −320 to −257,
    wherein a fifth value "1" in the first phase rotation values is applied to subcarriers having subcarrier indexes of −256 to −193,
    wherein a sixth value "−1" in the first phase rotation value is applied to subcarriers having subcarrier indexes of −192 to −129,
    wherein a seventh value "−1" in the first phase rotation value is applied to subcarriers having subcarrier indexes of −128 to −65,
    wherein an eighth value "−1" in the first phase rotation value is applied to subcarriers having subcarrier indexes of −64 to −1,
    wherein a ninth value "−1" in the first phase rotation value is applied to subcarriers having subcarrier indexes of 0 to 63,
    wherein a tenth value "1" in the first phase rotation value is applied to subcarriers having subcarrier indexes of 64 to 127,
    wherein an eleventh value "1" in the first phase rotation value is applied to subcarriers having subcarrier indexes of 128 to 191,
    wherein a twelfth value "1" in the first phase rotation value is applied to subcarriers having subcarrier indexes of 192 to 255,
    wherein a thirteenth value "−1" in the first phase rotation value is applied to subcarriers having subcarrier indexes of 256 to 319,
    wherein a fourteenth value "1" in the first phase rotation value is applied to subcarriers having subcarrier indexes of 320 to 383,
    wherein a fifteenth value "1" in the first phase rotation value is applied to subcarriers having subcarrier indexes of 384 to 447, and
    wherein a sixteenth value "1" in the first phase rotation value is applied to subcarriers having subcarrier indexes of 448 to 511.

2. The method of claim 1, wherein the first phase rotation value is obtained based on a second phase rotation value and a third phase rotation value,
    wherein the second phase rotation value is obtained by repeating phase rotation values defined for an 80 MHz band,
    wherein the third phase rotation value is defined in units of 80 MHz in the 320 MHz band,
    wherein the 320 MHz band is composed of subcarriers having subcarrier indexes of −512 to 511,
    the second phase rotation value is [1 −1 −1 −1 1 −1 −1 −1 1 −1 −1 −1 1 −1 −1 −1],
    the first value "1" in the second phase rotation value is applied to subcarriers having subcarrier indexes of −512 to −449,
    the second value "−1" in the second phase rotation value is applied to subcarriers having subcarrier indexes of −448 to −385,
    the third value "−1" in the second phase rotation value is applied to subcarriers having subcarrier indexes of −384 to −321,
    the fourth value "−1" in the second phase rotation value is applied to subcarriers having subcarrier indexes of −320 to −257,
    the fifth value "1" in the second phase rotation values is applied to subcarriers having subcarrier indexes of −256 to −193,
    the sixth value "−1" in the second phase rotation value is applied to subcarriers having subcarrier indexes of −192 to −129,
    the seventh value "−1" in the second phase rotation value is applied to subcarriers having subcarrier indexes of −128 to −65,
    the eighth value "−1" in the second phase rotation value is applied to subcarriers having subcarrier indexes of −64 to −1,
    the ninth value "1" in the second phase rotation value is applied to subcarriers having subcarrier indexes of 0 to 63,
    the tenth value "−1" in the second phase rotation value is applied to subcarriers having subcarrier indexes of 64 to 127,
    the eleventh value "−1" in the second phase rotation value is applied to subcarriers having subcarrier indexes of 128 to 191,
    the twelfth value "−1" in the second phase rotation value is applied to subcarriers having subcarrier indexes of 192 to 255,
    the thirteenth value "1" in the second phase rotation value is applied to subcarriers having subcarrier indexes of 256 to 319,
    the fourteenth value "−1" in the second phase rotation value is applied to subcarriers having subcarrier indexes of 320 to 383,
    the fifteenth value "−1" in the second phase rotation value is applied to subcarriers having subcarrier indexes of 384 to 447, and
    the sixteenth value "−1" in the second phase rotation value is applied to subcarriers having subcarrier indexes of 448 to 511.

3. The method of claim 2, wherein the third phase rotation value is [1 1 −1 −1],
    the first value "1" in the third phase rotation value is applied to a first 80 MHz band in the 320 MHz band,
    the second value "1" in the third phase rotation value is applied to a second 80 MHz band in the 320 MHz band,
    the third value "−1" in the third phase rotation value is applied to a third 80 MHz band in the 320 MHz band, and
    the fourth value "−1" in the third phase rotation value is applied to a fourth 80 MHz band in the 320 MHz band.

4. The method of claim 1, wherein the part of the band includes all 20 MHz bands except a primary 20 MHz band, the first phase rotation value is obtained based on a preamble puncturing pattern, and the preamble puncturing pattern is a band pattern obtained by puncturing at least one of all 20 MHz bands except the primary 20 MHz band in the 320 MHz band.

5. The method of claim 1, wherein the maximum transmission bandwidth supported by RF is 80 MHz, 160 MHz, 240 MHz, or 320 MHz, an optimum PAPR obtained based on the maximum transmission bandwidth supported by RF is selected by comparing first to fourth PAPRs, the first PAPR is an optimum PAPR obtained when the maximum transmission bandwidth supported by RF is 80 MHz, the second PAPR is an optimum PAPR obtained when the maximum transmission bandwidth supported by RF is 160 MHz, the third PAPR is an optimum PAPR obtained when the maximum transmission bandwidth supported by RF is 240 MHz, and the fourth PAPR is an optimum PAPR obtained when the maximum transmission bandwidth supported by RF is 320 MHz.

6. A transmitting device for transmitting a physical protocol data unit (PPDU) in a WLAN system, the transmitting device comprising:

a memory;

a transceiver; and a processor operably connected to the memory and the transceiver, wherein the processor is configured:

to generate the PPDU, the PPDU including a legacy preamble and a data field; and to transmit the PPDU to a receiving device, wherein the legacy preamble includes a legacy-short training field (L-STF) and a legacy-long training field (L-LTF), wherein the legacy preamble is generated by applying a first phase rotation value for a 320 MHz band, wherein a first value "1" in the first phase rotation value is applied to subcarriers having subcarrier indexes of −512 to −449, wherein a second value "−1" in the first phase rotation value is applied to subcarriers having subcarrier indexes of −448 to −385, wherein a third value "−1" in the first phase rotation value is applied to subcarriers having subcarrier indexes of −384 to −321, wherein a fourth value "−1" in the first phase rotation value is applied to subcarriers having subcarrier indexes of −320 to −257, wherein a fifth value "1" in the first phase rotation values is applied to subcarriers having subcarrier indexes of −256 to −193, wherein a sixth value "−1" in the first phase rotation value is applied to subcarriers having subcarrier indexes of −192 to −129, wherein a seventh value "−1" in the first phase rotation value is applied to subcarriers having subcarrier indexes of −128 to −65, wherein an eighth value "−1" in the first phase rotation value is applied to subcarriers having subcarrier indexes of −64 to −1, wherein a ninth value "−1" in the first phase rotation value is applied to subcarriers having subcarrier indexes of 0 to 63, wherein a tenth value "1" in the first phase rotation value is applied to subcarriers having subcarrier indexes of 64 to 127, wherein an eleventh value "1" in the first phase rotation value is applied to subcarriers having subcarrier indexes of 128 to 191, wherein a twelfth value "1" in the first phase rotation value is applied to subcarriers having subcarrier indexes of 192 to 255, wherein a thirteenth value "−1" in the first phase rotation value is applied to subcarriers having subcarrier indexes of 256 to 319, wherein a fourteenth value "1" in the first phase rotation value is applied to subcarriers having subcarrier indexes of 320 to 383, wherein a fifteenth value "1" in the first phase rotation value is applied to subcarriers having subcarrier indexes of 384 to 447, and wherein a sixteenth value "1" in the first phase rotation value is applied to subcarriers having subcarrier indexes of 448 to 511.

7. The transmitting device of claim 6, wherein the first phase rotation value is obtained based on a second phase rotation value and a third phase rotation value, wherein the second phase rotation value is obtained by repeating phase rotation values defined for an 80 MHz band, wherein the third phase rotation value is defined in units of 80 MHz in the 320 MHz band, wherein the 320 MHz band is composed of subcarriers having subcarrier indexes of −512 to 511, the second phase rotation value is [1 −1 −1 −1 1 −1 −1 −1 1 −1 −1 −1 1 −1 −1 −1], the first value "1" in the second phase rotation value is applied to subcarriers having subcarrier indexes of −512 to −449, the second value "−1" in the second phase rotation value is applied to subcarriers having subcarrier indexes of −448 to −385, the third value "−1" in the second phase rotation value is applied to subcarriers having subcarrier indexes of −384 to −321, the fourth value "−1" in the second phase rotation value is applied to subcarriers having subcarrier indexes of −320 to −257, the fifth value "1" in the second phase rotation values is applied to subcarriers having subcarrier indexes of −256 to −193, the sixth value "−1" in the second phase rotation value is applied to subcarriers having subcarrier indexes of −192 to −129, the seventh value "−1" in the second phase rotation value is applied to subcarriers having subcarrier indexes of −128 to −65, the eighth value "−1" in the second phase rotation value is applied to subcarriers having subcarrier indexes of −64 to −1, the ninth value "1" in the second phase rotation value is applied to subcarriers having subcarrier indexes of 0 to 63, the tenth value "−1" in the second phase rotation value is applied to subcarriers having subcarrier indexes of 64 to 127, the eleventh value "−1" in the second phase rotation value is applied to subcarriers having subcarrier indexes of 128 to 191, the twelfth value "−1" in the second phase rotation value is applied to subcarriers having subcarrier indexes of 192 to 255, the thirteenth value "1" in the second phase rotation value is applied to subcarriers having subcarrier indexes of 256 to 319, the fourteenth value "−1" in the second phase rotation value is applied to subcarriers having subcarrier indexes of 320 to 383, the fifteenth value "−1" in the second phase rotation value is applied to subcarriers having subcarrier indexes of 384 to 447, and the sixteenth value "−1" in the second phase rotation value is applied to subcarriers having subcarrier indexes of 448 to 511.

8. The transmitting device of claim 7, wherein the third phase rotation value is [1 1 −1 −1],
the first value "1" in the third phase rotation value is applied to a first 80 MHz band in the 320 MHz band,
the second value "1" in the third phase rotation value is applied to a second 80 MHz band in the 320 MHz band,
the third value "−1" in the third phase rotation value is applied to a third 80 MHz band in the 320 MHz band, and
the fourth value "−1" in the third phase rotation value is applied to a fourth 80 MHz band in the 320 MHz band.

9. The transmitting device of claim 6, wherein the part of the band includes all 20 MHz bands except a primary 20 MHz band,
the first phase rotation value is obtained based on a preamble puncturing pattern, and
the preamble puncturing pattern is a band pattern obtained by puncturing at least one of all 20 MHz bands except the primary 20 MHz band in the 320 MHz band.

10. The transmitting device of claim 6, wherein the maximum transmission bandwidth supported by RF is 80 MHz, 160 MHz, 240 MHz, or 320 MHz,
an optimum PAPR obtained based on the maximum transmission bandwidth supported by RF is selected by comparing first to fourth PAPRs,
the first PAPR is an optimum PAPR obtained when the maximum transmission bandwidth supported by RF is 80 MHz,
the second PAPR is an optimum PAPR obtained when the maximum transmission bandwidth supported by RF is 160 MHz,
the third PAPR is an optimum PAPR obtained when the maximum transmission bandwidth supported by RF is 240 MHz, and
the fourth PAPR is an optimum PAPR obtained when the maximum transmission bandwidth supported by RF is 320 MHz.

11. A method for receiving a physical protocol data unit (PPDU) in a WLAN system, the method comprising:
receiving, by a receiving device, the PPDU from a transmitting device, the PPDU including a legacy preamble and a data field; and
decoding, by the receiving device, the PPDU,
wherein the legacy preamble includes a legacy-short training field (L-STF) and a legacy-long training field (L-LTF),
wherein the legacy preamble is generated by applying a first phase rotation value for a 320 MHz band,
wherein a first value "1" in the first phase rotation value is applied to subcarriers having subcarrier indexes of −512 to −449, wherein a second value "−1" in the first phase rotation value is applied to subcarriers having subcarrier indexes of −448 to −385,
wherein a third value "−1" in the first phase rotation value is applied to subcarriers having subcarrier indexes of −384 to −321,
wherein a fourth value "−1" in the first phase rotation value is applied to subcarriers having subcarrier indexes of −320 to −257,
wherein a fifth value "1" in the first phase rotation values is applied to subcarriers having subcarrier indexes of −256 to −193,
wherein a sixth value "−1" in the first phase rotation value is applied to subcarriers having subcarrier indexes of −192 to −129,
wherein a seventh value "−1" in the first phase rotation value is applied to subcarriers having subcarrier indexes of −128 to −65,
wherein an eighth value "−1" in the first phase rotation value is applied to subcarriers having subcarrier indexes of −64 to −1,
wherein a ninth value "−1" in the first phase rotation value is applied to subcarriers having subcarrier indexes of 0 to 63,
wherein a tenth value "1" in the first phase rotation value is applied to subcarriers having subcarrier indexes of 64 to 127,
wherein an eleventh value "1" in the first phase rotation value is applied to subcarriers having subcarrier indexes of 128 to 191,
wherein a twelfth value "1" in the first phase rotation value is applied to subcarriers having subcarrier indexes of 192 to 255,
wherein a thirteenth value "−1" in the first phase rotation value is applied to subcarriers having subcarrier indexes of 256 to 319,
wherein a fourteenth value "1" in the first phase rotation value is applied to subcarriers having subcarrier indexes of 320 to 383,
wherein a fifteenth value "1" in the first phase rotation value is applied to subcarriers having subcarrier indexes of 384 to 447, and
wherein a sixteenth value "1" in the first phase rotation value is applied to subcarriers having subcarrier indexes of 448 to 511.

12. A receiving device for transmitting a physical protocol data unit (PPDU) in a WLAN system, the receiving device comprising:
a memory;
a transceiver; and
a processor operably connected to the memory and the transceiver,
wherein the processor is configured:
to receive the PPDU from a transmitting device, the PPDU including a legacy preamble and a data field; and
to decode the PPDU,
wherein the legacy preamble includes a legacy-short training field (L-STF) and a legacy-long training field (L-LTF),
wherein the legacy preamble is generated by applying a first phase rotation value for a 320 MHz band,
wherein a first value "1" in the first phase rotation value is applied to subcarriers having subcarrier indexes of −512 to −449,
wherein a second value "−1" in the first phase rotation value is applied to subcarriers having subcarrier indexes of −448 to −385, wherein a third value "−1" in the first phase rotation value is applied to subcarriers having subcarrier indexes of −384 to −321, wherein a fourth value "−1" in the first phase rotation value is applied to subcarriers having subcarrier indexes of −320 to −257, wherein a fifth value "1" in the first phase rotation values is applied to subcarriers having subcarrier indexes of −256 to −193, wherein a sixth value "−1" in the first phase rotation value is applied to subcarriers having subcarrier indexes of −192 to −129, wherein a seventh value "−1" in the first phase rotation value is applied to subcarriers having subcarrier indexes of −128 to −65, wherein an eighth value "−1" in the first phase rotation value is applied to subcarriers having subcarrier indexes of −64 to −1, wherein a ninth value "−1" in the first phase rotation value is applied to subcarriers having subcarrier indexes of 0 to 63, wherein a tenth value "1" in the first phase rotation value is applied to subcarriers having subcarrier indexes of 64 to 127, wherein an eleventh value "1" in the first phase rotation value is applied to subcarriers having subcarrier indexes of 128 to 191, wherein a twelfth value "1" in the first phase rotation value is applied to subcarriers having subcarrier indexes of 192 to 255, wherein a thirteenth value "−1" in the first phase rotation value is applied to subcarriers having subcarrier indexes of 256 to 319, wherein a fourteenth value "1" in the first phase rotation value is applied to subcarriers having subcarrier indexes of 320 to 383, wherein a fifteenth value "1" in the first phase rotation value is applied to subcarriers having subcarrier indexes of 384 to 447, and wherein a sixteenth value "1" in the first phase rotation value is applied to subcarriers having subcarrier indexes of 448 to 511.

\* \* \* \* \*